(12) United States Patent
Takenaka et al.

(10) Patent No.: US 9,073,566 B2
(45) Date of Patent: *Jul. 7, 2015

(54) ROAD SURFACE FRICTION COEFFICIENT ESTIMATING DEVICE

(75) Inventors: Toru Takenaka, Saitama (JP); Hiroyuki Urabe, Saitama (JP); Yoshihiro Mori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 808 days.

This patent is subject to a terminal disclaimer.

(21) Appl. No.: 13/257,698

(22) PCT Filed: Mar. 26, 2010

(86) PCT No.: PCT/JP2010/055325
§ 371 (c)(1),
(2), (4) Date: Sep. 20, 2011

(87) PCT Pub. No.: WO2010/113781
PCT Pub. Date: Oct. 7, 2010

(65) Prior Publication Data
US 2012/0029783 A1 Feb. 2, 2012

(30) Foreign Application Priority Data

Mar. 30, 2009 (JP) ................................ 2009-083592

(51) Int. Cl.
*B62D 6/00* (2006.01)
*B60T 8/172* (2006.01)
*B60W 40/068* (2012.01)

(52) U.S. Cl.
CPC .................. *B62D 6/006* (2013.01); *B60T 8/172* (2013.01); *B60T 2210/12* (2013.01); *B60T 2210/22* (2013.01); *B60W 40/068* (2013.01)

(58) Field of Classification Search
CPC ....... B60T 8/17; B60T 8/172; B60T 2210/00; B60T 2210/12; B60T 2210/22; B62D 6/002; B62D 6/006; B60W 40/00; B60W 40/06; B60W 40/068
USPC ............. 701/70–73, 1, 82; 303/149; 180/197; 361/238
See application file for complete search history.

(56) References Cited

U.S. PATENT DOCUMENTS 5,132,906 A * 7/1992 Sol et al. .......................... 701/80
2008/0228329 A1 * 9/2008 Hartman ............................. 701/1

FOREIGN PATENT DOCUMENTS

| JP | 2000-025599 | 1/2000 |
| JP | 2003-118554 | 4/2003 |

(Continued)

*Primary Examiner* — Khoi Tran
*Assistant Examiner* — Abby Lin
(74) *Attorney, Agent, or Firm* — Rankin, Hill & Clark LLP

(57) ABSTRACT

A road surface friction coefficient estimating device includes a means which finds a first estimated value Mnsp_estm of an external force to be compared (S102 to S116, S118-2), a means which finds a second estimated value Mnsp_sens (S118-1), and a plurality of increasing/decreasing manipulated variable determining means 34_k, each of which determines the increasing/decreasing manipulated variable Δμ_k of the friction coefficient estimated value on the basis of the first estimated value Mnsp_estm and the second estimated value Mnsp_sens, and updates the friction coefficient estimated value according to Δμ_k. The increasing/decreasing manipulated variable determining means 34_1 and 34_2 determine Δμ_1 and Δμ_2 according to a deviation in filtering value between the first estimated value and the second estimated value, and the increasing/decreasing manipulated variable determining means 34_3 determines Δμ_1 according to the deviation between the first estimated value and the second estimated value.

27 Claims, 16 Drawing Sheets

(56) References Cited

FOREIGN PATENT DOCUMENTS

| JP | 2003-341500 | 12/2003 |
| JP | 2006-264561 | 10/2006 |
| JP | 2007-030748 | 2/2007 |
| WO | 2007/018188 | 2/2007 |

* cited by examiner

ROAD SURFACE FRICTION COEFFICIENT ESTIMATING DEVICE

TECHNICAL FIELD

The present invention relates to a road surface friction coefficient estimating device, which estimates the friction coefficient of a road surface on which a vehicle is traveling.

BACKGROUND ART

As the technique for estimating the friction coefficient (hereinafter referred to simply as "μ" in some cases) of a road surface on which a vehicle is traveling, the techniques disclosed in, for example, U.S. Pat. No. 3,669,668 (hereinafter referred to as "patent document 1") and Japanese Patent Application Laid-Open No. 2003-118554 (hereinafter referred to as "patent document 2"), have been proposed by the present applicant.

According to the technique disclosed in patent document 1, a road surface reaction force acting on each wheel from a road surface (a cornering force (a lateral force of a vehicle) and a braking/driving force (a longitudinal force of the vehicle)) is estimated using a tire characteristic set on the basis of an estimated value of μ. Then, based on the estimated value of the road surface reaction force, the estimated value of a lateral acceleration of the vehicle and the estimated value of a yaw rate changing velocity of the vehicle (the yaw rate changing velocity at the center of gravity of the vehicle), which are motion state quantities of the vehicle generated by the resultant force of the road surface reaction forces, are calculated.

Further, according to the technique disclosed in patent document 1, a previous estimated value of μ is updated on the basis of the deviation between the value of the lateral acceleration detected by an acceleration sensor and the estimated value of the lateral acceleration or the deviation between the differential value of the yaw rate values detected by the yaw rate sensor (the detected value of the yaw rate changing velocity) and the estimated value of the yaw rate changing velocity, whichever deviation is greater, thereby finding a new estimated value of μ.

According to the technique disclosed in patent document 2, a tire model set on the basis of the estimated value of μ is used to estimate the road surface reaction force acting on each wheel from a road surface (the cornering force and the braking/driving force). Then, based on the estimated value of the road surface reaction force, the estimated value of a lateral acceleration of the vehicle and the estimated value of the longitudinal acceleration of the vehicle, which are the motion state quantities of the vehicle generated by the resultant force of the road surface reaction forces, are calculated.

According to the technique disclosed in patent document 2, in the case where a slip angle (skid angle) of a rear wheel is small, the estimated value of μ is incremented or decremented by a predetermined value according to a magnitude relationship between the estimated value of the longitudinal acceleration of the vehicle and the detected value of the longitudinal acceleration provided by the sensor. In the case where the slip angle of a rear wheel is large, the estimated value of μ is incremented or decremented by a predetermined value according to the magnitude relationship between the estimated value of the lateral acceleration of the vehicle and the detected value of the lateral acceleration provided by the sensor. Thus, the estimated value of μ is sequentially updated.

The road surface reaction force acting on a wheel depends not only on μ but also on the slip rate or the skid angle (slip angle) of a wheel. For this reason, according to the techniques disclosed in patent documents 1 and 2, the slip rate of a wheel is estimated and the skid angle of a vehicle or the skid angle of a wheel is also estimated using a motion model of the vehicle.

The techniques disclosed in patent documents 1 and 2 are based on the assumption that the deviation between the estimated value of the lateral acceleration of the center of gravity of the vehicle and the value of lateral acceleration detected by the acceleration sensor (hereinafter referred to as the lateral acceleration deviation), the deviation between the estimated value of the longitudinal acceleration of the center of gravity of the vehicle and the value of the longitudinal acceleration detected by the acceleration sensor (hereinafter referred to as the longitudinal acceleration deviation), or the deviation between the estimated value of the yaw rate changing velocity at the center of gravity of the vehicle and the detected value of the yaw rate changing velocity based on an output of a yaw rate sensor (hereinafter referred to as the yaw rate changing velocity deviation) are caused by the error of an estimated value of μ used to find the estimated value of the lateral acceleration, the estimated value of the longitudinal acceleration, or the estimated value of the yaw rate changing velocity.

On the other hand, the detected value of the lateral acceleration, the longitudinal acceleration, and the yaw rate changing velocity often includes a steady offset component caused by a drift of an output of sensors corresponding to them, respectively, or an inclination or the like of a road surface.

This situation sometimes causes a disadvantage as described below in the case of updating the estimated value of μ according to the aforesaid lateral acceleration deviation, the longitudinal acceleration deviation, or the yaw rate changing velocity deviation.

In other words, for example, in the case where the detected value of the lateral acceleration of the vehicle includes an offset component as described above when updating the estimated value of μ according to the lateral acceleration deviation, if the actual lateral acceleration changes in polarity from one of the positive and negative polarities (direction) to the other polarity (direction), a difference occurs between the change timing of the actual lateral acceleration and the change timing of the detected value of the lateral acceleration (so-called zero-cross timing).

Therefore, particularly, around the zero-cross timing of the actual lateral acceleration (in a situation where the actual lateral acceleration reaches zero or a value close to zero), the polarity of the lateral acceleration deviation is often reverse to the actual polarity (the polarity of the deviation between the actual lateral acceleration and the estimated value of the lateral acceleration).

Then, in such a situation, a disadvantage easily occurs that the estimated value of μ decreases though the estimated value of μ should be increased in order to bring the estimated value of μ close to the actual μ value. In other cases, a disadvantage easily occurs that the estimated value of μ increases though the estimated value of μ should be decreased. In other words, a disadvantage easily occurs that the estimated value of μ changes in a direction of being farther away from the actual value of μ.

In addition, the disadvantage occurs in the same manner also in the case of updating the estimated value of μ according to the longitudinal acceleration deviation or the yaw rate changing velocity deviation.

Therefore, the conventional techniques disclosed in patent documents 1 and 2 have had a disadvantage of easily causing a situation where the estimated value of μ diverges from the actual value of μ so as to be farther away from the actual value of μ.

SUMMARY OF THE INVENTION

The present invention has been made in view of the background described above, and an object of the present invention is to provide a road surface friction coefficient estimating device capable of accurately and stably estimating the friction coefficient of a road surface, on which a vehicle is traveling, by preventing an occurrence of a situation where the estimated value of the friction coefficient is updated in a direction of deviating from an actual friction coefficient.

To this end, according to a first aspect of the present invention, there is provided a road surface friction coefficient estimating device which estimates a friction coefficient of a road surface, on which a vehicle is traveling, while updating the friction coefficient, including:

a first estimating means of a to-be-compared external force which defines a predetermined type of an external force component acting on a vehicle due to a resultant force of road surface reaction forces acting on each wheel of the vehicle from a road surface as a to-be-compared external force and finds a first estimated value of the to-be-compared external force by using a friction characteristic model representing a relationship between a slip between the wheel of the vehicle and the road surface and a road surface reaction force, an estimated value of a friction coefficient which has been already determined, and an observed value of a predetermined type of a quantity to be observed, which is related to a behavior of the vehicle;

a second estimating means of a to-be-compared external force which finds a value of an external force component balancing out an inertial force corresponding to the to-be-compared external force on the basis of an observed value of a motion state quantity of the vehicle that defines the inertial force, which is a part of an inertial force generated by a motion of the vehicle, and obtains the found value of the external force component as a second estimated value of the to-be-compared external force;

a first friction coefficient increasing/decreasing manipulated variable determining means and a second friction coefficient increasing/decreasing manipulated variable determining means, each of which determines an increasing/decreasing manipulated variable of an estimated value of the friction coefficient of the road surface on the basis of at least the first estimated value and the second estimated value; and a friction coefficient estimated value updating means which determines a new estimated value of a friction coefficient by updating the estimated value of the friction coefficient of the road surface on the basis of at least any one of the increasing/decreasing manipulated variables, which have been determined by the first friction coefficient increasing/decreasing manipulated variable determining means and the second friction coefficient increasing/decreasing manipulated variable determining means, respectively, wherein:

the second friction coefficient increasing/decreasing manipulated variable determining means determines the increasing/decreasing manipulated variable on the basis of at least a deviation between the first estimated value and the second estimated value such that the deviation therebetween is converged to zero; and the first friction coefficient increasing/decreasing manipulated variable determining means determines the increasing/decreasing manipulated variable on the basis of at least a deviation between a (1_1)th estimated filtering value obtained by passing the first estimated value through a (1_1)th filter for frequency component adjustment and a (2_1)th estimated filtering value obtained by passing the second estimated value through a (2_1)th filter for frequency component adjustment having the same frequency characteristic as the (1_1)th filter, such that the deviation is converged to zero (First aspect of the invention).

The term "observed value" in the present invention means a detected value directly observed from a sensor output or an estimated value indirectly observed by using an appropriate model or a natural law from one or more sensor outputs related to a quantity to be observed.

According to the first aspect of the invention, the first estimating means of the to-be-compared external force determines the first estimated value of the to-be-compared external force by using a friction characteristic model representing a relationship between a slip between a wheel of a vehicle and a road surface and a road surface reaction force, the estimated value of the friction coefficient that has already been determined (hereinafter referred to as "determined estimated value" in some cases), and the observed value of a predetermined type of quantity to be observed, which is related to a behavior of the vehicle. Thus, the first estimated value is found as the value of the to-be-compared external force identified depending upon the determined estimated value of the friction coefficient.

In this case, more specifically, the road surface reaction force acting on each wheel of the vehicle can be estimated by identifying (estimating) the aforesaid slip in the friction characteristic model from the observed value of the predetermined type of the quantity to be observed, which is related to a behavior of the vehicle, then inputting the identified slip and the determined estimated value of the friction coefficient to the friction characteristic model. Then, the value of the to-be-compared external force found from the estimated road surface reaction force may be obtained as a first estimated value.

Hence, the observed value of the predetermined type of quantity to be observed may be the observed value of a quantity to be observed that is necessary to identify the slip between a wheel and a road surface in the friction characteristic model. The quantity to be observed may be selected beforehand according to the structure of the friction characteristic model.

In addition, for example, a slip rate, a skid angle, or the like of each wheel may be used as an index value indicative of the slip between a wheel and a road surface. Further, for example, a translational force in a predetermined direction acting on the entire vehicle due to the road surface reaction force, a moment about a predetermined axis, or the like may be used as the to-be-compared external force. Further, the determined estimated value of the friction coefficient is preferably a latest value among already determined estimated values. The value, however, may be older than the latest value as long as the value lies in a sufficiently short time of period wherein the estimated value of the friction coefficient is maintained substantially constant.

Meanwhile, the second estimating means of the to-be-compared external force finds the value of an external force component that balances out an inertial force from an observed value of a motion state quantity of the vehicle that defines the inertial force corresponding to the to-be-compared external force in the inertial force produced by a motion of the vehicle. The second estimating means then obtains the found value of the external force component as a second estimated value of the to-be-compared external force. This makes it possible to find the second estimated value of the to-be-compared external force from the observed value of the motion state quantity of the vehicle that defines the inertial force corresponding to the to-be-compared external force without using the estimated value of the friction coefficient of a road surface.

According to the first aspect of the invention, the first friction coefficient increasing/decreasing manipulated variable determining means and the second friction coefficient increasing/decreasing manipulated variable determining means each determine an increasing/decreasing manipulated variable of the estimated value of the friction coefficient of the road surface on the basis of at least the first estimated value and the second estimated value.

In this case, the second friction coefficient increasing/decreasing manipulated variable determining means, out of the first and second friction coefficient increasing/decreasing manipulated variable determining means, determines the increasing/decreasing manipulated variable (hereinafter referred to as "(2_A)th increasing/decreasing manipulated variable" in some cases) on the basis of at least the deviation between the first estimated value and the second estimated value such that the deviation therebetween is converged to zero.

On the other hand, the first friction coefficient increasing/decreasing manipulated variable determining means deter- mines an increasing/decreasing manipulated variable (here- inafter referred to as "(1_A)th increasing/decreasing manipulated variable" in some cases) on the basis of at least a deviation between the (1__1)th estimated filtering value obtained by passing the first estimated value through a (1__1) th filter for frequency component adjustment and a (2__1)th estimated filtering value obtained by passing the second esti- mated value through a (2__1)th filter having the same fre- quency characteristic as the (1__1)th filter, such that the devia- tion converges to zero.

The same frequency characteristic between the (1__1)th filter and the (2__1)th filter not only means that the frequency characteristics of these filters are strictly the same as each other, but a slight difference in the frequency characteristic is allowed between the (1__1)th filter and the (2__1)th filter.

The frequency characteristics thereof may be basically set such that, in the case where the actual to-be-compared exter- nal force changes at various frequencies, the distribution characteristic of a frequency component, which can be con- tained in a (1__1)th estimated filtering value obtained as a result of passing the first estimated value through the (1__1)th filter, agrees or substantially agrees with the distribution char- acteristic of a frequency component, which can be contained in a (2__1)th estimated filtering value obtained as a result of passing the second estimated value through the (2__1)th filter.

Here, the (2_A)th increasing/decreasing manipulated vari- able functions such that the deviation between the first esti- mated value itself and the second estimated value itself con- verges to zero. Meanwhile, the (1_A)th increasing/decreasing manipulated variable functions such that the deviation between the (1__1)th estimated filtering value, which is obtained by passing the first estimated value through the (1__1)th filter, and the (2__1)th estimated filtering value, which is obtained by passing the second estimated value through the (2__1)th filter, converges to zero. Therefore, the (1_A)th increasing/decreasing manipulated variable func- tions such that a part of the frequency components of the deviation between the first estimated value itself and the second estimated value itself converge to zero.

Therefore, in the case where the first estimated value or the second estimated value contains a disturbance component, which is independent of the actual to-be-compared external force, a distinction such as a difference in polarity or the like easily occurs between the (1_A)th increasing/decreasing manipulated variable and the (2_A)th increasing/decreasing manipulated variable particularly in the vicinity of the zero- cross timing of the actual to-be-compared external force. Therefore, it is possible to select or combine increasing/ decreasing manipulated variables, which are appropriate for updating the estimated value of the friction coefficient, such that the estimated value does not deviate from the actual friction coefficient, from the (1_A)th increasing/decreasing manipulated variable and the (2_A)th increasing/decreasing manipulated variable.

Therefore, in the first aspect of the invention, the friction coefficient estimated value updating means determines a new estimated value of the estimated value of the friction coeffi- cient by updating the estimated value of the friction coeffi- cient of the road surface according to at least any one of the increasing/decreasing manipulated variables, which have been determined by the first friction coefficient increasing/ decreasing manipulated variable determining means and the second friction coefficient increasing/decreasing manipu- lated variable determining means, respectively.

This enables the estimated value of the friction coefficient to be updated such that the estimated value does not deviate from the actual friction coefficient in the case where the first estimated value or the second estimated value contains a disturbance component independent of the actual to-be-com- pared external force (an offset component or the like caused by a drift of an output of sensors for obtaining the observed value).

Therefore, according to the first aspect of the invention, the road surface friction coefficient estimating device is able to accurately and stably estimate the friction coefficient of a road surface on which a vehicle is traveling by preventing an occurrence of a situation where the estimated value of the friction coefficient is updated in a direction of deviating from the actual friction coefficient.

Further, according to a second aspect of the present inven- tion, there is provided a road surface friction coefficient esti- mating device which estimates a friction coefficient of a road surface, on which a vehicle is traveling, while updating the friction coefficient, including:

a first estimating means of a to-be-compared external force which defines a predetermined type of an external force com- ponent acting on a vehicle due to a resultant force of road surface reaction forces acting on each wheel of the vehicle from a road surface as a to-be-compared external force and finds a first estimated value of the to-be-compared external force by using a friction characteristic model representing a relationship between a slip between the wheel of the vehicle and the road surface and a road surface reaction force, an estimated value of a friction coefficient which has been already determined, and an observed value of a predeter- mined type of a quantity to be observed, which is related to a behavior of the vehicle;

a second estimating means of a to-be-compared external force which finds a value of an external force component balancing out an inertial force corresponding to the to-be- compared external force on the basis of an observed value of a motion state quantity of the vehicle that defines the inertial force, which is a part of an inertial force generated by a motion of the vehicle, and obtains the found value of the external force component as a second estimated value of the to-be-compared external force;

first to (N+1)th friction coefficient increasing/decreasing manipulated variable determining means, which are (N+1) (N: 2 or a greater integer) friction coefficient increasing/ decreasing manipulated variable determining means, each of which determines an increasing/decreasing manipulated variable of an estimated value of the friction coefficient of the road surface on the basis of at least the first estimated value and the second estimated value; and a friction coefficient estimated value updating means which determines a new estimated value of a friction coefficient by updating the estimated value of the friction coefficient of the road surface on the basis of at least any one of the increasing/decreasing manipulated variables, which have been determined by the first to (N+1)th friction coefficient increasing/decreasing manipulated variable determining means, respectively, wherein:

the (N+1)th friction coefficient increasing/decreasing manipulated variable determining means determines the increasing/decreasing manipulated variable on the basis of at least a deviation between the first estimated value and the second estimated value such that the deviation therebetween is converged to zero;

a k-th friction coefficient increasing/decreasing manipulated variable determining means (k: any one of integers 1 to N), which is any arbitrary one of the first to (N+1)th friction coefficient increasing/decreasing manipulated variable determining means, determines the increasing/decreasing manipulated variable on the basis of at least a deviation between a (1_k)th estimated filtering value obtained by passing the first estimated value through a (1_k)th filter for frequency component adjustment and a (2_k)th estimated filtering value obtained by passing the second estimated value through a (2_k)th filter for frequency component adjustment having the same frequency characteristic as the (1_k)th filter, such that the deviation is converged to zero; and the respective frequency characteristics of the (1_1)th to (1_N)th filters are set to frequency characteristics different from one another (Second aspect of the invention).

In the second aspect of the invention, the first estimating means of the to-be-compared external force and the second estimating means of the to-be-compared external force are the same as those of the first aspect of the invention, and the first and second estimating means find the first estimated value and the second estimated value, respectively, as described in the first aspect of the invention.

Further, in the second aspect of the invention, the first to (N+1)th friction coefficient increasing/decreasing manipulated variable determining means, which are N+1 friction coefficient increasing/decreasing manipulated variable determining means (three or more friction coefficient increasing/decreasing manipulated variable determining means), determine the increasing/decreasing manipulated variables of the estimated values of the friction coefficients of the road surface, respectively, on the basis of at least the first estimated value and the second estimated value.

In this case, the (N+1)th friction coefficient increasing/decreasing manipulated variable determining means among the above friction coefficient increasing/decreasing manipulated variable determining means determines the increasing/decreasing manipulated variable (hereinafter, referred to as "(N+1_B)th increasing/decreasing manipulated variable" in some cases) according to at least the deviation between the first estimated value and the second estimated value such that the deviation converges to zero.

On the other hand, the k-th friction coefficient increasing/decreasing manipulated variable determining means, which is arbitrary one of the first to N-th friction coefficient increasing/decreasing manipulated variable determining means, determines the increasing/decreasing manipulated variable (hereinafter referred to as "(k_B)th increasing/decreasing manipulated variable" in some cases) on the basis of at least a deviation between the (1_k)th estimated filtering value obtained by passing the first estimated value through a (1_k)th filter for frequency component adjustment and a (2_k)th estimated filtering value obtained by passing the second estimated value through a (2_k)th filter having the same frequency characteristic as the (1_k)th filter, such that the deviation converges to zero.

The same frequency characteristic between the (1_k)th filter and the (2_k)th filter not only means that the frequency characteristics thereof are strictly the same as each other, but a slight difference in the frequency characteristic is allowed between the (1_k)th filter and the (2_k)th filter.

The frequency characteristics thereof may be basically set such that, in the case where the actual to-be-compared external force changes at various frequencies, the distribution characteristic of a frequency component, which can be contained in a (1_k)th estimated filtering value obtained as a result of passing the first estimated value through the (1_k)th filter, agrees or substantially agrees with the distribution characteristic of a frequency component, which can be contained in a (2_k)th estimated filtering value obtained as a result of passing the second estimated value through the (2_k)th filter.

Here, the (N+1_B)th increasing/decreasing manipulated variable functions such that the deviation between the first estimated value itself and the second estimated value itself converges to zero.

Meanwhile, the (k_B)th increasing/decreasing manipulated variable functions such that the deviation between the (1_k)th estimated filtering value, which is obtained by passing the first estimated value through the (1_k)th filter, and the (2_k)th estimated filtering value, which is obtained by passing the second estimated value through the (2_k)th filter, converges to zero.

Therefore, the (k_B)th increasing/decreasing manipulated variable functions such that a part of the frequency components of the deviation between the first estimated value itself and the second estimated value itself converge to zero.

Further, in the second aspect of the invention, the respective frequency characteristics of the (1_1)th to (1_N)th filters are set to frequency characteristics different from one another. In this case, as described above, the frequency characteristic of the (1_k)th filter is the same as the frequency characteristic of the (2_k)th filter, and therefore inevitably the respective frequency characteristics of the (2_1)th to (2_N)th filters are set to frequency characteristics different from one another.

Therefore, each of the (1_B)th to (N_B)th increasing/decreasing manipulated variables is a manipulated variable which functions such that the frequency components in frequency ranges different from each other of the deviation between the first estimated value itself and the second estimated value itself converge to zero.

Therefore, in the case where the first estimated value or the second estimated value contains a disturbance component, which is independent of the actual to-be-compared external force, a distinction such as a difference in polarity easily occurs among the (1_B)th to (N+1_B)th (N+1) increasing/decreasing manipulated variables particularly in the vicinity of the zero-cross timing of the actual to-be-compared external force.

Therefore, it is possible to select or combine increasing/decreasing manipulated variables, which are appropriate for updating the estimated value of the friction coefficient, such that the estimated value does not deviate from the actual friction coefficient, from the (N+1) increasing/decreasing manipulated variables.

Therefore, in the second aspect of the invention, the friction coefficient estimated value updating means determines a new estimated value of the estimated value of the friction coefficient by updating the estimated value of the friction coefficient of the road surface according to at least one of the increasing/decreasing manipulated variables, which have been determined by the first to (N+1)th friction coefficient increasing/decreasing manipulated variable determining means, respectively.

This enables the estimated value of the friction coefficient to be updated such that the estimated value does not deviate from the actual friction coefficient in the case where the first estimated value or the second estimated value contains a disturbance component independent of the actual to-be-compared external force (an offset component or the like caused by a drift of an output of sensors for obtaining the observed value).

Therefore, according to the second aspect of the invention, the road surface friction coefficient estimating device is able to accurately and stably estimate the friction coefficient of a road surface on which a vehicle is traveling by preventing an occurrence of a situation where the estimated value of the friction coefficient is updated in a direction of deviating from the actual friction coefficient.

Further, according to a third aspect of the present invention, there is provided a road surface friction coefficient estimating device which estimates a friction coefficient of a road surface, on which a vehicle is traveling, while updating the friction coefficient, including:

a first estimating means of a to-be-compared external force which defines a predetermined type of an external force component acting on a vehicle due to a resultant force of road surface reaction forces acting on each wheel of the vehicle from a road surface as a to-be-compared external force and finds a first estimated value of the to-be-compared external force by using a friction characteristic model representing a relationship between a slip between the wheel of the vehicle and the road surface and a road surface reaction force, an estimated value of a friction coefficient which has been already determined, and an observed value of a predetermined type of a quantity to be observed, which is related to a behavior of the vehicle;

a second estimating means of a to-be-compared external force which finds a value of an external force component balancing out an inertial force corresponding to the to-be-compared external force on the basis of an observed value of a motion state quantity of the vehicle that defines the inertial force, which is a part of an inertial force generated by a motion of the vehicle, and obtains the found value of the external force component as a second estimated value of the to-be-compared external force;

first to N-th friction coefficient increasing/decreasing manipulated variable determining means, which are N (N: 2 or a greater integer) friction coefficient increasing/decreasing manipulated variable determining means, each of which determines an increasing/decreasing manipulated variable of an estimated value of the friction coefficient of the road surface on the basis of at least the first estimated value and the second estimated value; and a friction coefficient estimated value updating means which determines a new estimated value of a friction coefficient by updating the estimated value of the friction coefficient of the road surface on the basis of at least any one of the increasing/decreasing manipulated variables, which have been determined by the first to N-th friction coefficient increasing/decreasing manipulated variable determining means, respectively, wherein:

a k-th friction coefficient increasing/decreasing manipulated variable determining means (k: any one of integers 1 to N), which is any arbitrary one of the first to (N+1)th friction coefficient increasing/decreasing manipulated variable determining means, determines the increasing/decreasing manipulated variable on the basis of at least a deviation between a (1_k)th estimated filtering value obtained by passing the first estimated value through a (1_k)th filter for frequency component adjustment and a (2_k)th estimated filtering value obtained by passing the second estimated value through a (2_k)th filter for frequency component adjustment having the same frequency characteristic as the (1_k)th filter, such that the deviation is converged to zero; and the respective frequency characteristics of the (1__1)th to (1_N)th filters are set to frequency characteristics different from one another (Third aspect of the invention).

According to the third aspect of the invention, specifically the (N+1)th friction coefficient increasing/decreasing manipulated variable determining means is deleted from the second aspect of the invention, and the estimated value of the friction coefficient of the road surface is updated according to at least one of the increasing/decreasing manipulated variables (N increasing/decreasing manipulated variables), which have been determined by the first to N-th friction coefficient increasing/decreasing manipulated variable determining means, respectively. This invention has the same construction as the second aspect of the invention except for these points.

In the third aspect of the invention, similarly to the second aspect of the invention, the frequency characteristic of the (1_k)th filter is the same as that of the (2_k)th filter, and the frequency characteristics of the (1__1)th to (1_N)th filters are set to frequency characteristics different from one another.

Therefore, in the case where the first estimated value or the second estimated value contains a disturbance component, which is independent of the actual to-be-compared external force, a distinction such as a difference in polarity easily occurs among the N increasing/decreasing manipulated variables, which have been determined by the first to N-th friction coefficient increasing/decreasing manipulated variable determining means, particularly in the vicinity of the zero-cross timing of the actual to-be-compared external force.

Therefore, it is possible to select or combine increasing/decreasing manipulated variables, which are appropriate for updating the estimated value of the friction coefficient, such that the estimated value does not deviate from the actual friction coefficient, from the N increasing/decreasing manipulated variables.

Therefore, in the third aspect of the invention, the friction coefficient estimated value updating means determines a new estimated value of the estimated value of the friction coefficient by updating the estimated value of the friction coefficient of the road surface according to at least one of the increasing/decreasing manipulated variables, which have been determined by the first to N-th friction coefficient increasing/decreasing manipulated variable determining means, respectively.

This enables the estimated value of the friction coefficient to be updated such that the estimated value does not deviate from the actual friction coefficient in the case where the first estimated value or the second estimated value contains a disturbance component independent of the actual to-be-compared external force (an offset component or the like caused by a drift of an output of sensors for obtaining the observed value).

Therefore, according to the third aspect of the invention, the road surface friction coefficient estimating device is able to accurately and stably estimate the friction coefficient of a road surface on which a vehicle is traveling by preventing an occurrence of a situation where the estimated value of the friction coefficient is updated in a direction of deviating from the actual friction coefficient.

In the first aspect of the invention, the (1_1)th filter and the (2_1)th filter are filters having low-cut characteristics (Fourth aspect of the invention).

Further, in the second or third aspect of the invention, both filters of at least one of the pairs of the (1_k)th filter and the (2_k)th filter have low-cut characteristics (Fifth aspect of the invention).

In the fourth and fifth aspects of the invention, hereinafter, the description will be given on the assumption that the above pairs of the filters having low-cut characteristics are pairs of a (1_X)th filter and a (2_X)th filter of an X-th friction coefficient increasing/decreasing manipulated variable determining means. In this case, X indicates 1 in the fourth aspect of the invention and any integer value of 1 to N in the fifth aspect of the invention.

According to the fourth and fifth aspects of the invention, in the above X-th friction coefficient increasing/decreasing manipulated variable determining means, the (1_X)th estimated filtering value and (2_X)th estimated filtering value are values obtained by reducing the low-frequency components from the first estimated value and the second estimated value, respectively, in the case where the first estimated value or the second estimated value contains a low-frequency component such as an offset component caused by a drift of sensors.

Therefore, in the vicinity of the zero-cross timing of the actual to-be-compared external force, a distinction such as a difference in polarity easily occurs between the increasing/decreasing manipulated variable, which is determined by the X-th friction coefficient increasing/decreasing manipulated variable determining means, and the increasing/decreasing manipulated variable, which is determined by another friction coefficient increasing/decreasing manipulated variable determining means.

This enables a selection or combination of increasing/decreasing manipulated variables, which are still more preferred to update the estimated value of the friction coefficient such that the estimated value does not deviate from the actual friction coefficient, from the increasing/decreasing manipulated variables determined by all friction coefficient increasing/decreasing manipulated variable determining means including the X-th friction coefficient increasing/decreasing manipulated variable determining means, respectively.

The (1_X)th filter and the (2_X)th filter may be band-pass filters (filters having a low-cut characteristic and a high-cut characteristic in a complex manner). In addition, in the fifth aspect of the invention, there may be a plurality of X-th friction coefficient increasing/decreasing manipulated variable determining means.

In the first to fifth aspects of the invention, the friction coefficient estimated value updating means preferably updates the estimated value of the road surface friction coefficient, more specifically, for example, as described below.

Specifically, the friction coefficient estimated value updating means updates the estimated value of the friction coefficient, for example, according to a manipulated variable obtained by adding up increasing/decreasing manipulated variables, which have been determined by all of the friction coefficient increasing/decreasing manipulated variable determining means, respectively (Sixth aspect of the invention).

In the sixth aspect of the invention, the term "all of the friction coefficient increasing/decreasing manipulated variable determining means" means the first and second friction coefficient increasing/decreasing manipulated variable determining means regarding the first aspect of the invention, the first to (N+1)th friction coefficient increasing/decreasing manipulated variable determining means regarding the second aspect of the invention, and the first to N-th friction coefficient increasing/decreasing manipulated variable determining means regarding the third aspect of the invention. The same applies to the seventh and eighth aspects of the invention described later.

Here, as described above, a distinction such as a difference in polarity easily occurs among the increasing/decreasing manipulated variables determined by the respective friction coefficient increasing/decreasing manipulated variable determining means particularly in the vicinity of the zero-cross timing of the actual to-be-compared external force.

In other words, increasing/decreasing manipulated variables having polarities different from each other are mixed. Therefore, the increasing/decreasing manipulated variables having different polarities get balanced out by adding up the increasing/decreasing manipulated variables determined by all of the friction coefficient increasing/decreasing manipulated variable determining means in the vicinity of the zero-cross timing of the actual to-be-compared external force. Consequently, the manipulated variable obtained by adding up the increasing/decreasing manipulated variables converges to a value within the range in the vicinity of zero in many cases.

As a result, according to the sixth aspect of the invention, it is possible to prevent an updating that causes the estimated value of the friction coefficient to significantly deviate from an actual value in the vicinity of the above zero-cross timing.

Moreover, in a situation where the absolute value of an actual to-be-compared external force is relatively large, the polarities of the increasing/decreasing manipulated variables determined by the respective friction coefficient increasing/decreasing manipulated variable determining means are the same as each other in many cases. Therefore, the manipulated variable obtained by adding up the increasing/decreasing manipulated variables has a polarity in a direction of bringing the estimated value of the friction coefficient close to an actual value, thereby enabling the estimated value of the friction coefficient to be appropriately updated.

Alternatively, the friction coefficient estimated value updating means may update the estimated value of the friction coefficient, for example, according to an increasing/decreasing manipulated variable closest to zero among all of the increasing/decreasing manipulated variables in the case of satisfying a condition that the increasing/decreasing manipulated variables determined by all of the friction coefficient increasing/decreasing manipulated variable determining means, respectively, have the same polarity as one another, and may inhibit the updating of the estimated value of the friction coefficient according to all of the increasing/decreasing manipulated variables in the case where the condition is not satisfied (Seventh aspect of the invention).

According to the seventh aspect of the invention, in the case where the increasing/decreasing manipulated variables, which have been determined by all of the friction coefficient increasing/decreasing manipulated variable determining means, respectively, contain increasing/decreasing manipulated variables having polarities different from each other, the estimated value of the friction coefficient is inhibited from being updated according to those increasing/decreasing manipulated variables.

Then, the increasing/decreasing manipulated variables having polarities different from each other are mixed in the vicinity of the zero-cross timing of the actual to-be-compared external force as described above. Therefore, in the vicinity of the zero-cross timing, the estimated value of the friction coefficient is not updated according to the increasing/decreasing manipulated variables, which have been determined by the friction coefficient increasing/decreasing manipulated variable determining means, respectively.

As a result, the estimated value of the friction coefficient is prevented from deviating from the actual value. In the case where all of the increasing/decreasing manipulated variables have the same polarity as each other, the estimated value of the friction coefficient is updated according to the increasing/decreasing manipulated variable closest to zero among all of the increasing/decreasing manipulated variables.

Therefore, the estimated value of the friction coefficient is able to be updated such that the estimated value is brought close to an actual value appropriately and a rapid change in the estimated value of the friction coefficient is restrained. As a result, the estimated value of the friction coefficient is able to be smoothly converged to an actual value of the friction coefficient.

In the first to seventh aspects of the invention described hereinabove, preferably the road surface friction coefficient estimating device includes a μ sensitivity calculating means, which finds a ratio of an incremental amount of the to-be-compared external force relative to an incremental amount of the friction coefficient of the road surface or finds a value of μ sensitivity, which is a value obtained by dividing the ratio by a value of the friction coefficient of the road surface, and at least one of all the friction coefficient increasing/decreasing manipulated variable determining means is a friction coefficient increasing/decreasing manipulated variable determining means in a μ sensitivity using system, which determines the increasing/decreasing manipulated variable according to the deviation and the value of the μ sensitivity or a μ sensitivity dependent value, which is obtained by passing the value of the μ sensitivity through at least one or both of a filter for frequency component adjustment and a saturation characteristic element (Eighth aspect of the invention).

In the eighth aspect of the invention, a filter through which the value of the μ sensitivity is passed may be a filter having a low-cut characteristic, a high-cut characteristic, or a band-pass characteristic.

In this case, in the case where the friction coefficient increasing/decreasing manipulated variable determining means in the μ sensitivity using system is a friction coefficient increasing/decreasing manipulated variable determining means having filters through which the first estimated value and the second estimated value are passed (for example, the (1_1)th filter and the (2_1)th filter), respectively, the frequency characteristics of the filters through which the value of the μ sensitivity is passed are preferably the same as the frequency characteristic having the same tendency as the filters through which the first estimated value and the second estimated value are passed, respectively, in the friction coefficient increasing/decreasing manipulated variable determining means.

Moreover, the saturation characteristic element has a characteristic such that the rate of change in the output of the saturation characteristic element relative to a change in the value of the μ sensitivity decreases as the magnitude of the value (the absolute value) of the μ sensitivity increases.

In this case, the rate of change in the output of the saturation characteristic element relative to a change in the value of the μ sensitivity may change continuously along with the change in the value of the μ sensitivity, while the rate of change may change discontinuously.

According to the eighth aspect of the invention, the μ sensitivity calculating means finds the value of the μ sensitivity. Here, the value of the μ sensitivity close to zero means the ratio of an incremental amount of the to-be-compared external force relative to an incremental amount of the friction coefficient of the road surface close to zero. Therefore, the closer to zero the value of the μ sensitivity is, the more the actual to-be-compared external force is insusceptible to an influence of a change in the actual friction coefficient of the road surface.

Therefore, in the case where the increasing/decreasing manipulated variable is determined according to the deviation such as a deviation between the first estimated value and the second estimated value, it is conceivable that the magnitude of a gain value (feedback gain), which is a ratio of a change in the increasing/decreasing manipulated variable relative to a change in the deviation, is preferably reduced when the magnitude of the μ sensitivity is small.

Therefore, according to the eighth aspect of the invention, at least one of all of the friction coefficient increasing/decreasing manipulated variable determining means is considered as a friction coefficient increasing/decreasing manipulated variable determining means in the μ sensitivity using system, and each friction coefficient increasing/decreasing manipulated variable determining means in the μ sensitivity using system determines the increasing/decreasing manipulated variable according to the deviation and the value of the μ sensitivity or the μ sensitivity dependent value.

Thereby, each friction coefficient increasing/decreasing manipulated variable determining means in the μ sensitivity using system is able to determine the increasing/decreasing manipulated variable such that the magnitude of the gain value decreases as the magnitude of the μ sensitivity is small. Consequently, this enables the prevention of determining the increasing/decreasing manipulated variable that excessively changes the estimated value of the friction coefficient in a situation where the magnitude of the μ sensitivity decreases.

In the eighth aspect of the invention, naturally all of the friction coefficient increasing/decreasing manipulated variable determining means may be friction coefficient increasing/decreasing manipulated variable determining means in the μ sensitivity using system.

In the eight aspect of the invention, preferably each friction coefficient increasing/decreasing manipulated variable determining means in the μ sensitivity using system determines the increasing/decreasing manipulated variable according to a product of the deviation and the value of the μ sensitivity or the μ sensitivity dependent value (hereinafter, the product is referred to as "deviation-pt-sensitivity product" in some cases) (Ninth aspect of the invention).

According to the ninth aspect of the invention, as the magnitude of the value of the μ sensitivity gets closer to zero, the deviation-μ-sensitivity product also gets closer to zero. Therefore, each friction coefficient increasing/decreasing manipulated variable determining means in the μ sensitivity using system is able to determine the increasing/decreasing manipulated variable such that, as the value of the μ sensitivity gets closer to zero, the magnitude of the gain value becomes smaller, by determining the increasing/decreasing manipulated variable according to the deviation-μ-sensitivity product.

In the ninth aspect of the invention, in determining the increasing/decreasing manipulated variable according to the deviation-μ-sensitivity product, the increasing/decreasing manipulated variable may be determined according to the deviation-μ-sensitivity product, for example, such that the increasing/decreasing manipulated variable is proportional to the deviation-μ-sensitivity product.

In the first to ninth aspects of the invention described hereinabove, preferably the to-be-compared external force is a moment about a yaw axis at a neutral steer point (hereinafter, referred to as "NSP" in some cases) of the vehicle (hereinafter, the moment is referred to as "NSP yaw moment" in some cases) (Tenth aspect of the invention).

Specifically, according to the findings of the present inventor, the aforesaid NSP yaw moment has dependency upon the friction coefficient of the road surface while the NSP yaw moment is insusceptible to an influence of the state quantity of a skid motion of the center of gravity of the vehicle and a bank angle of the road surface. Therefore, in the case where the NSP yaw moment is an external force to be compared, the deviation such as a deviation between the first estimated value and the second estimated value gets more dependent on an error of the aforesaid determined estimated value of the friction coefficient.

Therefore, each friction coefficient increasing/decreasing manipulated variable determining means determines the increasing/decreasing manipulated variable such that the deviation is converged to zero, thereby enabling the determination of an increasing/decreasing manipulated variable that is able to appropriately eliminate the error of the estimated value of the friction coefficient.

In the case of using the NSP yaw moment as the aforesaid to-be-compared external force as described in the tenth aspect of the invention, preferably the road surface friction coefficient estimating device includes an acceleration sensor, which generates an output according to the lateral acceleration of the vehicle, and the observed value of the motion state quantity of the vehicle for use in finding the second estimated value of the NSP yaw moment includes an observed value of the acceleration indicated by the output of the acceleration sensor (an output according to the lateral acceleration of the vehicle).

Supplementally, in the case of using the NSP yaw moment as the to-be-compared external force, the aforesaid second estimating means of the to-be-compared external force uses an observed value of a state quantity related to a rotational motion about the yaw axis of the vehicle (for example, an observed value of a yaw rate or an observed value of a temporal change rate of the yaw rate) and a value of the lateral acceleration of the vehicle indicated by the output of the aforesaid acceleration sensor, for example, as the observed value of the aforesaid motion state quantity, so as to find the NSP yaw moment from these observed values.

For example, in the case where the acceleration sensor is used to observe (detect) the lateral acceleration at the center-of-gravity point of the vehicle and the yaw rate sensor is used to observe (detect) the yaw rate of the vehicle, the second estimated value of the NSP yaw moment is a moment achieved by combining a moment, which is obtained by multiplying the observed value of the acceleration by the vehicle mass and a distance from the center-of-gravity point of the vehicle to the NSP, with a moment, which is obtained by multiplying the temporal change rate (differential value) of the observed value of the yaw rate by an inertia moment about the yaw axis at the center-of-gravity point of the vehicle.

Moreover, the NSP yaw moment is generated according to the lateral force (the translational force component in the lateral direction of the wheel) and the driving/braking force (the translational force component in the longitudinal direction of the wheel) of the road surface reaction force acting on each wheel, and the NSP yaw moment is highly dependent particularly upon the lateral force.

Therefore, the first estimating means of the to-be-compared external force is able to estimate the lateral force out of the road surface reaction force acting on each wheel of the vehicle or both of the lateral force and the driving/braking force on the basis of the friction characteristic model, the determined estimated value of the friction coefficient, and the observed value of the quantity to be observed and to find a first estimated value of the NSP yaw moment by using the estimated value of the lateral force or the estimated values of the lateral force and the driving/braking force.

In the case of estimating the lateral force of each wheel, as the friction characteristic model, for example, it is possible to use a model which represents a relationship among the slip rate of each wheel of the vehicle or the driving/braking force of the road surface reaction force acting on the wheel, the lateral force of the road surface reaction force, the skid angle of the wheel, and the friction coefficient of the road surface. In this case, as the predetermined type of a quantity to be observed, a quantity to be observed, which is required to identify the slip rate of each wheel or the driving/braking force and the skid angle, may be selected in advance.

Further, in the case of estimating the lateral force and the driving/braking force of each wheel, as the friction characteristic model, for example, it is possible to use a first model, which represents a relationship among a slip rate of each wheel of the vehicle, the driving/braking force of the road surface reaction force acting on the wheel, the skid angle of the wheel, and the friction coefficient of the road surface, and a second model, which represents a relationship among a slip rate of each wheel of the vehicle or the driving/braking force of the road surface reaction force acting on the wheel, the lateral force of the road surface reaction force, the skid angle of the wheel, and the friction coefficient of the road surface. In this case, as the predetermined type of a quantity to be observed, a quantity to be observed, which is required to identify the slip rate of each wheel and the skid angle, may be selected in advance.

Further, in the eighth or ninth aspect of the invention including the μ sensitivity calculating means, in the case of using the NSP yaw moment as the to-be-compared external force, preferably the μ sensitivity calculating means finds the value of the μ sensitivity by linearly combining an observed value of a steering angle of a steering wheel out of the wheels of the vehicle and an observed value of a yaw rate of the vehicle (11th aspect of the invention).

Specifically, according to the study by the inventor of the present application, in a straight traveling state of the vehicle or a state similar thereto, in other words, in a state where both of an actual yaw rate and the skid angle of the vehicle are zero or close to zero, the magnitude of the μ sensitivity tends to be small.

Moreover, the μ sensitivity is able to be approximately estimated by linearly combining the observed value of the steering angle of a steering wheel out of the wheels of the vehicle with the observed value of the yaw rate of the vehicle. Further, in this case, the μ sensitivity obtained by the linear combination becomes zero or close thereto without being affected by the bank angle of the road surface or the like when the traveling state of the vehicle is put in the straight traveling state or a state similar thereto. Therefore, according to the 11th aspect of the invention, the magnitude of the value of the μ sensitivity calculated by the μ sensitivity calculating means is able to be reduced when the traveling state of the vehicle is the straight traveling state or a state similar thereto.

As a result, in the state, each friction coefficient increasing/decreasing manipulated variable determining means in the μ sensitivity using system is able to determine the increasing/decreasing manipulated variable such that the magnitude of the gain value is reduced. Consequently, in the state, it is possible to prevent each friction coefficient increasing/decreasing manipulated variable determining means in the μ sensitivity using system from determining the increasing/decreasing manipulated variable that excessively changes the estimated value of the friction coefficient.

In the 11th aspect of the invention, more preferably the μ sensitivity calculating means sets at least one of a weighting factor applied to the observed value of the steering angle and a weighting factor applied to the observed value of the yaw rate in the linear combination on the basis of an observed value of a vehicle speed of the vehicle such that the mutual ratio of both weighting factors changes according to the vehicle speed, and uses the set weighting factor to compute the linear combination (12th aspect of the invention).

This arrangement enables an increase in the reliability of the value of the μ sensitivity, which is calculated by the μ sensitivity calculating means. Consequently, the increasing/decreasing manipulated variable, on which the value of the μ sensitivity is reflected, can be determined favorably.

The μ sensitivity calculating means according to the 12th aspect of the invention is able to appropriately find the value of the μ sensitivity, which is reliable to determine the increasing/decreasing manipulated variable, for example, by the computation of the linear combination represented by expression 5-7 described later.

In this case, in other words, the linear combination represented by expression 5-7 is configured as a linear combination in which the value of the μ sensitivity is determined such that the value of the μ sensitivity is proportional to the value of the NSP yaw moment, which is identified by using a linear two-wheeled vehicle model from the observed value of the steering angle of a steering wheel among the wheels of the vehicle, the observed value of the yaw rate of the vehicle, and the observed value of the vehicle speed of the vehicle, on the assumption that the friction coefficient of the road surface takes a constant value in the linear two-wheeled vehicle model, which approximately represents the skid motion and the rotational motion about the yaw axis of an actual vehicle as a behavior of a model vehicle having a front wheel as a steering wheel and a rear wheel as a non-steering wheel.

Supplementally, in the tenth to 12th aspects of the invention in which the NSP yaw moment is used as the to-be-compared external force, the first estimating means of the to-be-compared external force is configured more specifically, for example, as described below.

To be more specific, the first estimating means of the to-be-compared external force is a means, which has vehicle motion/road surface reaction force estimating means which estimates at least the lateral force of the road surface reaction force acting on each wheel while estimating at least a skid motion state quantity of the motion state quantity of the vehicle generated by the resultant force of the road surface reaction forces acting on each wheel of the vehicle, and which finds the first estimated value of the NSP yaw moment by using the estimated value of the lateral force, which has been found by the vehicle motion/road surface reaction force estimating means. The vehicle motion/road surface reaction force estimating means includes: a means which finds the estimated value of a skid angle as the slip of each wheel of the vehicle by using the observed value of the quantity to be observed and the estimated value of the skid motion state quantity of the vehicle that has already been found; a means which inputs at least the estimated value of the skid angle of each wheel and the estimated value of the friction coefficient of the road surface that has been already determined to the friction characteristic model so as to find the estimated value of the lateral force acting on each wheel by the friction characteristic model; and a means which finds a new estimated value of the skid motion state quantity of the vehicle by using a dynamic relationship between the resultant force of road surface reaction forces including at least the lateral force acting on each wheel and the skid motion state quantity of the vehicle and the estimated value of the lateral force acting on each wheel (13th aspect of the invention).

In the 13th aspect of the invention in which the first estimating means of the to-be-compared external force is configured as described above, the vehicle motion/road surface reaction force estimating means finds the estimated value of the skid angle as the slip of each wheel of the vehicle by using the observed value of the quantity to be observed and the estimated value of the skid motion state quantity of the vehicle that has already been found. In this case, the skid motion state quantity of the vehicle is, for example, the skid angle or the skid speed of the center-of-gravity point of the vehicle.

The estimated value of the skid motion state quantity of the vehicle that has already been found (hereinafter referred to as "determined estimated value" in some cases) is preferably a latest value among the estimated values that have already been determined. However, the value may be older than the latest value if the value lies in a sufficiently short period of time wherein the skid motion state quantity is maintained substantially constant.

Further, as the observed value of the quantity to be observed, the observed value of the quantity to be observed that is necessary to estimate the skid angle of each wheel (e.g., the yaw rate of the vehicle, the steering angle of a steering wheel, and a vehicle speed) may be used in combination with the determined estimated value of the skid motion state quantity of the vehicle. For example, the estimated value of the moving speed of a ground contact portion of each wheel can be found from the observed value of a vehicle speed, the determined estimated value of a skid motion state quantity of the vehicle, and the observed value of the yaw rate of the vehicle. Furthermore, the estimated value of the skid angle of each wheel, including the steering wheel, can be found from the estimated value of the moving speed and the observed value of the steering angle of the steering wheel.

Then, the vehicle motion/road surface reaction force estimating means inputs the estimated value of the skid angle of each wheel and the determined estimated value of the friction coefficient into the friction characteristic model thereby to find the estimated value of the lateral force acting on each wheel from the friction characteristic model. Here, the skid motion of the vehicle is generated primarily due to the resultant force of the lateral forces acting on the wheels.

Therefore, in the 13th aspect of the invention, the vehicle motion/road surface reaction force estimating means finds the new estimated value of the skid motion state quantity of the vehicle by using a dynamic relationship between the resultant force of road surface reaction forces including at least the lateral force acting on each wheel and the skid motion state quantity of the vehicle (e.g., a relationship represented by a motion equation related to the lateral translational motion of the center-of-gravity point of the vehicle) and the estimated value of the lateral force acting on each wheel.

Thus, according to the 13th aspect of the invention, it is possible to estimate the lateral force acting on each wheel while estimating the skid angle of each wheel, i.e., the skid motion state quantity of the vehicle necessary to estimate the lateral force. In this case, as described above, the NSP yaw moment is insusceptible to an influence of the state quantity of the skid motion of the center of gravity of the vehicle. Therefore, it is possible to estimate the skid motion state quantity of the vehicle in parallel with estimating the friction coefficient of the road surface while preventing an error of the estimated value of the skid motion state quantity from affecting the accuracy of the estimated value of the friction coefficient of the road surface.

Alternatively, in the tenth to 12th aspects of the invention, the first estimating means of the to-be-compared external force may be configured, for example, as described below. Specifically, the first estimating means of the to-be-compared external force is a means, which has a vehicle motion/road surface reaction force estimating means which estimates the driving/braking force and the lateral force of a road surface reaction force acting on each wheel while estimating at least the skid motion state quantity among the state quantity of a motion of the vehicle generated by the resultant force of the road surface reaction forces acting on the wheel of the vehicle, and which finds the first estimated value of the moment about the yaw axis at the neutral steer point by using the estimated value of the lateral force, which has been found by the vehicle motion/road surface reaction force estimating means. The vehicle motion/road surface reaction force estimating means includes: a means which finds the estimated values of a slip rate and a skid angle indicative of the slip of each wheel of the vehicle by using the observed value of the quantity to be observed and the estimated value of the skid motion state quantity of the vehicle that has already been found; a means which inputs at least the estimated values of the slip rate and the skid angle of each wheel and the estimated value of the friction coefficient of the road surface which has already been determined into the friction characteristic model so as to find the estimated values of the driving/braking force and the lateral force acting on each wheel from the friction characteristic model; and a means which finds a new estimated value of the skid motion state quantity of the vehicle by using a dynamic relationship between the resultant force of the road surface reaction forces, including at least the driving/braking force and the lateral force acting on each wheel, and the skid motion state quantity of the vehicle and the estimated value of the lateral force acting on each wheel (14th aspect of the invention).

In the 14th aspect of the invention in which the first estimating means of the to-be-compared external force is configured as described above, the vehicle motion/road surface reaction force estimating means uses the observed value of the quantity to be observed and the estimated value of the skid motion state quantity of the vehicle, which has already been found, so as to find the estimated values of the slip rate and the skid angle as a slip of each wheel of the vehicle. In this case, the skid motion state quantity of the vehicle may be, for example, the skid angle or a skid speed of the center-of-gravity point of the vehicle.

The estimated value of the skid motion state quantity of the vehicle that has already been found (the determined estimated value) is preferably a latest value among already determined estimated values, as with the 13th aspect of the invention. However, the value may be older than the latest value if the value lies in a sufficiently short time of period wherein the skid motion state quantity is maintained substantially constant.

As the observed value of the quantity to be observed, the observed value of a quantity to be observed necessary to estimate the slip rate and the skid angle of each wheel (e.g., the yaw rate of the vehicle, the steering angle of the steering wheel, or the vehicle speed) may be used in combination with the determined estimated value of the skid motion state quantity of the vehicle. For example, the estimated value of the moving speed of the ground contact portion of each wheel can be determined from the observed value of the vehicle speed, the determined estimated value of the skid motion state quantity of the vehicle, and the observed value of the yaw rate of the vehicle. Then, the estimated value of the skid angle of each wheel, including the steering wheel, can be found from the estimated value of the moving speed and the observed value of the steering angle of the steering wheel. Further, the estimated value of the slip rate of each wheel, including the steering wheel, can be determined from the estimated value of the moving speed of the ground contact portion of each wheel, the observed value of the vehicle speed, and the observed value of the steering angle of the steering wheel.

Then, the vehicle motion/road surface reaction force estimating means inputs the estimated values of the skid angle and the slip rate of each wheel and the determined estimated value of the friction coefficient into the friction characteristic model so as to find, from the friction characteristic model, the estimated values of the lateral force and the driving/braking force acting on each wheel.

Further, the vehicle motion/road surface reaction force estimating means finds a new estimated value of the skid motion state quantity of the vehicle by using a dynamic relationship between the resultant force of the road surface reaction forces, including at least the driving/braking force and the lateral force acting on each wheel, and the skid motion state quantity of the vehicle (e.g., a relationship represented by a motion equation related to the lateral translational motion of the center-of-gravity point of the vehicle) and the estimated values of the driving/braking force and the lateral force acting on each wheel.

Thus, according to the 14th aspect of the invention, it is possible to estimate the driving/braking force and the lateral force acting on each wheel while estimating the slip rate and the skid angle of each wheel, i.e., the skid motion state quantity of the vehicle necessary to estimate the driving/braking force and the lateral force. In this case, similarly to the 13th aspect of the invention, it is possible to estimate the skid motion state quantity of the vehicle in parallel with estimating the friction coefficient of the road surface while preventing an error of the estimated value of the skid motion state quantity from affecting the accuracy of the estimated value of the friction coefficient of the road surface.

MODE FOR CARRYING OUT THE INVENTION

Hereinafter, the embodiments of the present invention will be described. First, the schematic configuration of a vehicle in each of the embodiments in the present specification will be described with reference to FIG. 1.

Figure 1:
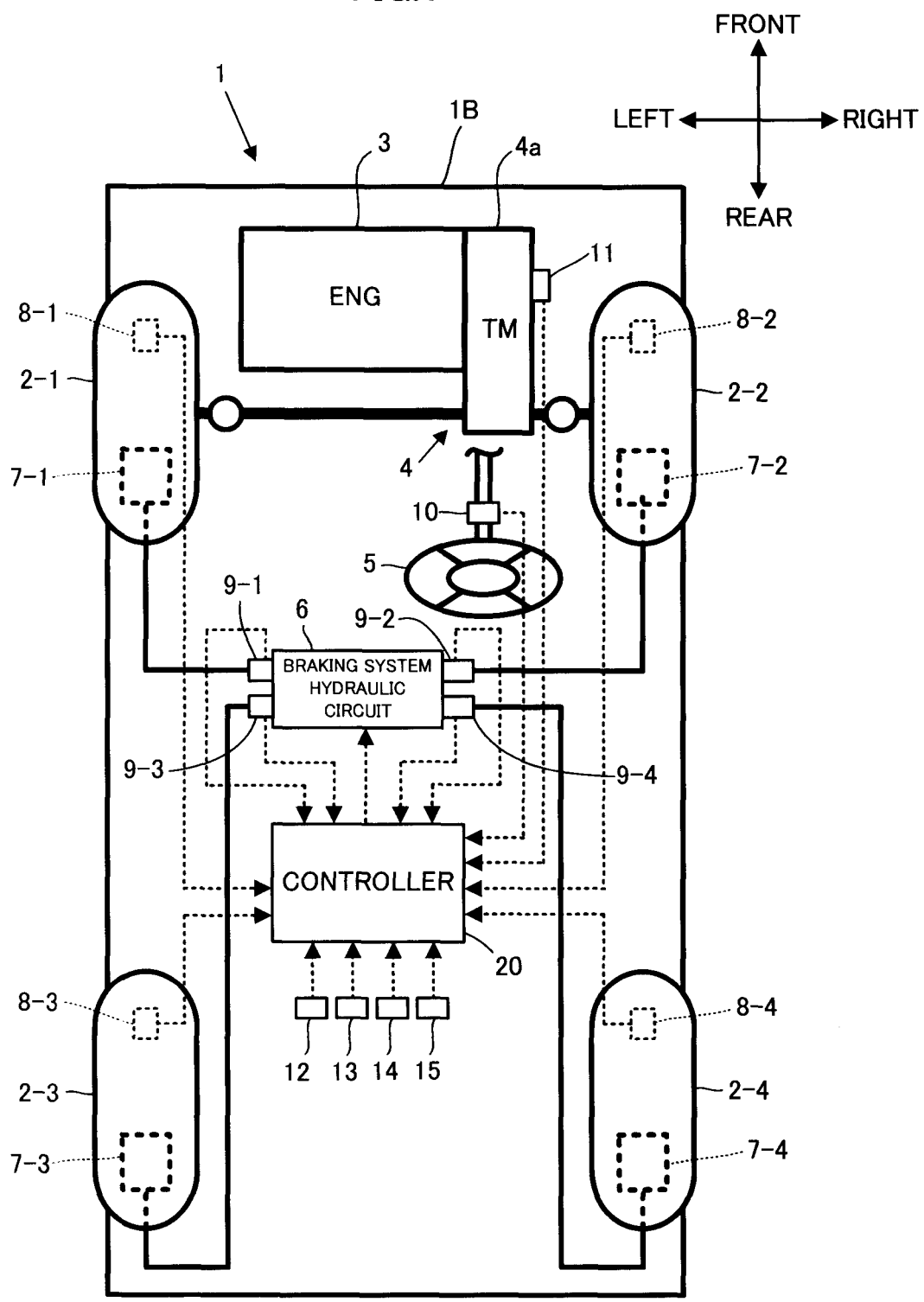
FIG. 1 is a diagram illustrating the schematic configuration of a vehicle in an embodiment.

As illustrated in FIG. 1, a vehicle 1 has a plurality of wheels $2\text{-}i$ ($i=1, 2, \ldots$), a vehicle body 1B being supported on the wheels $2\text{-}i$ ($i=1, 2, \ldots$) through suspension devices, which are not shown. More specifically, the vehicle 1 according to each of the embodiments has a total of four wheels $2\text{-}i$ ($i=1, 2, 3, 4$), namely, a pair of right and left front wheels 2-1, 2-2 and a pair of right and left rear wheels 2-3, 2-4. In this case, the front wheels 2-1 and 2-2 among the wheels $2\text{-}i$ ($i=1, 2, 3, 4$) are driving wheels functioning as steering wheels, while the rear wheels 2-3 and 2-4 are driven wheels and non-steering wheels.

In the following description, the front left wheel 2-1 of the vehicle 1 will be referred to as the first wheel 2-1, the front right wheel 2-2 will be referred to as the second wheel 2-2, the rear left wheel 2-3 will be referred to as the third wheel 2-3, and the rear right wheel 2-4 will be referred to as the fourth wheel 2-4 in some cases. Further, any one wheel among the wheels $2\text{-}i$ ($i=1, 2, 3, 4$) will be represented simply as "wheel $2\text{-}i$" or "i-th wheel $2\text{-}i$," omitting the description indicated by ($i=1, 2, 3, 4$), in some cases. A suffix "i" will be added to the reference numeral of an element related to each i-th wheel $2\text{-}i$ among elements (parts, physical quantities, and the like) other than the wheels $2\text{-}i$ ($i=1, 2, 3, 4$). In this case, for an element corresponding to one particular wheel among the wheels $2\text{-}i$ ($i=1, 2, 3, 4$), the value of i (1 or 2 or 3 or 4) corresponding to a particular wheel will be added in place of the suffix "i."

The vehicle 1 has a drive system for rotatively driving the driving wheels. The drive system has an engine 3 serving as a motive power generating source mounted on the vehicle body 1B in each of the embodiments. Then, the drive system transmits the motive power (output torque) of the engine 3 to the front wheels 2-1 and 2-2 serving as the driving wheels through a motive power transmission mechanism 4, which includes a transmission 4a, thereby rotatively driving the front wheels 2-1 and 2-2. In this case, the motive power of the engine 3 is controlled on the basis of the amount of depression of an accelerator pedal, which is not shown, of the vehicle 1.

In addition, the vehicle 1 is further provided with a steering system for steering the steering wheels. In each of the embodiments, the steering system has a steering wheel 5 disposed at the front in a driver's seat of the vehicle body 1B. Then, the steering system steers the front wheels 2-1 and 2-2 acting as the steering wheels by a steering mechanism, not shown, according to the rotational operation of the steering wheel 5 in an interlocked manner. The steering mechanism is formed of, for example, a mechanical steering mechanism, such as a rack and pinion or the like or a steering mechanism with an actuator, which has a steering actuator, such as an electric motor (a so-called power steering device).

The vehicle 1 further includes a braking system for braking the travel of the vehicle 1. The braking system in each of the embodiments has a frictional braking mechanism $7\text{-}i$ ($i=1, 2, 3, 4$), such as a disc brake, for each wheel $2\text{-}i$. Each of these braking mechanisms $7\text{-}i$ ($i=1, 2, 3, 4$) is connected to a braking system hydraulic circuit 6, and a hydraulic pressure (brake pressure) supplied from the braking system hydraulic circuit 6 generates a braking force for braking the rotation of a corresponding wheel $2\text{-}i$. In this case, the braking system hydraulic circuit 6 basically applies a brake pressure based on the amount of depression of the brake pedal (force on the pedal) to each braking mechanism $7\text{-}i$ by interlocking with the operation of depressing the brake pedal (not shown) of the vehicle 1. Further, in the vehicle 1 of each of the embodiments, the braking system hydraulic circuit 6 is capable of adjusting the brake pressure (consequently, the braking force on each wheel $2\text{-}i$) applied to each braking mechanism $7\text{-}i$ in response to a control command received from a controller 20, which is described later.

The vehicle 1 further includes a variety of sensors for detecting quantities to be observed, which will be discussed later, and the controller 20, which controls the behaviors and the like of the vehicle 1, in addition to the drive system, the steering system, and the braking system. In each of the embodiments, the vehicle 1 is provided with sensors such as, for example, wheel rotational angular velocity sensors $8\text{-}i$ ($i=1, 2, 3, 4$), which generate outputs based on the rotational angular velocity of each wheel $2\text{-}i$, brake pressure sensors $9\text{-}i$ (i=1, 2, 3, 4), which generate outputs based on the brake pressures supplied to the braking mechanism 7-$i$ of each wheel 2-$i$, a steering control angle sensor 10, which generates an output based on the steering angle (rotational angle) of the steering wheel 5, a transmission sensor 11, which generates an output based on the operating state (a transmission gear ratio or the like) of the transmission 3, an acceleration sensor 12, which generates an output based on the amount of depression of the accelerator pedal (not shown) of the vehicle 1, a yaw rate sensor 13, which generates an output based on a yaw rate, which is an angular velocity about the yaw axis of the vehicle 1 (about the vertical axis of the vehicle body 1B), a longitudinal acceleration sensor 14, which generates an output based on the acceleration in the direction of the roll axis (the longitudinal direction of the vehicle body 1B) of the vehicle 1, and a lateral acceleration sensor 15, which generates an output based on the acceleration in the direction of the pitch axis of the vehicle 1 (the lateral direction (horizontal direction) of the vehicle body 1B).

The controller 20 is an electronic circuit unit, which includes a CPU, a RAM, a ROM, and the like, and receives outputs (detection data) of the aforesaid sensors. The controller 20 then carries out predetermined arithmetic processing based on a program, which has been installed beforehand, while using the received detection data and set data, which has been stored and retained in advance, thereby controlling the behaviors of the vehicle 1.

In this case, the controller 20 has a function for controlling a behavior of the vehicle 1, such as a rotational motion about the yaw axis (turning motion) or a skid motion, to a desired behavior by, for example, controlling the braking force of each wheel 2-$i$ supplied by each braking mechanism 7-$i$ through the braking system hydraulic circuit 6.

Further, the controller 20 also has a function of sequentially estimating a friction coefficient or the like of the road surface on which the vehicle 1 is traveling, in order to carry out the processing of controlling the behavior of the vehicle 1. The estimated friction coefficient is used to estimate, for example, the state quantity (a skid angle, a skid speed, or the like) of the skid motion of the vehicle 1 or to determine a desired behavior of the vehicle 1.

The above has described the schematic configuration of the vehicle 1 in each embodiment to be described in the present specification.

The vehicle to which the present invention applies is not limited to the vehicle 1 having the configuration described above. For example, the motive power generating source of the drive system of the vehicle 1 may be an electric motor. Alternatively, both an engine and an electric motor may be installed in the vehicle 1 as motive power generating sources. The driving wheels of the vehicle 1 may alternatively be the rear wheels 2-3 and 2-4, or both the front wheels 2-1, 2-2 and the rear wheels 2-3, 2-4. Further, the drive system may be constructed so as to be capable of individually adjusting the driving force to be supplied to each driving wheel from a motive power generating source. The steering system of the vehicle 1 may be constructed to steer the rear wheels 2-3 and 2-4 by actuators appropriately in addition to steering the front wheels 2-1 and 2-2 by interlocking with the rotational operation of the steering wheel 5. The number of wheels does not have to be four.

Figures 2A, 2B:
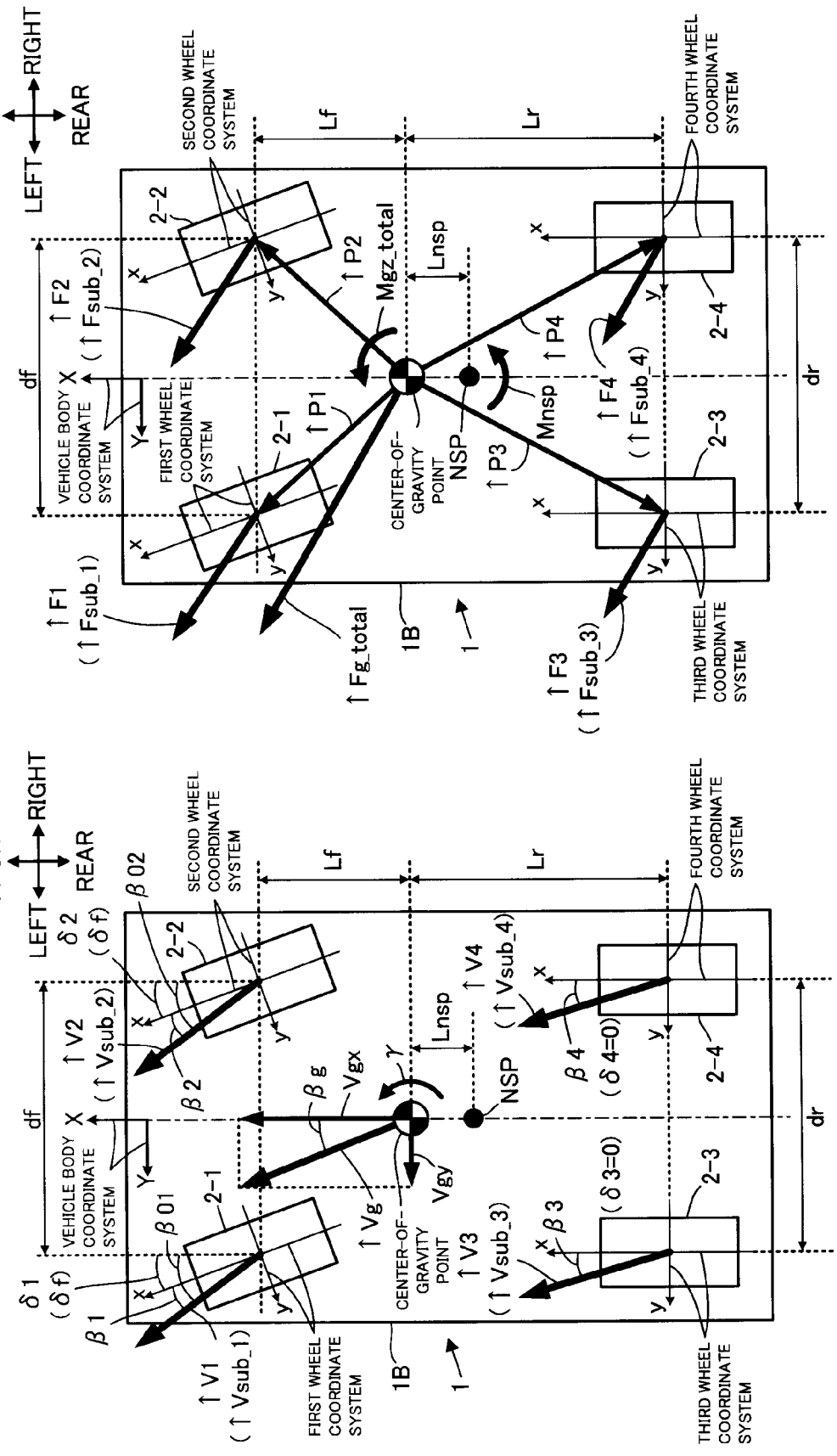
FIGS. 2(a) and 2(b) are diagrams visually illustrating representative reference characters used in the description of the embodiment.

Referring now to FIGS. 2($a$) and 2($b$), major reference characters (variables) and terms used in the following description of each embodiment is described below.

In FIGS. 2($a$) and 2($b$), variables preceded by "↑," such as ↑V1 and ↑F1, denote vector quantities. A vector quantity is expressed in the form of a column vector (a transposed vector of a row vector) when the components are represented using an appropriate coordinate system. In the description of each embodiment, "×" is used as the arithmetic symbol of the multiplication of vector quantities (namely, an exterior product), while "*" is used as the arithmetic symbol of multiplication other than exterior products, such as the multiplication of scalar quantities or the multiplication of a scalar quantity and a vector quantity. To represent the transposition of a row vector, a superscript "T" is attached at top right of a component of the row vector.

In a vehicle body coordinate system, the longitudinal direction of the vehicle body 1B is an X-axis direction, while the lateral direction (the horizontal direction) of the vehicle body 1B is a Y-axis direction. In this case, the front direction of the vehicle body 1B is defined as the positive direction of the X-axis, while the left direction of the vehicle body 1B is defined as the positive direction of the Y-axis. The X-axis direction of the vehicle body coordinate system may be referred to simply as the longitudinal direction or the direction of the roll axis of the vehicle 1 in some cases. Further, the Y-axis direction of the vehicle coordinate system may be referred to simply as the lateral direction or the direction of the pitch axis of the vehicle 1 in some cases. In addition, the direction of the yaw axis of the vehicle 1 (the vertical direction of the vehicle body 1B) is orthogonal to an XY plane of the vehicle body coordinate system (orthogonal to the X-axis and the Y-axis).

An i-th wheel coordinate system is a coordinate system in which a direction parallel to the rotational surface of an i-th wheel 2-$i$ (a plane orthogonal to the rotational axis of the i-th wheel 2-$i$), which is the longitudinal direction of the i-th wheel 2-$i$, is defined as the direction of the x-axis and the direction parallel to the rotational axis of an i-th wheel 2-$i$, which is the horizontal direction (lateral direction) of the i-th wheel 2-$i$, is defined as the direction of the y-axis when the vehicle 1 is observed from above in the direction of the yaw axis. In this case, the front direction of the i-th wheel 2-$i$ is defined as the positive direction of the x-axis and the left direction of the i-th wheel 2-$i$ is defined as the positive direction of the y-axis. An xy plane of the i-th wheel coordinate system is parallel to an XY plane of the vehicle body coordinate system and orthogonal to the direction of the yaw axis of the vehicle 1.

Supplementally, the term "orthogonal" and "parallel" in the present specification do not mean only orthogonal and parallel in strict senses, but the terms may mean approximately orthogonal or parallel.

A reference character "$\delta i$" denotes the rudder angle (hereinafter referred to simply as the wheel rudder angle) of the i-th wheel 2-$i$. More specifically, each wheel rudder angle $\delta i$ is an angle formed by the rotational surface of the i-th wheel 2-$i$ relative to the x-axis direction of the vehicle body coordinate system when the vehicle 1 is observed from above in the yaw-axis direction. In the vehicle 1 according to the embodiment, the rear wheels 2-3 and 2-4 are non-steering wheels, so that $\delta 3 = \delta 4 = 0$ always applies.

A reference character "↑Vg" denotes the moving speed vector of the center-of-gravity point of the vehicle 1 relative to a road surface (hereinafter referred to as "vehicle center-of-gravity velocity vector") observed by being projected onto the XY plane of the vehicle body coordinate system. The vehicle center-of-gravity velocity vector ↑Vg is a vector composed of a component in the X-axis direction and a component in the Y-axis direction of the vehicle body coordinate system. In this case, the component in the X-axis direction of the vehicle center-of-gravity velocity vector ↑Vg will be denoted by ↑gx and will be referred to as the vehicle centerof-gravity longitudinal velocity Vgx, and the component in the Y-axis direction will be denoted by Vgy and will be referred to as the vehicle center-of-gravity skid speed Vgy. In other words, the vehicle center-of-gravity longitudinal velocity Vgx means the traveling speed (vehicle speed) of the vehicle 1. Although not shown in FIGS. 2(a) and 2(b), a temporal change rate (differential value) of the vehicle center-of-gravity longitudinal velocity Vgx will be referred to as the vehicle center-of-gravity longitudinal velocity change rate Vgdot_x and a temporal change rate (differential value) of the vehicle center-of-gravity skid speed Vgy will be referred to as the vehicle center-of-gravity skid speed change rate Vgdot_y.

A reference character "βg" denotes a skid angle of the center-of-gravity point of the vehicle 1 (hereinafter referred to as the vehicle center-of-gravity skid angle). More specifically, the vehicle center-of-gravity skid angle βg is the angle formed by the vehicle center-of-gravity velocity vector ↑Vg with respect to the X-axis direction of the vehicle body coordinate system. Thus, $\beta g = \tan^{-1}(Vgy/Vgx)$ holds.

A reference character "↑Vi" denotes the moving speed vector of a ground contact portion of the i-th wheel 2-i relative to a road surface (hereinafter referred to as the advancing speed vector of the i-th wheel 2-i or simply as the wheel advancing speed vector), as observed by being projected onto the XY plane of the vehicle body coordinate system. Each wheel advancing speed vector ↑Vi is a vector composed of a component in the X-axis direction and a component in the Y-axis direction of the vehicle body coordinate system. In this case, although not shown in FIGS. 2(a) and 2(b), the component in the X-axis direction of each wheel advancing speed vector ↑Vi will be denoted by Vx_i and the component in the Y-axis direction thereof will be denoted by Vy_i.

A reference character "↑Vsub_i" denotes a moving speed vector of the ground contact portion of the i-th wheel 2-i relative to the road surface (hereinafter referred to as the wheel advancing speed vector on the wheel coordinate system), as observed by being projected onto the xy plane of the i-th wheel coordinate system. The wheel advancing speed vector on each wheel coordinate system ↑Vsub_i is a vector composed of a component in the x-axis direction and a component in the y-axis direction of the i-th wheel coordinate system. In this case, although not illustrated in FIGS. 2(a) and 2(b), the component in the x-axis direction of the wheel advancing speed vector on each wheel coordinate system ↑Vsub_i will be denoted by Vsubx_i, while the component in the y-axis direction of the wheel advancing speed vector on each wheel coordinate system ↑Vsub_i will be denoted by Vsuby_i. The wheel advancing speed vector on the wheel coordinate system ↑Vsub_i of each wheel 2-i and the wheel advancing speed vector ↑Vi are vector quantities sharing the same spatial orientation and magnitude except that the coordinate systems for representing the vector quantities are different.

A reference character "βi" denotes a skid angle (hereinafter referred to simply as the wheel skid angle in some cases) of the i-th wheel 2-i. More specifically, each wheel skid angle βi is the angle formed by the wheel advancing speed vector on the wheel coordinate system ↑Vsub_i of the i-th wheel 2-i with respect to the x-axis direction of the i-th wheel coordinate system. Thus, $\beta i = \tan^{-1}(Vsuby\_i/Vsubx\_i)$ holds.

A reference character "β0i" denotes an angle formed by the wheel advancing speed vector ↑Vi of the i-th wheel 2-i with respect to the X-axis direction of the vehicle body coordinate system (=βi+δi; hereinafter referred to as the wheel position skid angle). In the embodiment, the rear wheels 2-3 and 2-4 are non-steering wheels, so that β03=β3 and β04=β4 hold. Hence, β03 and β04 are not shown.

A reference character "γ" denotes an angular velocity about the yaw axis of the vehicle 1, that is, the yaw rate.

A reference character "df" denotes the interval between the front wheels 2-1 and 2-2 in the lateral direction of the vehicle 1 (the Y-axis direction of the vehicle body coordinate system), that is, the tread between the front wheels 2-1 and 2-2. A reference character "dr" denotes the interval between the rear wheels 2-3 and 2-4 in the lateral direction of the vehicle 1 (the Y-axis direction of the vehicle body coordinate system), that is, the tread between the rear wheels 2-3 and 2-4. Hereinafter, "df" will stand for the front wheel tread and "dr" will stand for the rear wheel tread.

A reference character "Lf" denotes the distance between the axle (rotating shaft) of the front wheels 2-1 and 2-2 and the center-of-gravity point of the vehicle 1 (the distance in the longitudinal direction of the vehicle 1) when δ1=δ2=0. A reference character "Lr" denotes the distance between the axle (rotating shaft) of the rear wheels 2-3 and 2-4 and the center-of-gravity point of the vehicle 1 (the distance in the longitudinal direction of the vehicle 1). Hereinafter, Lf stands for the distance between the front wheel axle and the center of gravity, while Lr stands for the distance between the rear wheel axle and the center of gravity.

A reference character "↑Pi" denotes a position vector of the i-th wheel 2-i (hereinafter referred to simply as the wheel position vector in some cases) as observed from the center-of-gravity point of the vehicle 1 when the vehicle 1 is observed from above in the yaw-axis direction. Each wheel position vector ↑Pi is a vector composed of a component in the X-axis direction and a component in the Y-axis direction of the vehicle body coordinate system. In this case, although not shown in FIGS. 2(a) and 2(b), the component in the X-axis direction of each wheel position vector ↑Pi is denoted by Px_i while the component in the Y-axis direction thereof is denoted by Py_i. In the case where the center-of-gravity point of the vehicle 1 in the Y-axis direction of the vehicle body coordinate system lies on the central line of the vehicle width of the vehicle 1, $\uparrow P1 = (Lf, df/2)^T$, $\uparrow P2 = (Lf, -df/2)^T$, $\uparrow P3 = (-Lr, df/2)^T$, and $\uparrow P4 = (-Lr, -dr/2)^T$ hold.

A reference character "↑Fi" denotes a road surface reaction force of the i-th wheel 2-i (a translational force vector acting from a road surface onto the i-th wheel 2-i), as observed by being projected onto the XY plane of the vehicle body coordinate system. Hereinafter, ↑Fi denotes a wheel two-dimensional road surface reaction force or a two-dimensional road surface reaction force. The wheel two-dimensional road surface reaction force ↑Fi denotes a vector composed of a component in the X-axis direction and a component in the Y-axis direction of the vehicle body coordinate system. Here, spatially (three-dimensionally), the road surface reaction force acting on each wheel 2-i from a road surface is a resultant force vector of the driving/braking force, which is a translational force component in the x-axis direction of the i-th wheel coordinate system, a lateral force, which is a translational force component in the y-axis direction thereof, and a ground contact load, which is a translational force component in the yaw-axis direction. Therefore, the wheel two-dimensional road surface reaction force ↑Fi is a vector obtained by representing the resultant vector of the driving/braking force and the lateral force of the i-th wheel 2-i (corresponding to the frictional force acting on the i-th wheel 2-i from a road surface) by means of the vehicle body coordinate system. In this case, although not shown in FIGS. 2(a) and 2(b), the component in the X-axis direction of the wheel two-dimensional road surface reaction force ↑Fi is denoted by Fx_i and the component in the Y-axis direction thereof is denoted by Fy_i. In the following description, the spatial road surface reaction force as the resultant vector of the driving/braking force, the lateral force, and the ground contact load of each wheel 2-$i$ is referred to as the wheel three-dimensional road surface reaction force or the three-dimensional road surface reaction force. Further, the ground contact load, which is a component in the yaw-axis direction of the three-dimensional road surface reaction force of each wheel 2-$i$, is denoted by Fz_$i$.

A reference character "↑Fsub_$i$" denotes the road surface reaction force of the i-th wheel 2-$i$ as observed by being projected onto the xy plane of the i-th wheel coordinate system (hereinafter referred to as the wheel two-dimensional road surface reaction force on the wheel coordinate system). Each wheel two-dimensional road surface reaction force on the wheel coordinate system ↑Fsub_$i$ is a vector composed of a component in the x-axis direction of the i-th wheel coordinate system and a component in the y-axis direction thereof. In this case, although not shown in FIGS. 2($a$) and 2($b$), the component in the x-axis direction of each wheel two-dimensional road surface reaction force on the wheel coordinate system ↑Fsub_$i$ is denoted by Fsubx_$i$ and the component in the y-axis direction thereof is denoted by Fsuby_$i$. The component in the x-axis direction Fsubx_$i$ is, in other words, the driving/braking force of the i-th wheel 2-$i$. The component in the y-axis direction Fsuby_$i$ is, in other words, the lateral force of the i-th wheel 2-$i$. The wheel two-dimensional road surface reaction force on the wheel coordinate system ↑Fsub_$i$ of the i-th wheel 2-$i$ and the wheel two-dimensional road surface reaction force ↑Fi of the i-th wheel 2-$i$ are vector quantities sharing the same spatial orientation and magnitude except that the coordinate systems for representing the vector quantities are different.

A reference character "↑Fg_total" denotes a spatial translational force vector acting on the center-of-gravity point of the vehicle 1 (hereinafter referred to as the total road surface reaction force resultant translational force vector) due to the resultant force of the road surface reaction forces acting on the wheels 2-$i$ (i=1, 2, 3, 4), i.e., the resultant force of the wheel three-dimensional road surface reaction forces (i=1, 2, 3, 4). In this case, although not shown in FIGS. 2($a$) and 2($b$), the component in the X-axis direction of the vehicle body coordinate system of the total road surface reaction force resultant translational force vector ↑Fg_total is denoted by Fgx_total, the component in the Y-axis direction of the vehicle body coordinate system is denoted by Fgy_total, and the component in the yaw-axis direction is denoted by Fgz_total. The reference character Fgx_total may be referred to as the total road surface reaction force resultant longitudinal force and the reference character Fgy_total may be referred to as the total road surface reaction force resultant lateral force in some cases.

A reference character "Mgz_total" denotes a moment acting about the yaw axis at the center-of-gravity point of the vehicle 1 due to the resultant force of the road surface reaction forces acting on the wheels 2-$i$ (i=1, 2, 3, 4), i.e., the resultant force of the i-th wheel three-dimensional road surface reaction forces (i=1, 2, 3, 4) (hereinafter the moment Mgz_total is referred to as the total road surface reaction force resultant yaw moment). The component in the yaw-axis direction Fgz_total of the resultant force of the wheel three-dimensional road surface reaction forces (i=1, 2, 3, 4) does not contribute to the total road surface reaction force resultant yaw moment Mgz_total. Hence, the total road surface reaction force resultant yaw moment Mgz_total virtually represents the moment acting about the yaw axis at the center-of-gravity point of the vehicle 1 due to the resultant force of the wheel two-dimensional road surface reaction forces ↑Fi (i=1, 2, 3, 4), i.e., the resultant force of the driving/braking forces and the lateral forces of all wheels 2-$i$ (i=1, 2, 3, 4).

Supplementally, in each of the embodiments described in the present specification, the resultant force of the road surface reaction forces acting on the wheels 2-$i$ (i=1, 2, 3, 4) is regarded as the entire external force acting on the vehicle 1. More specifically, the external forces acting on the vehicle 1 include air resistance and the like in addition to the road surface reaction force acting on each wheel 2-$i$ from a road surface. In each of the embodiments, however, external forces other than road surface reaction forces are considered sufficiently small to be ignored, as compared with the resultant force of road surface reaction forces acting on the wheels 2-$i$ (i=1, 2, 3, 4). Thus, ↑Fg_total and Mgz_total mean a translational force vector and a moment, respectively, acting on the center-of-gravity point of the vehicle 1 due to the whole external force acting on the vehicle 1.

A reference character "NSP" denotes the neutral steer point of the vehicle 1. The NSP means the load application point (the working point) of the resultant force of the lateral forces Fsuby_$i$ (i=1, 2, 3, 4) acting on all the wheels 2-$i$ (i=1, 2, 3, 4) when a vehicle center-of-gravity skid angle βg (≠0) occurs while the vehicle 1 is traveling in a situation where δ1=δ2=0 holds. More specifically, the NSP means an intersecting point of the straight line which passes the center-of-gravity point of the vehicle 1 and extends in the X-axis direction of the vehicle body coordinate system (the longitudinal direction of the vehicle 1) and the line of action of the resultant force of the lateral forces Fsuby_$i$ (i=1, 2, 3, 4) acting on all wheels 2-$i$ (i=1, 2, 3, 4) when the vehicle 1 is observed from above in the yaw-axis direction.

A reference character "Lnsp" denotes the distance between the center-of-gravity point of the vehicle 1 in the X-axis direction of the vehicle body coordinate system (the longitudinal direction of the vehicle 1) and the NSP (hereinafter referred to as the distance between the vehicle center of gravity and the NSP). If the NSP lies on a rear side beyond the center-of-gravity point of the vehicle 1, then a value of the distance Lnsp between the vehicle center of gravity and the NSP is considered to be a positive value. If the NSP lies on a front side beyond the center-of-gravity point of the vehicle 1, then a value of the distance Lnsp between the vehicle center of gravity and the NSP is considered to be a negative value.

A reference character "Mnsp" denotes a moment acting about the yaw axis at the NSP (hereinafter referred to as the NSP yaw moment) due to the resultant force of the road surface reaction forces acting on the wheels 2-$i$ (i=1, 2, 3, 4), that is, the resultant force of the wheel three-dimensional road surface reaction forces (i=1, 2, 3, 4) or the resultant force of the wheel two-dimensional road surface reaction forces ↑Fi (i=1, 2, 3, 4). In other words, the NSP yaw moment Mnsp is a moment of the total sum of the total road surface reaction force resultant yaw moment Mgz_total and the moment generated about the yaw axis at the NSP by the total road surface reaction force resultant translational force vector ↑Fg_total (=Lnsp*Fgy_total).

Supplementally, in each of the embodiments, regarding the state quantities related to a rotational motion about the yaw axis (δi, δi, γ, and the like), such as an angle about the yaw axis, an angular velocity, and angular acceleration, and the like, and the moments about the yaw axis (Mgz_total, Mnsp, and the like), a counterclockwise direction is defined as a positive direction when the vehicle 1 is observed from above in the yaw-axis direction.

Although not shown in FIGS. 2($a$) and 2($b$), variables given below are used in the following description in addition to the aforesaid variables (reference characters).

A reference character "θh" denotes the steering angle of the steering wheel 5 (a rotational angle, which is hereinafter referred to as the steering control angle).

A reference character "γdot" denotes the angular acceleration about the yaw axis of the vehicle 1 (hereinafter referred to as the yaw angular acceleration).

A reference character "ωw_i" denotes the rotational angular velocity of the i-th wheel 2-$i$ (hereinafter referred to simply as the wheel rotational angular velocity in some cases). A reference character "Rw_i" denotes the effective radius of the i-th wheel 2-$i$ (hereinafter referred to simply as the effective wheel radius). A reference character "Vw_i" denotes the wheel speed of the i-th wheel 2-$i$ defined as the product of ωw_i and Rw_i (=ωw_i*Rw_i), i.e., the velocity of the ground contact portion of the i-th wheel 2-$i$ in the circumferential direction, as observed from the center of the rotation of the i-th wheel 2-$i$. Each wheel speed Vw_i coincides with the component in the x-axis direction Vsubx_i of the wheel advancing speed vector on the wheel coordinate system ↑Vsub_i in a state wherein no slip of the i-th wheel 2-$i$ exists.

A reference character "κi" denotes the slip rate of the i-th wheel 2-$i$ (a longitudinal slip rate: hereinafter referred to simply as the wheel slip rate in some cases). A reference character "Tq_i" denotes a torque of the total sum of a driving torque supplied from the drive system of the vehicle 1 to the i-th wheel 2-$i$ and a braking torque supplied from the braking system of the vehicle 1 (hereinafter referred to simply as the wheel torque in some cases). A reference character "Iw_i" denotes the inertia moment of the i-th wheel 2-$i$ (hereinafter referred to simply as the wheel inertia moment in some cases).

A reference character "m" denotes the mass of the entire vehicle 1 (hereinafter referred to as the vehicle mass), and a reference character "Iz" denotes the inertia moment about the yaw axis of the entire vehicle 1 at the center-of-gravity point of the vehicle 1 (hereinafter referred to as the vehicle yaw inertia moment).

A reference character "Accx" denotes the acceleration (=Vgdot_x−Vgy*γ) obtained by adding the component in the X-axis direction (=−Vgy*γ) of the vehicle body coordinate system of the acceleration generated at the center-of-gravity point of the vehicle 1 due to a centrifugal force from a turning motion of the vehicle 1 to the vehicle center-of-gravity longitudinal velocity change rate Vgdot_x. A reference character "Accy" denotes the acceleration (=Vgdot_y+Vgx*γ) obtained by adding the component in the Y-axis direction (=Vgx*γ) of the vehicle body coordinate system of the acceleration generated at the center-of-gravity point of the vehicle 1 due to a centrifugal force from a turning motion of the vehicle 1 to the vehicle center-of-gravity skid speed change rate Vgdot_y. In other words, the reference characters Accx and the Accy denote the component in the X-axis direction and the component in the Y-axis direction, respectively, of the acceleration of a motion at the center-of-gravity point of the vehicle 1 observed in the vehicle body coordinate system (a second-order differential value at the position of the center-of-gravity point in the vehicle body coordinate system). Hereinafter, the reference character Accx is referred to as the vehicle center-of-gravity longitudinal acceleration and the reference character Accy is referred to as the vehicle center-of-gravity lateral acceleration.

A reference character "μ" denotes the friction coefficient of a road surface (the coefficient of friction relative to each wheel 2-$i$: hereinafter referred to as the road surface friction coefficient in some cases). The road surface friction coefficient μ in each of the embodiments is a relative friction coefficient, which uses, as the reference thereof, the coefficient of friction between a road surface in a certain reference state, such as a standard dry road surface (hereinafter referred to as the reference road surface) and each wheel 2-$i$. The road surface friction coefficient μ is considered to be the same at a ground contact location of any one of the wheels 2-$i$ (i=1, 2, 3, 4).

A reference character "θbank" denotes the bank angle of a road surface (hereinafter referred to as the road surface bank angle in some cases). A reference character "θslope" denotes a slope angle of a road surface (hereinafter referred to as the road surface slope angle in some cases). The road surface bank angle θbank is the inclination angle of a road surface relative to a horizontal plane, as observed in the direction of the roll axis of the vehicle 1. The road surface slope angle θslope is the inclination angle of a road surface relative to a horizontal plane, as observed in the direction of the pitch axis of the vehicle 1. The road surface bank angle θbank is generally referred to as a cant angle of a road surface in an automotive engineering field. In the present specification, however, the term "bank angle" is used. In each of the embodiments described in the present specification, a road surface bank angle θbank in the case where the vehicle 1 on a road surface is in a right-down sloping posture is defined as a positive angle. Further, a road surface slope angle θslope in the case where the vehicle 1 on a road surface is in a front-down sloping posture is defined as a positive angle.

A reference character "Rot(δi)" denotes a coordinate transformation matrix for transforming a vector quantity expressed in the i-th wheel coordinate system (a vector quantity composed of a component in the x-axis direction and a component in the y-axis direction of the i-th wheel coordinate system) into a vector quantity expressed in the vehicle body coordinate system (a vector quantity composed of a component in the X-axis direction and a component in the Y-axis direction of the vehicle body coordinate system). A coordinate transformation matrix R(δi) is a matrix (secondary square matrix), which is dependent on the rudder angle δi of the i-th wheel 2-$i$ and which has column vectors $(\cos(\delta i), \sin(\delta i))^T$ and $(-\sin(\delta i), \cos(\delta i))^T$ as a component of a first column and a component of a second column, respectively. In this case, if a certain vector quantity ↑A is denoted by $(ax, ay)^T$ on the i-th wheel coordinate system and denoted by $(Ax, Ay)^T$ on the vehicle body coordinate system, then the relationship between $(Ax, Ay)^T$ and $(ax, ay)^T$ is expressed by $(Ax, Ay)^T = Rot(\delta i) * (ax, ay)^T$.

Accordingly, the relationship between the wheel advancing speed vector ↑Vi of each of the wheels 2-$i$ and the wheel advancing speed vector on the wheel coordinate system ↑Vsub_i is given by ↑Vi=Rot(δi)*↑Vsub_i. Similarly, the relationship between the wheel two-dimensional road surface reaction force ↑Fi of each of the wheels 2-$i$ and the wheel two-dimensional road surface reaction force ↑Fsub_i on the wheel coordinate system is given by ↑Fi=Rot(δi)*↑Fsub_i. The coordinate transformation matrix for transforming a vector quantity expressed in the vehicle body coordinate system into a vector quantity expressed in the i-th wheel coordinate system, i.e., an inverse matrix of Rot(δi), is Rot(−δi).

In the following description, the term "actual" will, in some cases, prefix a name or a designation, such as a state quantity or a vector quantity, like "an actual yaw rate" to represent the state quantity or the vector quantity of an actual value (true value). In this case, a variable (reference character) denoting the state quantity or the vector quantity will be suffixed by "_act" (e.g., "γ_act"). Further, to express an observed value (a detected value or an estimated value) of a state quantity or a vector quantity, the name (designation) of the state quantity or the vector quantity will be suffixed by "detected value" or "estimated value" (e.g., "yaw rate detected value" or "yaw rate estimated value"). In this case, as a general rule, the term "estimated value" is used for an observed value calculated by a vehicle model computing means 24, which is described later, or other observed values generated on the basis of the calculated observed values. In addition, the term "detected value" is used for an observed value, which is obtained on the basis of an output of a certain sensor without using the observed value calculated by the vehicle model computing means 24. For a detected value, a variable (reference character) is suffixed by "_sens" such as, for example, "γ_sens." For an estimated value, a variable (reference character) is suffixed by "_estm" such as, for example, "γ_estm." Further, to express a temporal change rate of a state quantity (a differential value based on time), "dot" is added in a variable (reference character) of the state quantity such as, for example, "γdot."

Based on the description given above, the embodiments of the present invention will be described in detail below.

First Embodiment

Figure 3:
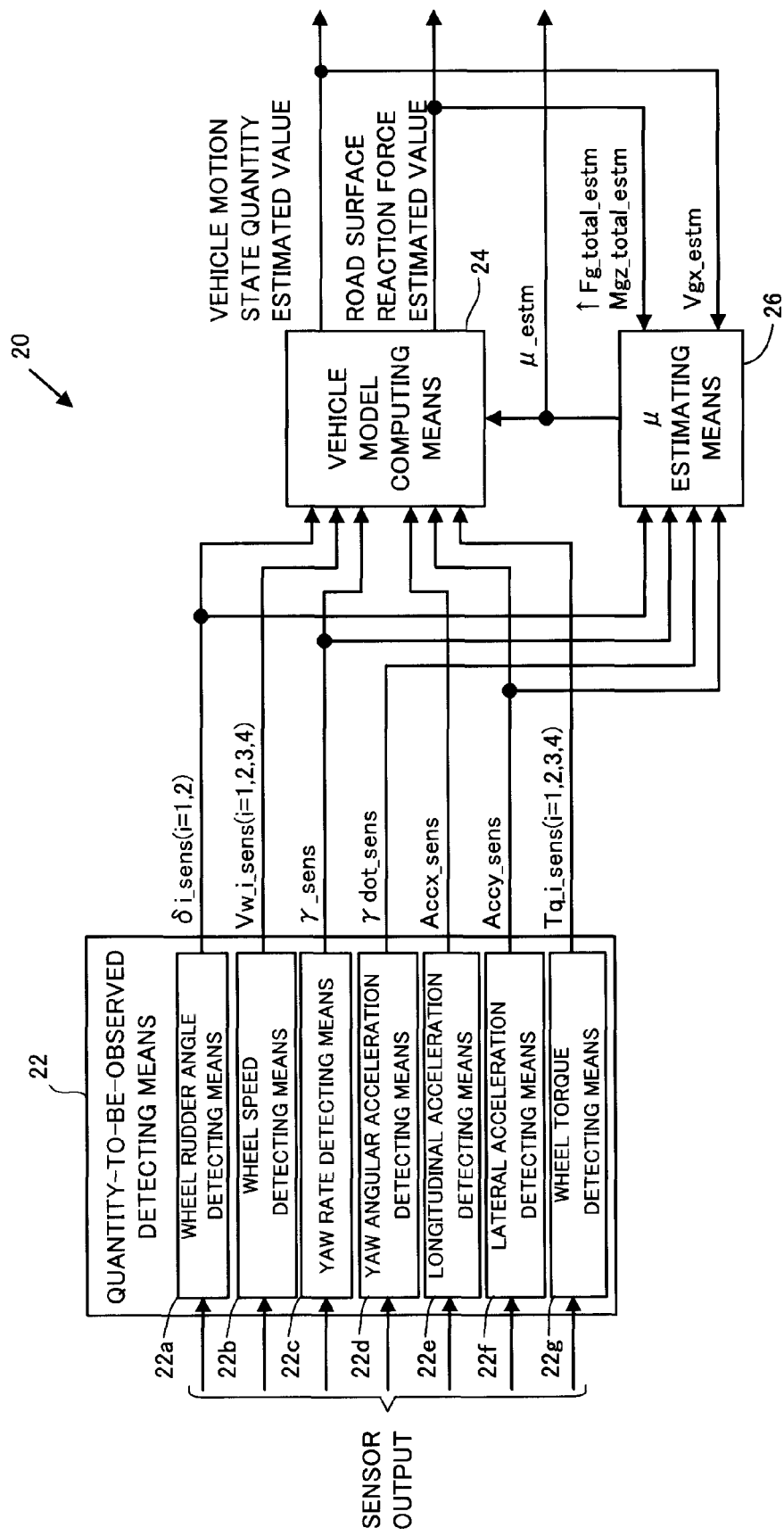
FIG. 3 is a block diagram illustrating the main functions of a controller in a first embodiment.

First, the processing of the controller 20 in a first embodiment will be described in detail. In this embodiment, as illustrated in the block diagram of FIG. 3, the controller 20 has, as major functional means, a quantity-to-be-observed detecting means 22, a vehicle model computing means 24, and a μ estimating means 26.

The quantity-to-be-observed detecting means 22 uses outputs from the aforesaid various sensors of the vehicle 1 (detection data) to carry out the processing for detecting predetermined types of quantities to be observed related to a behavior of the vehicle 1, and generates detected values of the quantities to be observed.

In this embodiment, the quantities to be observed by the quantity-to-be observed detecting means 22 include actual rudder angles δ1_act and δ2_act of steering wheels (front wheels) 2-1 and 2-2, an actual wheel speed Vw_i act (i=1, 2, 3, 4), an actual yaw rate γ_act and an actual yaw angular acceleration γdot_act of the vehicle 1, an actual vehicle center-of-gravity longitudinal acceleration Accx_act and an actual vehicle center-of-gravity lateral acceleration Accy_act, and an actual wheel torque Tq_i act (i=1, 2, 3, 4).

To generate the detected values of the quantities to be observed, the quantity-to-be-observed detecting means 22 has a wheel rudder angle detecting means 22a, which generates wheel rudder angle detected values δ1_sens and δ2_sens of the front wheels 2-1 and 2-2, respectively, a wheel speed detecting means 22b, which generates the wheel speed detected value Vw_i_sens (i=1, 2, 3, 4), a yaw rate detecting means 22c, which generates a yaw rate detected value γ_sens, a yaw angular acceleration detecting means 22d, which generates a yaw angular acceleration detected value γdot_sens, a longitudinal acceleration detecting means 22e, which generates the vehicle center-of-gravity longitudinal acceleration detected value Accx_sens, a lateral acceleration detecting means 22f, which generates the vehicle center-of-gravity lateral acceleration detected value Accy_sens, and a wheel torque detecting means 22g, which generates a wheel torque detected value Tq_i_sens (i=1, 2, 3, 4).

The vehicle model computing means 24 estimates a road surface reaction force acting on each wheel 2-i by using a dynamic model of the vehicle 1, which includes a friction characteristic model that expresses a relationship between the slip between each wheel 2-i and a road surface and a road surface reaction force acting on the wheel 2-i from the road surface and a vehicle motion model that expresses a relationship between an external force acting on the vehicle 1 and a motion of the vehicle 1 (hereinafter referred to simply as the vehicle model in some cases), and the vehicle model computing means 24 further carries out the processing for estimating the state quantity of a motion of the vehicle 1 dynamically caused by the road surface reaction force acting as the external force on the vehicle 1.

To carry out the processing, the vehicle model computing means 24 receives the inputs of the detected values of the predetermined types of quantities to be observed (in this embodiment, δ1_sens, δ2_sens, Vw_i_sens, γ_sens, Accx_sens, Accy_sens, and Tq_i_sens), which have been generated by the quantity-to-be-observed detecting means 22, and also a latest road surface friction coefficient estimated value μ_estm, which has already been determined by the μ estimating means 26. Then, the vehicle model computing means 24 uses these input values and the aforesaid vehicle model to estimate the road surface reaction force of each wheel 2-i or the state quantity of the motion of the vehicle 1.

The estimated values found by the vehicle model computing means 24 are roughly classified into a road surface reaction force estimated value, which is an estimated value related to a road surface reaction force, and a vehicle motion state quantity estimated value, which is the estimated value of a state quantity related to the translational motions in the longitudinal direction (the direction of the roll axis) and the lateral direction (the direction of the pitch axis) of the vehicle 1 and a rotational motion about the yaw axis.

In this case, the road surface reaction force estimated value includes the driving/braking force Fsubx_i of each wheel 2-i, the lateral force Fusby_i, and the ground contact load Fz_i, and further includes a total road surface reaction force resultant translational force vector estimated value ↑Fg_total_estm (Fgx_total_estm and Fgy_total_estm) and the total road surface reaction force resultant yaw moment estimated value Mgz_total_estm.

Further, the vehicle motion state quantity estimated value includes the yaw rate estimated value γ_estm and the vehicle center-of-gravity velocity vector estimated value ↑Vg_estm (Vgx_estm and Vgy_estm).

The μ estimating means 26 performs the processing of estimating the friction coefficient μ of a road surface on which the vehicle 1 is traveling (the road surface friction coefficient μ).

To implement the processing, the μ estimating means 26 receives the inputs of δ1_sens, δ2_sens, γ_sens, γdot_sens, and Accy_sens among the detected values of the quantities to be observed, which have been generated by the quantity-to-be-observed detecting means 22, the total road surface reaction force resultant translational force vector estimated value ↑Fg_total_estm (more specifically, the total road surface reaction force resultant lateral force estimated value Fgy_total_estm of ↑Fg_total_estm) and the total road surface reaction force resultant yaw moment estimated value Mgz_total_estm calculated by the vehicle model computing means 24, and the vehicle center-of-gravity longitudinal velocity estimated value Vgx_estm, which is the component in the X-axis direction (the component in the longitudinal direction of the vehicle 1) of the vehicle center-of-gravity velocity vector estimated value ↑Vg_estm, among the vehicle motion state quantity estimated values calculated by the vehicle model computing means 24. Then, the μ estimating means 26 uses these input values to calculate the road surface friction coefficient estimated value μ_estm, which is the estimated value of the road surface friction coefficient μ.

Figure 4:
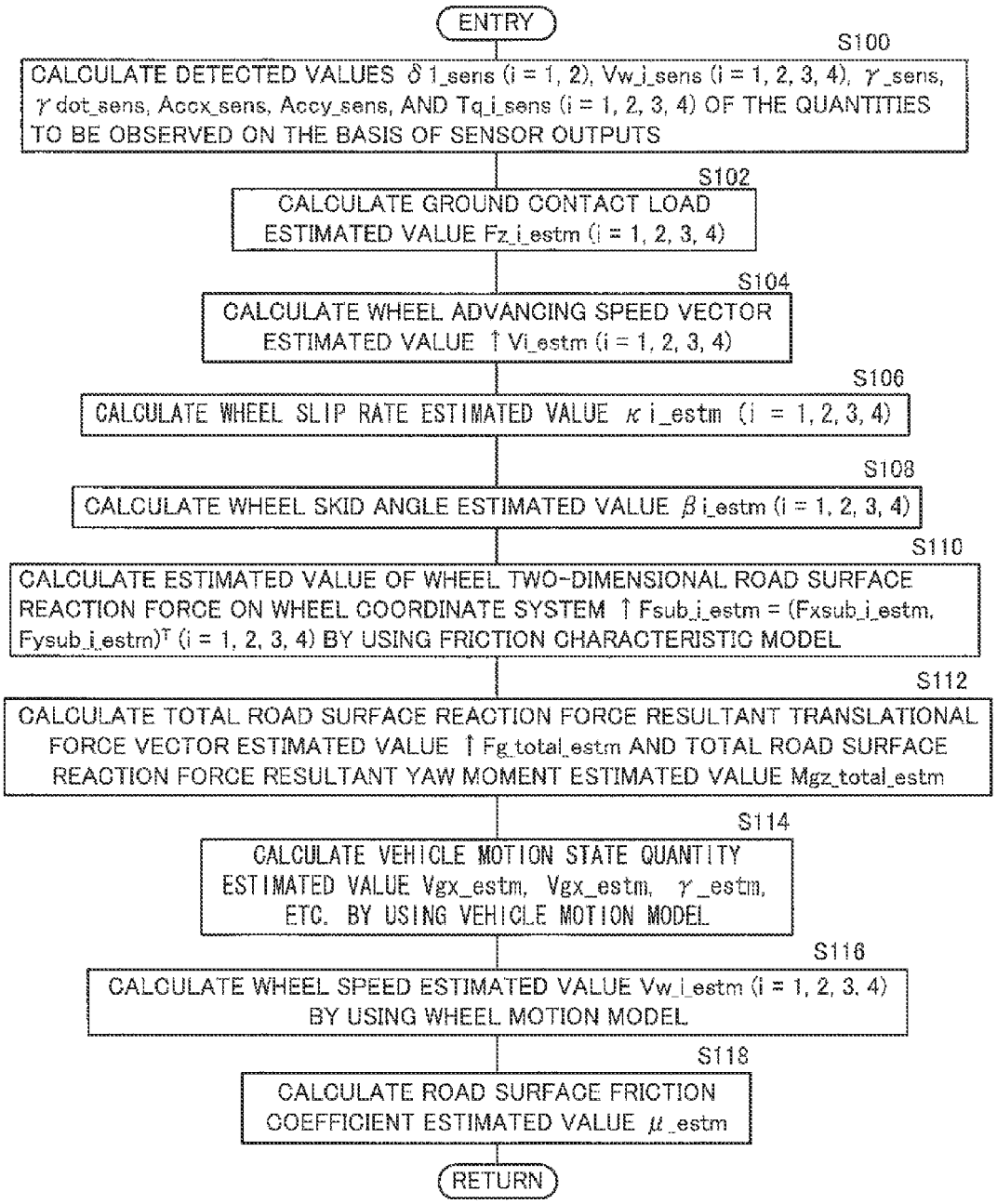
FIG. 4 is a flowchart illustrating processing of the controller in the first embodiment.

The controller 20 sequentially implements the processing illustrated in the flowchart of FIG. 4 at a predetermined arithmetic processing cycle by the quantity-to-be-observed detecting means 22, the vehicle model computing means 24, and the μ estimating means 26.

In the following description, in order to distinguish the value (a detected value, an estimated value, or the like) obtained in the current (present) arithmetic processing cycle of the controller 20 from a value obtained in the previous (last) arithmetic processing cycle, the former is referred to as "the current value" and the latter as "the previous value" in some cases. Further, the reference character of the previous value is suffixed by a suffix "_p" such as "γ_estm_p"). In this case, "the previous value" means the latest value among the values already obtained in past arithmetic processing cycles of the controller 20. Any value means a current value unless otherwise specified as a current value or a previous value.

Referring to FIG. 4, the controller 20 first performs the processing of the quantity-to-be-observed detecting means 22 in S100. The quantity-to-be-observed detecting means 22 generates the detected values δ1_sens, δ2_sens, Vw_i_sens (i=1, 2, 3, 4), γ_sens, γdot_sens, Accx_sens, Accy_sens, and Tq_i_sens of the quantities to be observed on the basis of the outputs of various sensors, including the wheel rotational angular velocity sensor 8-i (i=1, 2, 3, 4), the brake pressure sensor 9-i (i=1, 2, 3, 4), the steering control angle sensor 10, the transmission sensor 11, the acceleration sensor 12, the yaw rate sensor 13, the longitudinal acceleration sensor 14, and the lateral acceleration sensor 15.

More specifically, the wheel rudder angle detected values δ1_sens and δ2_sens are generated by the wheel rudder angle detecting means 22a on the basis of outputs of the steering control angle sensor 10.

Here, in this embodiment, the actual rudder angle δ1_act of the first wheel 2-1 and the actual rudder angle δ2_act of the second wheel 2-2 are the same, so that the δ1_sens is regarded as equal to 62 sens. Accordingly, hereinafter, the rudder angles δ1 and δ2 of the front wheels 2-1 and 2-2 are generically referred to as a front rudder angle δf, and the wheel rudder angle detected values δ1_sens and δ2_sens will be generically referred to as a front wheel rudder angle detected value δf_sens.

Then, the wheel rudder angle detecting means 22a finds the front wheel rudder angle detected value δf_sens (=δ1_sens=δ2_sens) as the rudder angle detected value common to the front wheels 2-1 and 2-2 on the basis of a steering control angle detected value θh_sens, which is the value of a steering control angle (converted value) indicated by an output value of the steering control angle sensor 10, according to a preset relationship (in the form of a model, a map, or the like) between the steering control angle θh and the front wheel rudder angle δf.

For example, in the case where the steering mechanism of the vehicle 1 is constructed such that the actual rudder angles δ1_act and δ2_act of the front wheels 2-1 and 2-2 are substantially proportional to the actual steering control angle θh_act, the value δf_sens is calculated by multiplying the θh_sens by a preset proportional constant (the so-called overall steering ratio).

In the case where the steering mechanism of the steering system has a steering actuator, as with a power steering device, the operation state of the steering actuator or a state quantity defining the operation state may be detected in addition to the steering control angle detected value θh_sens or in place of the steering control angle detected value θh_sens and the detected value may be used to find the front wheel rudder angle detected value δf_sens.

Alternatively, a more accurate steering system model or the like may be used to individually find the rudder angle detected values δ1_sens and δ2_sens of the front wheels 2-1 and 2-2, respectively. Then, the average value of the individual rudder angle detected values δ1_sens and δ2_sens of the front wheels 2-1 and 2-2 (=(δ1_sens+δ2_sens)/2) may be found as the front wheel rudder angle detected value δf_sens that represents the actual rudder angles δ1_act and δ2_act of the front wheels 2-1 and 2-2.

The wheel speed detected values Vw_i_sens (i=1, 2, 3, 4) are generated by the wheel speed detecting means 22b on the basis of the outputs of the wheel rotational angular velocity sensors 8-i respectively corresponding thereto.

To be more specific, the wheel speed detecting means 22b finds the wheel speed detected value Vw_i_sens by multiplying the wheel rotational angular velocity detected value ωw_i_sens, which is the value of angular acceleration (converted value) indicated by an output value of the wheel rotational angular velocity sensor 8-i, by the value of a preset effective radius Rw_i of the i-th wheel 2-i for each wheel 2-i.

The yaw rate detected value γ_sens and the yaw angular acceleration detected value γdot_sens are generated by the yaw rate detecting means 22c and the yaw angular acceleration detecting means 22d, respectively, on the basis of the outputs of the yaw rate sensor 13.

More specifically, the yaw rate detecting means 22c generates the value (converted value) of the angular velocity, which is indicated by an output value of the yaw rate sensor 13, as the yaw rate detected value γ_sens. In addition, the yaw angular acceleration detecting means 22d differentiates the yaw rate detected value γ_sens (finds a temporal change rate) to generate the yaw angular acceleration detected value γdot_sens, or generates the value (converted value) of the angular acceleration, which is indicated by the value obtained by differentiating an output value of the yaw rate sensor 13, as the yaw angular acceleration detected value γdot_sens.

Alternatively, the yaw angular acceleration detected value γdot_sens can be generated on the basis of an output of a different sensor from the yaw rate sensor 13. For instance, two acceleration sensors are installed in the vehicle body 1B such that the sensors are spaced away from each other with an interval Lacc provided therebetween in the direction orthogonal to the direction of the yaw axis of the vehicle 1 (e.g., in the direction of the roll axis or the pitch axis of the vehicle 1). In this case, these two acceleration sensors are disposed such that the two acceleration sensors sense the acceleration in a direction orthogonal to the direction of the interval between the two acceleration sensors and to the direction of the yaw axis.

This arrangement allows the yaw angular acceleration detected value γdot_sens to be generated by dividing the difference between the acceleration detected values indicated by the output values of the two acceleration sensors by the interval Lacc.

The vehicle center-of-gravity longitudinal acceleration detected value Accx_sens is generated by the longitudinal acceleration detecting means 22e on the basis of an output of the longitudinal acceleration sensor 14. Further, the vehicle center-of-gravity lateral acceleration detected value Accy_sens is generated by the lateral acceleration detecting means 22f on the basis of an output of the lateral acceleration sensor 15.

Here, in this embodiment, the position of the center-of-gravity point of the vehicle 1 is identified beforehand, and the longitudinal acceleration sensor 14 and the lateral acceleration sensor 15 are fixed to the vehicle body 1B such that the sensors are positioned at the center-of-gravity point. The longitudinal acceleration sensor 14 and the lateral acceleration sensor 15 may be an acceleration sensor formed as an integral structure (a two-axis acceleration sensor).

The longitudinal acceleration detecting means 22e generates the value (converted value) of the acceleration indicated by an output value of the longitudinal acceleration sensor 14 as the vehicle center-of-gravity longitudinal acceleration detected value Accx_sens. The lateral acceleration detecting means 22f generates the value (converted value) of the acceleration indicated by an output value of the lateral acceleration sensor 15 as the vehicle center-of-gravity lateral acceleration detected value Accy_sens.

Even if the longitudinal acceleration sensor 14 or the lateral acceleration sensor 15 is disposed at a position deviating from the center-of-gravity point of the vehicle 1, the vehicle center-of-gravity longitudinal acceleration detected value Accx_sens or the vehicle center-of-gravity lateral acceleration detected value Accy_sens can be generated by correcting the acceleration detected value indicated by an output value of the sensor 14 or 15 according to the yaw angular acceleration detected value γdot_sens (or the differential value of the yaw rate detected value γ_sens).

For example, if the longitudinal acceleration sensor 14 is disposed at a position which is away to the left side from the center-of-gravity point of the vehicle 1 by an interval denoted by Ly, then the vehicle center-of-gravity longitudinal acceleration detected value Accx_sens can be generated by adding the value, which is obtained by multiplying the yaw angular acceleration detected value γdot_sens (or the differential value of the yaw rate detected value γ_sens) by Ly, to the acceleration detected value indicated by an output value of the longitudinal acceleration sensor 14 (the detected value of the acceleration at the position of the sensor 14).

Similarly, if the lateral acceleration sensor 15 is disposed at a position which is away to the front side from the center-of-gravity point of the vehicle 1 by an interval denoted by Lx, then the vehicle center-of-gravity lateral acceleration detected value Accy_sens can be generated by subtracting the value obtained by multiplying the yaw angular acceleration detected value γdot_sens (or the differential value of the yaw rate detected value γ_sens) by Lx from the acceleration detected value indicated by an output value of the lateral acceleration sensor 15 (the detected value of the acceleration at the position of the sensor 15).

Supplementally, the acceleration detected (sensed) by the longitudinal acceleration sensor 14 carries a meaning as the component in the longitudinal direction of the vehicle body 1B (the component in the X-axis direction of the vehicle body coordinate system) of an acceleration vector generated at the center-of-gravity point of the vehicle 1 by the entire external force (resultant force) acting on the vehicle 1 (the acceleration vector obtained by dividing the translational force vector acting on the center-of-gravity point of the vehicle 1 due to the entire external force by a vehicle mass m).

In this case, if the actual road surface slope angle θslope_act is zero, then the acceleration sensed by the longitudinal acceleration sensor 14 is the actual vehicle center-of-gravity longitudinal acceleration Accx_act itself as the proper object to be detected. Meanwhile, if the actual road surface slope angle θslope_act is not zero, then the longitudinal direction (the X-axis direction) of the vehicle body 1B, which is the sensing direction of the longitudinal acceleration sensor 14, is inclined by θslope_act relative to a horizontal plane. Hence, the longitudinal acceleration sensor 14 senses not only the actual vehicle center-of-gravity longitudinal acceleration Accx_act but also an acceleration component in a direction parallel to the longitudinal direction of the vehicle body 1B (=−g*sin(θslope_act); g: gravitational acceleration constant) of the gravitational acceleration.

Thus, the vehicle center-of-gravity longitudinal acceleration detected value Accx_sens as the acceleration indicated by an output of the longitudinal acceleration sensor 14 is actually the detected value of the acceleration obtained by superimposing an acceleration component in a direction parallel to the longitudinal direction of the vehicle body 1B of the gravitational acceleration onto the actual vehicle center-of-gravity longitudinal acceleration Accx_act (=Accx_act−g*sin(θslope_act)) (This includes the case where θslope_act is zero).

Similarly to the above, the acceleration detected (sensed) by the lateral acceleration sensor 15 carries a meaning as the component in the lateral direction of the vehicle body 1B (the component in the Y-axis direction of the vehicle body coordinate system) of an acceleration vector generated at the center-of-gravity point of the vehicle 1 by the entire external force (resultant force) acting on the vehicle 1.

In this case, if the actual road surface bank angle θbank_act is zero, then the acceleration sensed by the lateral acceleration sensor 15 is the actual vehicle center-of-gravity lateral acceleration Accy_act itself as the proper object to be detected. Meanwhile, if the actual road surface bank angle θbank_act is not zero, then the lateral direction (the Y-axis direction) of the vehicle body 1B, which is the sensing direction of the lateral acceleration sensor 15, is inclined by θbank_act relative to a horizontal plane. Hence, the lateral acceleration sensor 15 senses not only the actual vehicle center-of-gravity lateral acceleration Accy_act but also an acceleration component in a direction parallel to the lateral direction of the vehicle body 1B (=g*sin(θbank_act)) of the gravitational acceleration.

Thus, the vehicle center-of-gravity lateral acceleration detected value Accy_sens as the acceleration indicated by an output of the lateral acceleration sensor 15 is actually the detected value of the acceleration obtained by superimposing an acceleration component in a direction parallel to the lateral direction of the vehicle body 1B of the gravitational acceleration onto the actual vehicle center-of-gravity lateral acceleration Accy_act (=Accy_act+g*sin(θbank_act)) (This includes the case where θbank_act is zero).

In the following description, the acceleration defined as the sum of the vehicle center-of-gravity longitudinal acceleration Accx and the acceleration component in the direction parallel to the longitudinal direction of the vehicle body 1B (=−g*sin(θslope)) of the gravitational acceleration (=Accx−g*sin(θslope)) (that is, the acceleration sensed by the longitudinal acceleration sensor 14) is referred to as the sensed-by-sensor longitudinal acceleration Accx_sensor.

Similarly, the acceleration defined as the sum of the vehicle center-of-gravity lateral acceleration Accy and the acceleration component in the direction parallel to the lateral direction of the vehicle body 1B (=g*sin(θbank)) of the gravitational acceleration (=Accx+g*sin(θbank)) (that is, the acceleration sensed by the lateral acceleration sensor 15) is referred to as the sensed-by-sensor lateral acceleration Accy_sensor.

The sensed-by-sensor longitudinal acceleration Accx_sensor agrees with the vehicle center-of-gravity longitudinal acceleration Accx when θslope is zero. The sensed-by-sensor lateral acceleration Accy_sensor agrees with the vehicle center-of-gravity lateral acceleration Accy when θbank is zero.

In a precise sense, therefore, the vehicle center-of-gravity longitudinal acceleration detected value Accx_sens generated by the longitudinal acceleration detecting means 22e and the vehicle center-of-gravity lateral acceleration detected value Accy_sens generated by the lateral acceleration detecting means 22f mean the detected value of the sensed-bysensor longitudinal acceleration Accx_sensor and the detected value of the sensed-by-sensor lateral acceleration Accy_sensor, respectively.

The wheel torque detected value Tq_i_sens (i=1, 2, 3, 4) is generated by the wheel torque detecting means 22g on the basis of an output of the brake pressure sensor 9-i and outputs of the acceleration sensor 12 and the transmission sensor 11 corresponding thereto.

To be specific, the wheel torque detecting means 22g recognizes an output torque (required torque) of the engine 3 from the detected value of the amount of depression on the accelerator pedal indicated by an output value of the acceleration sensor 12 and also recognizes the reduction ratio between the engine 3 and each wheel 2-i from the detected value of the transmission gear ratio of the transmission 4a indicated by an output value of the transmission sensor 4a. Then, the wheel torque detecting means 22g finds the driving torque to be transmitted to each wheel 2-i from the engine 3 (the driving torque to be imparted to each wheel 2-i by the drive system of the vehicle 1) on the basis of the recognized output torque of the engine 3 and the aforesaid reduction ratio.

Further, the wheel torque detecting means 22g finds the braking torque to be imparted to each wheel 2-i from each braking mechanism 7-i (the braking torque to be imparted to each wheel 2-i by the braking system of the vehicle 1) on the basis of the brake pressure detected value indicated by an output value of the brake pressure sensor 9-i. Then, the wheel torque detecting means 22g calculates the value of a torque of the total sum of the found driving torque and braking torque (a resultant torque) as the wheel torque detected value Tq_i_sens for each wheel 2-i.

The above has described the details of the processing in S100 (the processing of the quantity-to-be-observed detecting means 22).

In the processing of the quantity-to-be-observed detecting means 22, an output of a sensor may be passed through a filter, such as a high-cut filter, for removing a high-frequency noise component and then input to the detecting means 22a to 22g. Alternatively, the detected value of a quantity to be observed, which has been obtained by using an output of a sensor as it is, may be taken as a provisional detected value, and the provisional detected value may be passed through a filter, such as a high-cut filter, to generate a formal detected value of the quantity to be observed.

Regarding the vehicle center-of-gravity lateral acceleration detected value Accy, in particular, if a means for detecting or estimating the roll angle of the vehicle body 1B (a relative inclination angle about the roll axis of the vehicle body 1B with respect to a road surface) is provided (the aforesaid means is, for example, a means which detects the stroke of a suspension by a sensor and calculates the roll angle of the vehicle body 1B from the detected value thereof), then an influence portion of an output of the lateral acceleration sensor 15 attributable to a roll motion of the vehicle body 1B (an influence portion of the gravitational acceleration contained in an output of the acceleration sensor 15 caused by the tilting of the lateral acceleration sensor 15 by a roll angle of the vehicle body 1B) is estimated by using an observed value of the roll angle. Then, preferably, the estimated influence portion is subtracted from the acceleration detected value indicated by an output value of the lateral acceleration sensor 15 so as to obtain the vehicle center-of-gravity lateral acceleration detected value Accy.

After carrying out the processing of the quantity-to-be-observed detecting means 22 as described above, the controller 20 carries out the processing of S102 to S116 by the vehicle model computing means 24.

Figure 5:
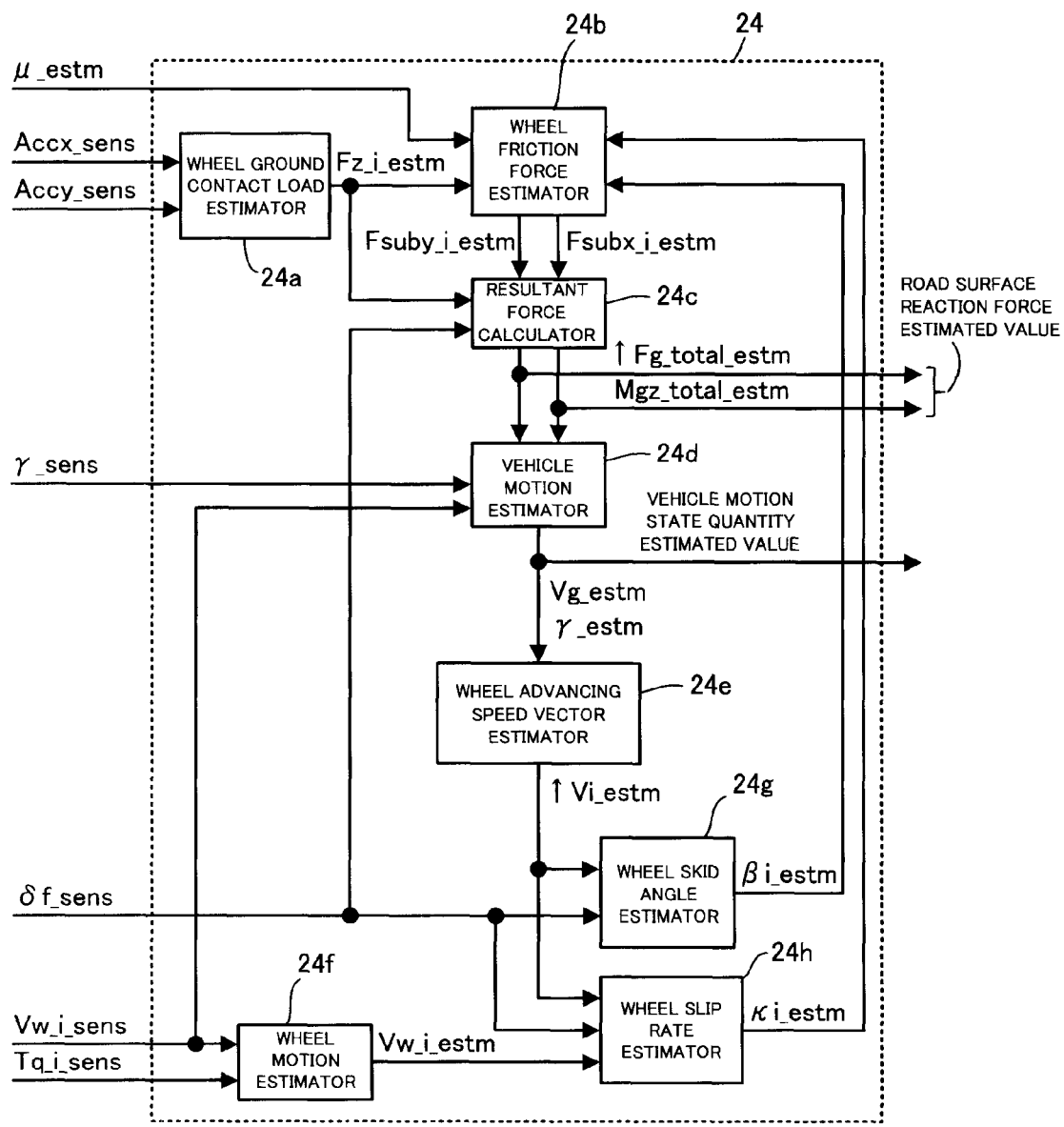
FIG. 5 is a block diagram illustrating the functions of a vehicle model computing means illustrated in FIG. 3.

The following describes the processing in detail with reference to FIG. 4 and FIG. 5.

As illustrated in FIG. 5, the vehicle model computing means 24 has, as the functions thereof, a wheel ground contact load estimator 24a, which finds a ground contact load estimated value Fz_i_estm of each wheel 2-i, a wheel friction force estimator 24b, which finds a driving/braking force estimated value Fsubx_i_estm, which is the estimated value of a component in the x-axis direction of the wheel two-dimensional road surface reaction force ↑Fsub_i on the wheel coordinate system of each wheel 2-i, and a lateral force estimated value Fsuby_i_estm, which is the estimated value of a component in the y-axis direction thereof, a resultant force calculator 24c, which finds the total road surface reaction force resultant translational force vector ↑Fg_total_estm and the total road surface reaction force resultant yaw moment Mgz_total_estm, a vehicle motion estimator 24d, which finds a vehicle motion state quantity estimated value, a wheel advancing speed vector estimator 24e, which finds the wheel advancing speed vector estimated value ↑Vi_estm of each wheel 2-i, a wheel motion estimator 24f, which finds the wheel speed estimated value Vw_i_estm of each wheel 2-i, a wheel skid angle estimator 24g, which finds a wheel skid angle estimated value βi_estm of each wheel 2-i, and a wheel slip rate estimator 24h, which finds the wheel slip rate estimated value κi_estm of each wheel 2-i.

In the processing of S102 to S116, first, in S102, the wheel ground contact load estimator 24a calculates the ground contact load estimated value Fz_i_estm of each wheel 2-i.

In this case, according to this embodiment, the wheel ground contact load estimator 24a uses the vehicle center-of-gravity longitudinal acceleration detected value Accx_sens and the vehicle center-of-gravity lateral acceleration detected value Accy_sens of the detected values of quantities to be observed, which have been obtained in S100, to calculate the ground contact load estimated value Fz_i_estm (i=1, 2, 3, 4) according to an expression 1-1 given below.

$$Fz\_i\_estm = Fz0\_i + Wx\_i * Accx\_sens + Wy\_i * Accy\_sens \qquad \text{Expression 1-1}$$

where, in expression 1-1, Fz0_i denotes a value of the ground contact load Fz_i of the i-th wheel 2-i in a state where the vehicle 1 is parked (stationary) on a horizontal road surface (hereinafter referred to as the ground contact load reference value), Wx_i denotes a weighting factor, which defines a change in the ground contact load Fz_i of the i-th wheel 2-i dependent upon the vehicle center-of-gravity longitudinal acceleration Accx (a change from Fz0_i), and Wy_i denotes a weighting factor, which defines a change in the ground contact load Fz_i of the i-th wheel 2-i dependent upon the vehicle center-of-gravity lateral acceleration Accy (a change from Fz0_i). The values of these Fz0_i, Wx_i, and Wy_i are predetermined values that have been set beforehand.

Thus, according to expression 1-1, a change in the ground contact load Fz_i (an increased or decreased quantity from the ground contact load reference value Fz0_i) of each wheel 2-i attributable to the acceleration of the center-of-gravity point of the vehicle 1 (the acceleration in a direction orthogonal to the yaw-axis direction) is found by linearly combination of the vehicle center-of-gravity longitudinal acceleration detected value Accx_sens and the vehicle center-of-gravity lateral acceleration detected value Accy_sens. Then, the change is added to the ground contact load reference value Fz0_i to obtain the ground contact load estimated value Fz_i_estm.

Alternatively, the relationship between the vehicle center-of-gravity longitudinal acceleration Accx and the vehicle center-of-gravity lateral acceleration Accy and the ground contact load Fz_i may be formed into a map beforehand, and the ground contact load estimated value Fz_i_estm of each wheel 2-$i$ may be determined on the basis of the map according to the vehicle center-of-gravity longitudinal acceleration detected value Accx_sens and the vehicle center-of-gravity lateral acceleration detected value Accy_sens.

The Fz_i_estm may be found by reflecting the dynamic characteristic of a suspension device, which is not shown, of the vehicle 1. For example, the dynamic characteristic of the suspension device of the vehicle 1 is modeled in association with a rotational motion about the roll axis of the vehicle body 1B (a roll motion) or a rotational motion about the pitch axis thereof (a pitch motion) in advance.

Then, motion state quantity related to the roll motion or the pitch motion, e.g., the inclination angle of the vehicle body 1B about the roll axis or the observed value of the changing velocity thereof, and the inclination angle of the vehicle body 1B about the pitch axis or the observed value of the changing velocity thereof, and the aforesaid model indicating the dynamic characteristic of the suspension device are used to estimate the translational force in the vertical direction (the yaw-axis direction) acting on each wheel 2-$i$ from the suspension device.

Then, for each wheel 2-$i$, the estimated translational force and the gravity acting on the wheel 2-$i$ are added to find the ground contact load estimated value Fz_i_estm of each wheel 2-$i$. This makes it possible to further enhance the accuracy of the ground contact load estimated value Fz_i_estm ($i$=1, 2, 3, 4).

If the change in the ground contact load Fz_i of each wheel 2-$i$ is regarded sufficiently small, then the processing in S102 may be omitted and the ground contact load estimated value Fz_i_estm may be set to a predetermined value that has been set beforehand (e.g., the ground contact load reference value Fz0_$i$).

In the case where the ground contact load estimated value Fz_i_estm ($i$=1, 2, 3, 4) is determined without using the vehicle center-of-gravity longitudinal acceleration detected value Accx_sens and the vehicle center-of-gravity lateral acceleration detected value Accy_sens as described above, there is no need to input Accx_sens and Accy_sens to the vehicle model computing means 24.

Subsequently, in S104, the wheel advancing speed vector estimator 24$e$ calculates the wheel advancing speed vector estimated value ↑Vi_estm of each wheel 2-$i$.

In this case, the wheel advancing speed vector estimator 24$e$ calculates each wheel advancing speed vector estimated value ↑Vi_estm (=(Vx_i_estm, Vy_i_estm)$^T$) according to expression 1-2 given below on the basis of the vehicle center-of-gravity velocity vector estimated value ↑Vg_estm_p (=(Vgx_estm_p, Vgy_estm_p)$^T$) of the vehicle motion state quantity estimated value (the previous value) calculated by the processing in S114 (the processing by the vehicle motion estimator 24$d$), which is described later, in a previous arithmetic processing cycle, the yaw rate estimated value γ_estm_p, and each wheel position vector ↑Pi (=(Px_i, Py_i)$^T$), which has been set beforehand.

$$↑Vi\_estm=↑Vg\_estm\_p+(-Py\_i*γestm\_p,Px\_i*γestm\_p)^T \quad \text{Expression 1-2}$$

where the second term of the right side of expression 1-2 means a relative speed of the i-th wheel 2-$i$ with respect to the center-of-gravity point of the vehicle 1 (a relative speed in the direction orthogonal to the yaw-axis direction) produced by a rotational motion about the yaw axis of the vehicle 1 (a rotational motion in which the value of the yaw rate is γestm_p).

In place of the yaw rate estimated value (the previous value) γ_estm_p of expression 1-2, a yaw rate detected value γ_sens (the previous value or the current value) may be used.

Subsequently, in S106, the wheel slip rate estimator 24$h$ calculates the wheel slip rate estimated value κi_estm of each wheel 2-$i$.

In this case, the wheel slip rate estimator 24$h$ calculates each wheel slip rate estimated value κi_estm on the basis of the front wheel rudder angle detected value (the current value) δf_sens (=δ1_sens=δ2_sens) of the detected values of the quantities to be observed that have been obtained in S100, the wheel speed estimated value (the previous value) Vw_i_estm_p ($i$=1, 2, 3, 4) calculated by the processing in S116 (the arithmetic processing by the wheel motion estimator 24$f$), which is discussed later, in the previous arithmetic processing cycle, and the wheel advancing speed vector estimated value (the current value) ↑Vi_estm ($i$=1, 2, 3, 4) calculated in S114.

To be more specific, the wheel slip rate estimator 24$h$ first calculates the wheel advancing speed vector estimated value on the wheel coordinate system ↑Vsub_i_estm by coordinate-transforming the wheel advancing speed vector estimated value ↑Vi_estm on the wheel coordinate system according to expression 1-3 given below for each wheel 2-$i$.

$$↑Vsub\_i\_estm=Rot(-δi\_sens)*↑Vi\_estm \quad \text{Expression 1-3}$$

In this case, in expression 1-3, the front wheel rudder angle detected value δf_sens is used as the values of δ1_sens and δ2_sens for the front wheels 2-1 and 2-2. Further, in this embodiment, the rear wheels 2-3 and 2-4 are non-steering wheels, so that the values of δ3_sens and δ4_sens in expression 1-3 are zero. Hence, the arithmetic processing of expression 1-3 may be omitted for the rear wheels 2-3 and 2-4, because |Vsub_3_estm=↑V3_estm and ↑Vsub_4_estm=↑V4_estm hold.

If the estimated value of a component in the y-axis direction Vsuby_i_estm of the wheel advancing speed vector estimated value on each wheel coordinate system ↑Vsub_i_estm is not used for the arithmetic processing (the processing in S108 or the like), which is discussed later, then the estimated value of only the component in the x-axis direction Vsubx_i_estm of the wheel advancing speed vector estimated value on each wheel coordinate system ↑Vsub_i_estm may be calculated.

Then, the wheel slip rate estimator 24$h$ calculates the wheel slip rate estimated value κi_estm according to expression 1-4 given below for each wheel 2-$i$ on the basis of estimated value of the component in the x-axis direction Vsubx_i_estm of the wheel advancing speed vector estimated value on the wheel coordinate system ↑Vsub_i_estm calculated as described above and the wheel speed estimated value (the previous value) Vw_i_estm_p.

$$κi\_estm=(Vsubx\_i\_estm-Vw\_i\_estm\_p)/\max(Vsubx\_i\_estm,Vw\_i\_estm\_p) \quad \text{Expression 1-4}$$

In this case, when the vehicle 1 is accelerated by imparting the driving force from the drive system of the vehicle 1 to the front wheels 2-1 and 2-2, which are the driving wheels, Vsubx_i_estm≤Vw_i_estm_p holds, by which κi_estm≤0 holds. When the vehicle 1 is decelerated by imparting a braking force from the braking system of the vehicle 1 to each wheel 2-$i$, Vsubx_i_estm≥Vw_i_estm_p holds, by which κi_estm≥0 holds.

In place of the wheel speed estimated value (the previous value) Vw_i_estm_p of expression 1-4, the wheel speed detected value Vw_i_sens (the previous value or the current value) may be used. In this case, the wheel motion estimator 24*f*, which is described in detail later, is unnecessary.

Subsequently, in S108, the wheel skid angle estimator 24*g* calculates the wheel skid angle estimated value βi_estm of each wheel 2-*i*.

In this case, the wheel skid angle estimator 24*g* calculates each wheel skid angle estimated value βi_estm on the basis of the front wheel rudder angle detected value δf_sens (=δ1_sens=δ2_sens) of the detected values of the quantities to be observed, which have been obtained in S100, and the wheel advancing speed vector estimated value ↑Vi_estm (i=1, 2, 3, 4) calculated in S104.

To be specific, the wheel skid angle estimator 24*g* first calculates the wheel position skid angle estimated value β0*i*_estm for each wheel 2-*i* according to expression 1-5 given below on the basis of the estimated value of a component in the X-axis direction Vx_i_estm and the estimated value of a component in the Y-axis direction Vy_i_estm of the wheel advancing speed vector estimated value ↑Vi_estm.

$$\beta 0i\_estm = \tan^{-1}(Vy\_i\_estm/Vx\_i\_estm) \quad \text{Expression 1-5}$$

Then, wheel skid angle estimator 24*g* calculates the wheel skid angle estimated value βi_estm for each wheel 2-*i* according to expression 1-6 given below on the basis of the wheel position skid angle estimated value β0*i*_estm calculated as described above and the rudder angle detected value δi_sens.

$$\beta i\_estm = \beta 0i\_estm - \delta i\_sens \quad \text{Expression 1-6}$$

In this case, in expression 1-6, the front wheel rudder angle detected value δf_sens is used as the values of δ1_sens and δ2_sens for the front wheels 2-1 and 2-2. Further, in this embodiment, the rear wheels 2-3 and 2-4 are non-steering wheels, and therefore the values of δ3_sens and δ4_sens in expression 1-6 are zero. Hence, β3_estm=β03_estm and β4_estm=β04_estm hold.

The wheel skid angle estimated value βi_estm may be calculated according to expression 1-7 given below on the basis of the estimated value of a component in the x-axis direction Vsubx_i_estm and the estimated value of a component in the y-axis direction Vsuby_i_estm of the wheel advancing speed vector estimated value on the wheel coordinate system ↑Vsub_i_estm calculated according to the aforesaid expression 1-3.

$$\beta i\_estm = \tan^{-1}(Vsuby\_i\_estm/Vsubx\_i\_estm) \quad \text{Expression 1-7}$$

Subsequently, in S110, the wheel friction force estimator 24*b* calculates the estimated value of the wheel two-dimensional road surface reaction force on the wheel coordinate system ↑Fsub_i (=(Fsubx_i_estm, Fsuby_i_estm)$^T$) of each wheel 2-*i*.

Here, the wheel friction force estimator 24*b* has a friction characteristic model, which expresses the relationship between the slip between each wheel 2-*i* and a road surface and the road surface reaction force acting on the wheel 2-*i* from the road surface.

The friction characteristic model in this embodiment represents the driving/braking force Fsubx_i of the wheel two-dimensional road surface reaction force on the wheel coordinate system ↑Fsub_i as the friction force acting on each wheel 2-*i* from a road surface and the lateral force Fsuby_i as the functions using the wheel slip rate id and the wheel skid angle βi, which indicate the slip state of the i-th wheel 2-*i*, the ground contact load Fz_i, and the road surface friction coefficient μ as input parameters, as represented by expressions 1-8 and 1-9 given below.

$$Fsubx\_i = \text{func}\_fx\_i(\kappa i, \beta i, Fz\_i, \mu) \quad \text{Expression 1-8}$$

$$Fsuby\_i = \text{func}\_fy\_i(\kappa i, \beta i, Fz\_i, \mu) \quad \text{Expression 1-9}$$

In this case, the function func_fx_i (κi, βi, Fz_i, μ) of the right side of expression 1-8, i.e., a function func_fx_i, which defines the relationship between Fsubx_i and κi, βi, Fz_i, and μ, is represented by expression 1-8a given below in an example of this embodiment.

$$\text{func}\_fx\_i(\kappa i, \beta i, Fz\_i, \mu) = \mu * Cslp\_i(\kappa i) * Cattx\_i(\beta i) * Fz\_i \quad \text{Expression 1-8a}$$

Cslp_i(κi) in this expression 1-8a denotes a coefficient that defines the characteristic of changes in the driving/braking force Fsubx_i caused by a change in the wheel slip rate κi, and Cattx_i(β) denotes a coefficient that defines the characteristic of changes in the driving/braking force Fsubx_i caused by changes in the wheel skid angle βi (consequently, changes in the lateral force Fsuby_i).

The relationship between Cslp_i(κi) and id is set as illustrated in, for example, the graph of FIG. 6(*a*). In other words, the relationship is set such that the coefficient Cslp_i(κi) becomes a monotonically decreasing function relative to the wheel slip rate κi.

More specifically, the relationship between Cslp_i(κi) and κi is set such that the value of the function func_fx_i (=driving/braking force Fsubx_i) changes in the negative direction (the direction in which the braking force increases) as the magnitude of the wheel slip rate κi increases in a situation where κi>0 holds (a situation where the vehicle 1 is decelerating), while the value of the function func_fx_i (=driving/braking force Fsubx_i) changes in the positive direction (the direction in which the driving force increases) as the magnitude of the wheel slip rate κi increases in a situation where κi<0 holds (a situation where the vehicle 1 is accelerating).

According to the relationship illustrated in FIG. 6(*a*), the coefficient Cslp_i(κi) has a saturation characteristic relative to the wheel slip rate κi. This means that the magnitude of the rate of change in Cslp_i(κi) in response to changes in κi (the value obtained by differentiating Cslp_i(κi) by κi) decreases as the absolute value of κi increases.

Further, the relationship between the coefficient Cattx_i (βi) and the wheel skid angle βi is set as illustrated in, for example, the graph of FIG. 6(*b*). More specifically, the relationship is set such that the value of the coefficient Cattx_i(βi) changes toward 0 from 1 as the absolute value of the wheel skid angle βi increases from zero.

In other words, the relationship between Cattx_i(βi) and βi is set such that the magnitude of the value of the function func_fx_i (=driving/braking force Fsubx_i) decreases as the absolute value of the wheel skid angle βi increases. This is because, in general, the magnitude of the lateral force Fsuby_i increases and consequently the magnitude of the driving/braking force Fsubx_i decreases as the absolute value of the wheel skid angle βi increases.

Accordingly, the friction characteristic model represented by expressions 1-8 and 1-8a indicates that the driving/braking force Fsubx_i of the i-th wheel 2-*i* is proportional to the road surface friction coefficient μ and the ground contact load Fz_i and that the Fsubx_i is a monotonically decreasing function relative to the wheel slip rate id and also represents the relationship in which the magnitude of Fsubx_i decreases as the absolute value of the wheel skid angle βi increases.

Supplementally, the friction characteristic model represented by expressions 1-8 and 1-8a as described above corresponds to a first model of the friction characteristic models of the present invention.

Further, the function func_fyi (κi, βi, Fz_i, μ) of the right side of expression 1-9, i.e., the function func_fy_i defining the relationship between Fsuby_i and κi, βi, Fz_i, μ is represented by expression 1-9a given below in an example of this embodiment.

$$\text{func\_fy\_i}(\kappa i, \beta i, Fz\_i, \mu) = \mu L \cdot C\text{beta\_i}(\beta i) \cdot C\text{atty\_i}(\kappa i) \cdot Fz\_i \quad \text{Expression 1-9a}$$

Cbeta_i(βi) in this expression 1-9a denotes a coefficient that defines the characteristic of changes in the lateral force Fsuby_i caused by changes in the wheel skid angle βi, and Catty_i(κi) denotes a coefficient that defines the characteristic of changes in the lateral force Fsuby_i caused by changes in the wheel slip rate κi (i.e., changes in the driving/braking force Fsubx_i). The relationship between Cbeta_i(β1) and βi is set, for example, as illustrated in the graph of FIG. 7(a).

More specifically, the relationship is set such that the coefficient Cbeta_i(βi) becomes a monotonically decreasing function relative to the wheel skid angle βi. More specifically, the relationship between Cbeta_i(βi) and βi is set such that the value of the function func_fy_i (=lateral force Fsuby_i) increases in the negative direction (the right direction of the i-th wheel 2-i) as the magnitude of the wheel skid angle βi increases in a situation where βi>0 holds (a situation where Vsuby_i>0 holds), while the value of the function func_fy_i (=lateral force Fsuby_i) increases in the positive direction (the left direction of the i-th wheel 2-i) in a situation where βi<0 holds (a situation where Vsuby_i<0 holds).

Figure 7A:
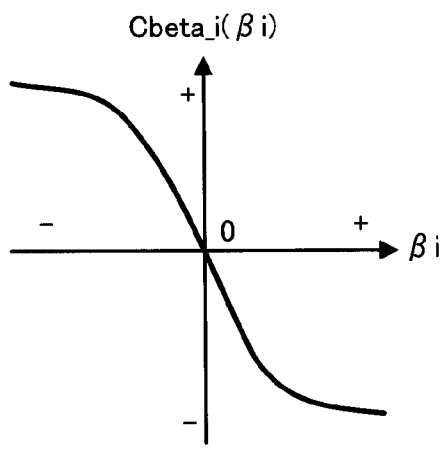
FIGS. 7(a) and 7(b) are graphs for describing the processing of a wheel skid angle estimator illustrated in FIG. 5.

According to the relationship illustrated in FIG. 7(a), the coefficient Cbeta_i(βi) has a saturation characteristic relative to the wheel skid angle βi. This means that the magnitude of the rate of change in coefficient Cbeta_i(βi) in response to changes in βi (the value obtained by differentiating Cbeta_i (βi) by βi) decreases as the absolute value of βi increases.

Figure 7B:
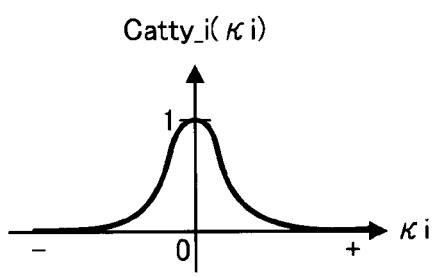

Further, the relationship between the coefficient Catty_i (κi) and the wheel slip rate κi is set as illustrated in, for example, the graph of FIG. 7(b). More specifically, the relationship is set such that the value of the coefficient Catty_i(κi) changes toward 0 from 1 as the absolute value of the wheel slip rate κi increases from zero.

In other words, the relationship between Catty_i(κi) and κi is set such that the magnitude of the lateral force Fsuby_i as the value of the function func_fy_i decreases as the absolute value of the wheel slip rate κi increases. This is because, in general, the magnitude of the driving/braking force Fsubx_i increases and consequently the magnitude of the lateral force Fsuby_i decreases as the absolute value of the wheel slip rate κi increases.

Accordingly, the friction characteristic model represented by expressions 1-9 and 1-9a indicates that the lateral force Fsuby_i of the i-th wheel 2-i is proportional to the road surface friction coefficient μ and the ground contact load Fz_i and that the Fsuby_i is a monotonically decreasing function relative to the wheel skid angle βi and also represents the relationship in which the magnitude of Fsuby_i decreases as the absolute value of the wheel slip rate κi increases.

Supplementally, the friction characteristic model represented by expressions 1-9 and 1-9a as described above corresponds to a second model of the friction characteristic models of the present invention.

In S110, the wheel friction force estimator 24b finds the wheel two-dimensional road surface reaction force estimated value on the wheel coordinate system ↑Fsub_i of each wheel 2-i by using the friction characteristic model set as described above.

To be more specific, for each wheel 2-i, the wheel friction force estimator 24b computes the right side of expression 1-8a and the right side of expression 1-9a by using the wheel slip rate estimated value κi_estm calculated in S106, the wheel skid angle estimated value βi_estm calculated in S108, the ground contact load estimated value Fz_i_estm calculated in S102, and the road surface friction coefficient estimated value μ_estm_p calculated by the processing in S122 (the arithmetic processing by the μ estimating means 26), which is described later, in the previous arithmetic processing cycle as the values of the input parameters of the function func_fx_i (κi, βi, Fz_i, μ) and func_fy_i (κi, βi, Fz_i, μ), respectively.

Then, the wheel friction force estimator 24b sets the value of the function func_fx_i found by the computation of expression 1-8a as the driving/braking force estimated value Fsubx_i_estm, which is the estimated value of the component in the x-axis direction of the estimated value of the wheel two-dimensional road surface reaction force on the wheel coordinate system ↑Fsub_i.

Then, the wheel friction force estimator 24b sets the value of the function func_fxi found by the computation of expression 1-8a as the driving/braking force estimated value Fsubx_i_estm, which is the estimated value of the component in the x-axis direction of the estimated value of the wheel two-dimensional road surface reaction force on the wheel coordinate system ↑Fsub_i.

The wheel friction force estimator 24b also sets the value of the function func_fy_i found by the computation of expression 1-9a as the lateral force estimated value Fsuby_i_estm, which is the estimated value of the component in the y-axis direction of the estimated value of the wheel two-dimensional road surface reaction force on the wheel coordinate system ↑Fsub_i.

Figure 6A:
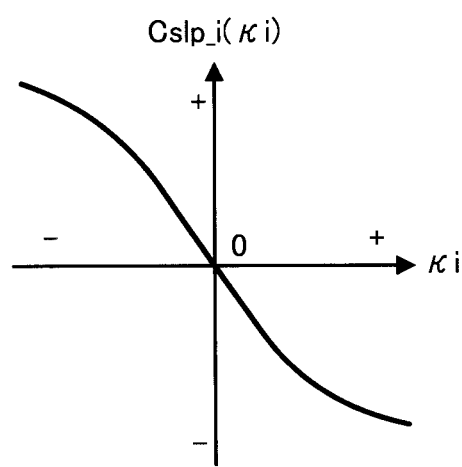
FIGS. 6(a) and 6(b) are graphs for describing the processing of a wheel slip rate estimator illustrated in FIG. 5.
Figure 6B:
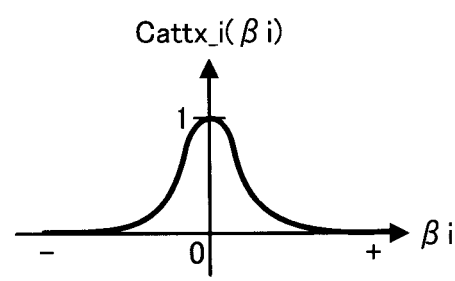

In this case, the value of the coefficient Cslp_i(κi) required to compute the right side of expression 1-8a is determined from the wheel slip rate estimated value κi_estm on the basis of a map indicating the relationship illustrated in FIG. 6(a). Further, the value of the coefficient Catty_i(βi) required to compute the right side of expression 1-8a is determined from the wheel skid angle estimated value βi_estm on the basis of a map indicating the relationship illustrated in FIG. 6(b). The value of Cbeta_i(βi) required to compute the right side of expression 1-9a is determined from the wheel side slip rate estimated value βi_estm on the basis of a map representing the relationship illustrated in FIG. 7(a). The value of the coefficient Cattx_i(κi) required to compute the right side of expression 1-9a is determined from the wheel slip rate estimated value κi_estm on the basis of a map representing the relationship illustrated in FIG. 7(b).

Thus, the driving/braking force estimated value Fsubx_i_estm and the lateral force estimated value Fsuby_i_estm as the estimated values of the road surface reaction force (friction force) dependent upon the road surface friction coefficient μ out of the road surface reaction force acting on each wheel 2-i are calculated by using a latest value of the road surface friction coefficient estimated value μ_estm (the previous value μ_estm_p) and the friction characteristic model.

Supplementally, in this embodiment, the function func_fx_i has been set such that the driving/braking force Fsubx_i of each wheel 2-i is proportional to the road surface friction coefficient μ. Alternatively, however, the function func_fx_i may be set according to, for example, expression 1-8b given below.

$$\text{func\_fx\_i}(\kappa i, \beta i, Fz\_i, \mu) = C\text{slp2\_i}(\mu, \kappa i) \cdot C\text{attx\_i}(\beta i) \cdot Fz\_i \quad \text{Expression 1-8b}$$

In expression 1-8b, Cslp2_i(μ, κi) denotes a coefficient that defines the characteristic of changes in the driving/braking force Fsubx_i caused by changes in the road surface friction coefficient μ and the wheel slip rate κi, and the coefficient Cslp2_i(μ, κi) is obtained by further generalizing μ*Cslp_i(κi) in expression 1-8a described above.

Figure 8:
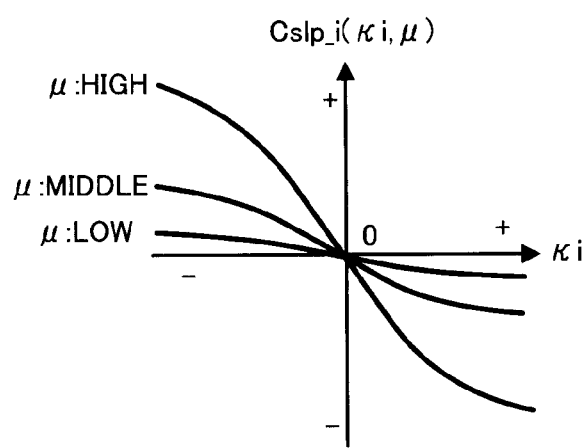
FIG. 8 is a graph for describing the processing of another mode of the wheel slip rate estimator illustrated in FIG. 5.

In this case, the relationship between the coefficient Cslp2_i(μ, κi) and the road surface friction coefficient μ and the wheel slip rate κi is set as illustrated in the graph of FIG. 8 by, for example, a map. The relationship is set such that the coefficient Cslp2_i(μ, κi) becomes a monotonically decreasing function relative to the wheel slip rate κi and the absolute value thereof becomes a monotonically increasing function relative to the road surface friction coefficient μ.

FIG. 8 representatively illustrates a graph of Cslp2_i(μ, κi) corresponding to the values of three different types of road surface friction coefficients μ. Further, according to the relationship illustrated in FIG. 8, the coefficient Cslp2_i(μ, κi) has a saturation characteristic relative to the wheel slip rate κi. This means that, if the absolute value of id increases, the magnitude of the rate of change (the value obtained by partially differentiating Cslp2_i(μ, κi) by κi) in the coefficient Cslp2_i(μ, κi) in response to an increase in κi decreases as the absolute value of κi increases.

In the case where the function func_fx_i is set as described above, a non-linear relationship can be set between the driving/braking force Fsubx_i of each wheel 2-i and the road surface friction coefficient μ.

For the function func_fy_i related to the lateral force Fsuby_i of each wheel 2-i, a coefficient Cbeta2_i (μ, βi) that defines the characteristic of changes in the lateral force Fsuby_i caused by changes in the road surface friction coefficient μ and the wheel skid angle βi may be used in place of μ*Cbeta_i(βi) in expression 1-9a, as with the case of the function func_fx_i related to the driving force Fsubx_i.

The function func_fy_i related to the lateral force Fsuby_i of each wheel 2-i may be formed with the driving/braking force Fsubx_i as an input parameter in place of the wheel slip rate κi. In this case, as the value of Fsubx_i, the driving/braking force estimated value Fsubx_i_estm found as described above using the function func_fx_i of the aforesaid expression 1-8a or 1-8b may be used. Alternatively, however, for example, the driving/braking force detected value Fsubx_i_sens found as follows may be used as the value of Fsubx_i.

More specifically, in the aforesaid S100, the driving/braking force detected value Fsubx_i_sens is found according to expression 1-8c given below on the basis of the wheel torque detected value Tq_i_sens and the wheel speed detected value Vw_i_sens of each wheel 2-i generated by the quantity-to-be-observed detecting means 22.

$$Fsubx\_i\_sens = Tq\_i\_sens/Rw\_i - Vwdot\_i\_sens * Iw\_i/Rw\_i^2 \quad \text{Expression 1-8c}$$

Vwdot_i_sens of the right side of expression 1-8c denotes the temporal change rate (a differential value) of the wheel speed detected value Vw_i_sens. Predetermined values that have been set in advance are used as the values of the effective wheel radius Rw_i and the wheel inertia moment Iw_i in expression 1-8c.

The second term of the right side of expression 1-8c may be replaced by a term ωwdot_i_sens*Iw_i/Rw_i using ωwdot_i_sens, which is a differential value of the wheel rotational angular velocity detected value ωw_i_sens indicated by an output value of the wheel rotational angular velocity sensor 8-i.

Referring back to the description with reference to FIG. 4, subsequently in S112, the resultant force calculator 24c calculates the total road surface reaction force resultant translational force vector estimated value ↑Fg_total_estm and the total road surface reaction force resultant yaw moment estimated value Mgz_total_estm.

In this case, the resultant force calculator 24c calculates the total road surface reaction force resultant translational force vector estimated value ↑Fg_total_estm and the total road surface reaction force resultant yaw moment estimated value Mgz_total_estm on the basis of the ground contact load estimated value Fz_i_estm of each wheel 2-i calculated in S102, the driving/braking force estimated value Fsubx_i_estm and the lateral force estimated value Fsuby_i_estm of each wheel 2-i calculated in S110, and the front wheel rudder angle detected value δf_sens (=δ1_sens=δ2_sens) of the detected values of the quantities to be observed that have been obtained in S100.

To be more specific, the resultant force calculator 24c first coordinate-transforms the estimated value of the two-dimensional road surface reaction force vector on the wheel coordinate system ↑Fsub_i_estm (=(Fsubx_i_estm, Fsuby_i_estm)$^T$) onto the vehicle body coordinate system for each wheel 2-i according to expression 1-10 given below to calculate the two-dimensional road surface reaction force vector estimated value ↑Fi_estm=(Fx_i_estm, Fy_i_estm)$^T$.

$$\uparrow Fi\_estm = Rot(\delta i\_sens) * \uparrow Fsub\_i\_estm \quad \text{Expression 1-10}$$

In this case, regarding the front wheels 2-1 and 2-2 in expression 1-10, the front wheel rudder angle detected value δf_sens is used as the values for δ1_sens and δ2_sens. Further, in this embodiment, since the rear wheels 2-3 and 2-4 are non-steering wheels, the values of δ3_sens and δ4_sens in expression 1-10 are assumed to be zero. Hence, the arithmetic processing of expression 1-10 may be omitted for the rear wheels 2-3 and 2-4, because ↑F3_estm=↑Fsub_3_estm and ↑F4_estm=↑Fsub_4_estm hold.

Subsequently, the resultant force calculator 24c calculates the total road surface reaction force resultant translational force vector estimated value ↑Fg_total_estm (=(Fgx_total_estm, Fgy_total_estm, Fgz_total_estm)$^T$) according to expression 1-11 given below, and also calculates the total road surface reaction force resultant yaw moment estimated value Mgz_total_estm according to expression 1-12 given below.

$$\uparrow Fg\_total\_estm = (\Sigma Fx\_i\_estm, \Sigma Fy\_i\_estm, \Sigma Fz\_i\_estm)^T \quad \text{Expression 1-11}$$

$$Mgz\_total\_estm = \Sigma(\uparrow Pi \times \uparrow Fi\_estm) \quad \text{Expression 1-12}$$

The symbol Σ in expressions 1-11 and 1-12 means the total sum on all wheels 2-i (i=1, 2, 3, 4). "↑Pi×↑Fi_estm" in the right side of expression 1-12 denotes the exterior product of the wheel position vector ↑Pi of the i-th wheel 2-i and the two-dimensional road surface reaction force vector estimated value ↑Fi_estm, meaning the moment about the yaw axis generated at the center-of-gravity point of the vehicle 1 by the two-dimensional road surface reaction force vector estimated value ↑Fi_estm of the i-th wheel 2-i.

Supplementally, the calculation of the component in the yaw axis direction Fgz_total_estm of ↑Fg_total_estm may be omitted.

Subsequently, in S114, the vehicle motion estimator 24e calculates the vehicle center-of-gravity longitudinal velocity estimated value Vgx_estm, the vehicle center-of-gravity skid speed estimated value Vgy_estm, the yaw rate estimated value γ_estm, the vehicle center-of-gravity longitudinal acceleration estimated value Accx_estm, the vehicle center-of-gravity lateral acceleration estimated value Accy_estm, and the like, as the vehicle motion state quantity estimated value.

Here, the vehicle motion estimator 24e has a vehicle motion model representing the relationship between the resultant force of road surface reaction forces as an external force acting on the vehicle 1 and motions of the vehicle 1. The vehicle motion model in this embodiment is represented by expressions 1-13 to 1-15 given below.

$$Fgx\_total = m*(Vgdot\_x - Vgy*\gamma) \qquad \text{Expression 1-13}$$

$$Fgy\_total = m*(Vgdot\_y + Vgx*\gamma) \qquad \text{Expression 1-14}$$

$$Mgz\_total = Iz*\gamma dot \qquad \text{Expression 1-15}$$

Expressions 1-13 and 1-14 respectively denote the equations of the dynamics related to the translational motion of the center-of-gravity point of the vehicle 1 in the X-axis direction and the Y-axis direction of the vehicle body coordinate system. Similarly, expression 1-15 denotes the equation of the dynamics related to the rotational motion about the yaw axis of the vehicle 1.

The vehicle motion model in this embodiment is based on the assumption that the road surface on which the vehicle 1 is traveling is a horizontal surface (the road surface bank angle θbank and the road surface slope angle θslope are both zero).

In S114, the vehicle motion estimator 24d calculates the vehicle motion state quantity estimated value by using the vehicle motion models represented by the above expressions 1-13 to 1-15 and the total road surface reaction force resultant translational force vector estimated value ↑Fg_total_estm and the total road surface reaction force resultant yaw moment estimated value Mgz_total_estm, which have been calculated in S112.

In this case, the previous values of some vehicle motion state quantity estimated values are also used for the calculation thereof. Further, some vehicle motion state quantity estimated values are calculated so as to approach the detected values obtained in S100 (so as not to deviate from the detected values).

To be more specific, the vehicle motion estimator 24d calculates the vehicle center-of-gravity longitudinal velocity change rate estimated value Vgdot_x_estm, the vehicle center-of-gravity skid speed change rate estimated value Vgdot_y_estm, and the yaw angular acceleration estimated value γdot_estm, respectively, according to the following expressions 1-13a to 1-15a obtained based on the aforesaid expressions 1-13 to 1-15.

$$Vgdot\_x\_estm = Fgx\_total\_estm/m + Vgy\_estm\_p*\gamma\_estm\_p \qquad \text{Expression 1-13a}$$

$$Vgdot\_y\_estm = Fgy\_total\_estm/m - Vgx\_estm\_p*\gamma\_estm\_p \qquad \text{Expression 1-14a}$$

$$\gamma dot\_estm = Mgz\_total\_estm/Iz \qquad \text{Expression 1-15a}$$

In this case, Fx_total_estm, Fy_total_estm, and Mgz_total_estm in expressions 1-13a to 1-15a respectively denote the values calculated in S112 (the current values), and Vgy_estm_p, Vgx_estm_p, and γ_estm_p respectively denote the values found in S114 (the previous values) in a previous arithmetic processing cycle. Moreover, Vgdot_x_estm in expression 1-16a and Vgdot_y_estm in expression 1-17a are values (the current values) calculated according to expressions 1-13a and 1-14a, respectively. Further, as the value of the vehicle mass m in expressions 1-13a and 1-14a and the value of the vehicle yaw inertia moment Iz in expression 1-15a, predetermined values that have been set beforehand are used.

Supplementally, the yaw rate detected value γ_sens (the previous value or the current value) may be used in place of the yaw rate estimated value (the previous value) γ_estm_p of expression 1-13a and expression 1-14a.

Subsequently, the vehicle motion estimator 24d calculates the vehicle center-of-gravity longitudinal velocity provisional estimated value Vgx_predict as the provisional value of the vehicle center-of-gravity longitudinal velocity estimated value, the vehicle center-of-gravity skid speed provisional estimated value Vgy_predict as the provisional value of the vehicle center-of-gravity skid speed estimated value, and the yaw rate provisional estimated value γ_predict as the provisional value of the yaw rate estimated value, respectively, according to expressions 1-18, 1-19, and 1-20 given below on the basis of the vehicle center-of-gravity longitudinal velocity change rate estimated value Vgdot_x_estm, the vehicle center-of-gravity skid speed change rate estimated value Vgdot_y_estm, the yaw angular acceleration estimated value γdot_estm, the previous value Vgx_estm_p of the vehicle center-of-gravity longitudinal velocity estimated value, the previous value Vgy_estm_p of the vehicle center-of-gravity skid speed estimated value, and the previous value γ_estm_p of the yaw rate estimated value, which have been found as described above.

$$Vgx\_predict = Vgx\_estm\_p + Vgdot\_x\_estm*\Delta T \qquad \text{Expression 1-18}$$

$$Vgy\_predict = Vgy\_estm\_p + Vgdot\_y\_estm*\Delta T \qquad \text{Expression 1-19}$$

$$\gamma\_predict = \gamma\_estm\_p + \gamma dot\_estm*\Delta T \qquad \text{Expression 1-20}$$

The symbol ΔT in expressions 1-18 to 1-20 denotes the arithmetic processing cycle of the controller 20. The right sides of these expressions 1-18 to 1-20 correspond to the integral computation of Vgdot_x_estm, the integral computation of Vgdot_y_estm, and the integral computation of γdot_estm, respectively.

Here, in this embodiment, regarding the yaw rate γ of the motion state quantity to be estimated, the vehicle motion estimator 24d determines the yaw rate estimated value γ_estm such that the yaw rate estimated value γ_estm is brought close to the yaw rate detected value γ_sens (such that the yaw rate estimated value γ_estm does not deviate from γ_sens).

Further, also regarding the vehicle center-of-gravity longitudinal velocity Vgx, which means the vehicle speed of the vehicle 1, the vehicle motion estimator 24d determines the vehicle center-of-gravity longitudinal velocity estimated value Vgx_estm such that the vehicle center-of-gravity longitudinal velocity estimated value Vgx_estm is brought close to the vehicle center-of-gravity longitudinal velocity recognized from the wheel speed detected value Vw_i_sens (i=1, 2, 3, 4) (such that the vehicle center-of-gravity longitudinal velocity estimated value Vgx_estm does not deviate from the recognized vehicle center-of-gravity longitudinal velocity).

Then, regarding the yaw rate γ, the vehicle motion estimator 24d calculates the yaw rate deviation γestm_err, which is a difference between the yaw rate detected value γ_sens obtained in S100 and the yaw rate provisional estimated value γ_predict calculated by expression 1-20 as described above, according to expression 1-21 given below.

Further, regarding the vehicle center-of-gravity longitudinal velocity Vgx, the vehicle motion estimator 24d calculates the vehicle speed deviation Vgx_estm_err, which is a difference between a selected wheel speed detected value Vw_i_sens_select, which is any one of the wheel speed detected values Vw_i_sens (i=1, 2, 3, 4) obtained in S100, and a vehicle longitudinal velocity provisional estimated value Vgx_predict calculated by expression 1-18 as described above, according to expression 1-22 given below.

The aforesaid selected wheel speed detected value Vw_i_sens_select is a value selected from the wheel speed detected value Vw_i_sens (i=1, 2, 3, 4) as the one corresponding to an actual wheel speed detected value (the detected value of the actual vehicle center-of-gravity longitudinal velocity Vgx_act) based on the wheel speed detected value Vw_i_sens (i=1, 2, 3, 4).

In this case, when the vehicle 1 is accelerated, the slowest wheel speed detected value among the wheel speed detected values Vw_i_sens (i=1, 2, 3, 4) is selected as the selected wheel speed detected value Vw_i_sens_select. When the vehicle 1 is decelerated, the fastest wheel speed detected value among the wheel speed detected values Vw_i_sens (i=1, 2, 3, 4) is selected as the selected wheel speed detected value Vw_i_sens_select.

$$\gamma estm\_err = \gamma\_sens - \gamma\_predict \quad \text{Expression 1-21}$$

$$Vgx\_estm\_err = Vw\_i\_sens\_select - Vgx\_predict \quad \text{Expression 1-22}$$

Subsequently, the vehicle motion estimator 24d determines the final values of the vehicle center-of-gravity longitudinal velocity estimated value Vgx_estm, the vehicle center-of-gravity skid speed estimated value Vgy_estm, and the yaw rate estimated value γ_estm in the current arithmetic processing cycle according to expressions 1-23 to 1-25 given below, respectively.

$$Vgx\_estm = Vgx\_predict + Kvx*Vgx\_estm\_err \quad \text{Expression 1-23}$$

$$Vgy\_estm = Vgy\_predict \quad \text{Expression 1-24}$$

$$\gamma\_estm = \gamma\_predict + K\gamma*\gamma estm\_err \quad \text{Expression 1-25}$$

Kvx in expression 1-23 and Kγ in expression 1-25 respectively denote gain coefficients having predetermined values (<1) that have been set beforehand.

In this embodiment, as indicated by these expressions 1-23 to 1-25, the vehicle center-of-gravity longitudinal velocity estimated value Vgx_estm is determined by modifying the vehicle center-of-gravity longitudinal velocity provisional estimated value Vgx_predict, which has been calculated by the aforesaid expression 1-18 (an estimated value on the vehicle motion model), according to a feedback control law (the proportional law in this case) on the basis of the vehicle speed deviation Vgx_estm_err calculated by the aforesaid expression 1-22 so as to bring the vehicle speed deviation Vgx_estm_err close to zero.

Moreover, the vehicle center-of-gravity skid speed provisional estimated value Vgy_predict (an estimated value on the vehicle motion model), which has been calculated by expression 1-19, is determined directly as a vehicle center-of-gravity skid speed estimated value Vgy_estm.

The yaw rate provisional estimated value γ_predict calculated by the aforesaid expression 1-20 (an estimated value on the vehicle motion model) is modified according to the feedback control law (the proportional law in this case) on the basis of the yaw rate deviation γ_estm_err, which has been calculated by the aforesaid expression 1-21, so as to bring the yaw rate deviation γ_estm_err close to zero.

Thus, according to this embodiment, the vehicle center-of-gravity longitudinal velocity estimated value Vgx_estm as the vehicle speed of the vehicle 1 on the vehicle motion model is determined such that the estimated value Vgx_estm does not deviate from the selected wheel speed detected value Vw_i_sens_select as the detected value of the actual vehicle speed (such that Vgx_estm agrees or substantially agrees with Vw_i_sens_select).

Further, the yaw rate estimated value γ_estm as the yaw rate of the vehicle 1 on the vehicle motion model is determined such that the yaw rate estimated value γ_estm does not deviate from the yaw rate detected value γ_sens as the detected value of the actual yaw rate γ_act (such that γ_estm agrees or substantially agrees with γ_sens).

The above is the details of the processing of S114 (processing of the vehicle motion estimator 24d).

In addition, the vehicle motion estimator 24d in this embodiment has determined the vehicle center-of-gravity longitudinal velocity estimated value Vgx_estm and the yaw rate estimated value γ_estm such that these values do not deviate from the selected wheel speed detected value Vw_i_sens_select (the detected value of the actual vehicle speed) and the yaw rate detected value γ_sens, respectively. Alternatively, however, either one or both of Vgx_estm and γ_estm may be arranged to always agree with one or both Vw_i_sens_select and γ_sens. In this case, the processing for calculating Vgx_estm or γ_estm is unnecessary.

The vehicle motion estimator 24d has found Vgdot_x_estm, Vgx_estm, Vgdot_y_estm, Vgy_estm, and γ_estm as the vehicle motion state quantity estimated values. Alternatively, however, more vehicle motion state quantity estimated values may be found in addition thereto, as necessary.

For example, in the case where the vehicle motion state quantity estimated values are used to control the vehicle center-of-gravity skid angle βg, the vehicle center-of-gravity skid angle estimated value βg_estm may be calculated. In this case, the vehicle center-of-gravity skid angle estimated value βg_estm can be calculated according to expression 1-26 given below from the vehicle center-of-gravity longitudinal velocity estimated value Vgx_estm and the vehicle center-of-gravity skid speed estimated value Vgy_estm, which have been found as described above.

$$\beta g\_estm = \tan^{-1}(Vgy\_estm/Vgx\_estm) \quad \text{Expression 1-26}$$

Subsequently, in S116 of FIG. 4, the wheel motion estimator 24f calculates the wheel speed estimated value Vw_i_estm of each wheel 2-i.

Here, the wheel motion estimator 24f has a wheel motion model, which represents the relationship between the forces acting on each wheel 2-i (the wheel torque Tq_i and the driving/braking force) and the rotational motion of each wheel 2-i. The wheel motion model is represented by expression 1-27 given below in this embodiment.

$$Tq\_i - Fsubx\_i*Rw\_i = Iw\_i*(Vwdot\_i/Rw\_i) \quad \text{Expression 1-27}$$

"Vwdot_i" in expression 1-27 denotes the temporal change rate (a differential value) of the wheel speed Vw_i of an i-th wheel 2-1 and will be hereinafter referred to as the wheel speed change rate. The left side of expression 1-27 means a resultant torque of the wheel torque Tq_i imparted to the i-th wheel 2-i from one or both of the driving system and the braking system of the vehicle 1 and the torque imparted to the wheel 2-i by the driving/braking force Fsubx_i of the i-th wheel 2-i.

Then, the wheel motion estimator 24f first calculates the wheel speed change rate estimated value Vwdot_i_estm of each wheel 2-i according to expression 1-27a given below, which is obtained based on expression 1-27.

$$Vwdot\_i\_estm = Rw\_i*(Tq\_i\_sens - Fsubx\_i\_estm*Rw\_i)/Iw\_i \quad \text{Expression 1-27a}$$

In this case, Tq_i_sens of expression 1-27a denotes the detected value (the current value) obtained in S100 on each wheel 2-i, and Fsubx_i_estm denotes the value (the current value) determined in S110 on each wheel 2-i. Predetermined values set beforehand are used as the values of the effective wheel radius Rw_i and the wheel inertia moment Iw_i of each wheel 2-i.

Subsequently, the wheel motion estimator 24f calculates the wheel speed provisional estimated value Vw_i_predict as the provisional value of the wheel speed estimated value according to expression 1-28 given below for each wheel 2-i on the basis of the wheel speed change rate estimated value Vwdot_i_estm found as described above and the previous value of the wheel speed estimated value Vw_i_estm_p.

$$Vw\_i\_predict = Vw\_i\_estm\_p + Vwdot\_i\_estm * \Delta T \quad \text{Expression 1-28}$$

Expression 1-28 corresponds to the integral computation of Vwdot_i_estm.

Here, in this embodiment, the wheel motion estimator 24f determines the wheel speed estimated value Vw_i_estm such that the wheel speed estimated value Vw_i_estm approaches the wheel speed detected value Vw_i_sens (such that the estimated value Vw_i_estm does not deviate from Vw_i_sens), as with the calculation of the yaw rate estimated value γ_estm by the wheel motion estimator 24d.

Then, according to the following expression 1-29, the wheel motion estimator 24f calculates, on each wheel 2-i, the wheel speed deviation Vw_i_estm_err as a difference between the wheel speed estimated value Vw_i_sens, which has been obtained in S110, and the wheel speed provisional estimated value Vw_i_predict, which has been calculated by expression 1-28 as described above.

$$Vw\_i\_estm\_err = Vw\_i\_sens - Vw\_i\_predict \quad \text{Expression 1-29}$$

Subsequently, the wheel motion estimator 24f determines, on each wheel 2-i, a final wheel speed estimated value Vw_i_estm in the current arithmetic processing cycle according to the following expression 1-30.

$$Vw\_i\_estm = Vw\_i\_predict + Kvw * Vw\_i\_estm\_err \quad \text{Expression 1-30}$$

"Kvw" in expression 1-30 denotes a gain coefficient of a predetermined value (<1), which has been set beforehand.

Thus, in this embodiment, each wheel speed estimated value Vw_i_estm is determined by modifying each wheel speed provisional estimated value Vw_i_predict (an estimated value on the vehicle motion model), which has been calculated by the aforesaid expression 1-28, according to a feedback control law (the proportional law in this case) on the basis of the wheel speed deviation Vw_i_estm_err calculated by the aforesaid expression 1-29 such that the wheel speed deviation Vw_i_estm_err approaches zero.

The processing of S102 to S116 described above is the detail of the processing of the vehicle model computing means 24.

Subsequently, the controller 20 performs the processing by the μ estimating means 26 in S118.

Before describing the processing in detail, the principle for estimating the road surface friction coefficient μ in this embodiment will be first described.

In this case, for the convenience of description, it is assumed that the dynamics of the actual vehicle 1 is approximately represented by the following expression 4-1.

[Eq. 1]

$$\frac{d}{dt}\begin{bmatrix} Vgy\_act \\ \gamma\_act \end{bmatrix} = \frac{1}{Vgx\_act} * \begin{bmatrix} A11 & -Vgx\_act^2 + A12s \\ A21 & A22 \end{bmatrix} * \begin{bmatrix} Vgy\_act \\ \gamma\_act \end{bmatrix} + \begin{bmatrix} B1 \\ B2 \end{bmatrix} * \delta f\_act - \begin{bmatrix} g \\ 0 \end{bmatrix} * \sin(\theta bank\_act) \quad \text{Expression 4-1}$$

where:

$A11 = -2*(CPf + CPr)/m$ $A12s = -2*(Lf*CPf - Lr*CPr)/m$ $A21 = -2*(Lf*CPf - Lr*CPr)/Iz$ $A22 = -2*(Lf^2*CPf + Lr^2*CPr)/Iz$ $B1 = 2*CPf/m$ $B2 = 2*Lf*CPf/Iz$

CPf: Cornering power of the front wheel of the 2-wheel model
CPr: Cornering power of the rear wheel of the 2-wheel model More specifically, this expression 4-1 denotes a dynamic model that is a so-called two-wheeled model (a linear two-wheeled model), which approximately represents a skid motion and a rotational motion about the yaw axis of the actual vehicle 1 as dynamic behaviors of a model vehicle having one front wheel serving as a steering wheel and one rear wheel serving as a non-steering wheel. The cornering power CPf of the front wheel in this two-wheeled model corresponds to the cornering power per wheel of the front wheels 2-1 and 2-2 of the actual vehicle 1 (a 4-wheel vehicle). The cornering power CPr of the rear wheel in the two-wheeled model corresponds to the cornering power per wheel of the rear wheels 2-3 and 2-4 of the actual vehicle 1 (the 4-wheel vehicle).

Here, the cornering power CPf per wheel of the front wheels 2-1 and 2-2 on a reference road surface on which the value of the actual road surface friction coefficient μ_act is 1 is denoted by CPf0, and the cornering power CPr per wheel of the rear wheels 2-3 and 2-4 on the reference road surface is denoted by CPr0. Then, a proportional relationship approximately holds between each of the cornering powers CPf and CPr on a road surface having the actual road surface friction coefficient μ_act of an arbitrary value and the actual road surface friction coefficient μ_act, as represented by expressions 4-2a and 4-2b given below.

$$CPf = CPf0 * \mu\_act \quad \text{Expression 4-2a}$$

$$CPr = CPr0 * \mu\_act \quad \text{Expression 4-2b}$$

Applying these expressions 4-2a and 4-2b to the aforesaid expression 4-1 rewrites expression 4-1 to expression 4-3 given below.

[Eq. 2]

$$\frac{d}{dt}\begin{bmatrix} Vgy\_act \\ \gamma\_act \end{bmatrix} = \quad \text{Expression 4-3}$$

$$\frac{1}{Vgx\_act} * \begin{bmatrix} \mu\_act * a11 & -Vgx\_act^2 + \mu\_act * a12s \\ \mu\_act * a21 & \mu\_act * a22 \end{bmatrix} * \begin{bmatrix} Vgy\_act \\ \gamma\_act \end{bmatrix} + \begin{bmatrix} \mu\_act * b1 \\ \mu\_act * b2 \end{bmatrix} * \delta f\_act - \begin{bmatrix} g \\ 0 \end{bmatrix} * \sin(\theta bank\_act)$$

where:

$a11 = -2*(CPf0 + CPr0)/m$ $a12s = -2*(LPCPf0 - Lr*CPr0)/m$ $$a21=-2*(L_f*CP_{f0}-L_r*CP_{r0})/I_z$$

$$a22=-2*(L_f^2*CP_{f0}+L_r^2*CP_{r0})/I_z$$

$$b1=2*CP_{f0}/m$$

$$b2=2*L_f*CP_{f0}/I_z$$

Based on this expression 4-3 (the expression representing a linear two-wheeled model), the following describes a method for estimating the road surface friction coefficient μ by using a moment about the yaw axis (i.e., the aforesaid NSP yaw moment Mnsp) generated at the neutral steer point (NSP) of the vehicle 1.

First, description will be made on the technological meaning of the actual NSP yaw moment Mnsp_act related to the estimation of the road surface friction coefficient μ and a method for identifying (estimating) the value of the actual NSP yaw moment Mnsp_act from the observed value of the state quantity of a motion of the vehicle 1 related thereto.

The left side of the first line of expression 4-3 means the differential value of the actual vehicle center-of-gravity skid speed Vgy_act (temporal change rate), i.e., the actual vehicle center-of-gravity skid speed change rate Vgdot_y_act. Therefore, the first line of expression 4-3 can be rewritten to the following expression 4-4.

$$Vgdot\_y\_act+Vgx\_act*\gamma\_act+g*\sin(\theta bank\_act)= \mu\_act*a11*Vgy\_act/Vgx\_act+\mu\_act*a12s*\gamma\_act/Vgx\_act+\mu\_act*b1*\delta f\_act \quad \text{Expression 4-4}$$

Meanwhile, as apparent from the definition of the aforesaid vehicle center-of-gravity lateral acceleration Accy (Accy=Vgdot_y+Vgx*γ) and the description of the sensed-by-sensor lateral acceleration Accy_sensor, the left side of expression 4-4 agrees with the actual sensed-by-sensor lateral acceleration Accy_sensor_act (the acceleration actually sensed by the lateral acceleration sensor 15). Thus, expression 4-5 given below is obtained from expression 4-4.

$$Accy\_sensor\_act=Vgdot\_y\_act+Vgx\_act*\gamma\_act+g*\sin(\theta bank\_act) \quad \text{Expression 4-5}$$

This expression 4-5 indicates that the left side of expression 4-4 agrees with the actual sensed-by-sensor lateral acceleration Accy_sensor_act. Thus, the following expression 4-6 is derived from expressions 4-4 and 4-5.

$$Accy\_sensor\_act=\mu\_act*a11*Vgy\_act/Vgx\_act+ \mu\_act*a12s*\gamma\_act/Vgx\_act+\mu\_act*b1*\delta f\_act \quad \text{Expression 4-6}$$

The right side of this expression 4-6 corresponds to the value obtained by dividing a component in the lateral direction of the vehicle body 1B in the translational force vector acting on the center-of-gravity point of the vehicle 1 due to the resultant force of the actual road surface reaction forces acting on each wheel 2-i from a road surface (i.e., a component in the X-axis direction Fgy_total_act of the actual total road surface reaction force resultant translational force vector ↑Fg_total_act) by the vehicle mass m. Hence, expression 4-6 represents a relationship in which Accy_sensor_act (=Accy_act+g*sin(θbank_act)) agrees with Fgy_total_act/m.

The left side of the expression of the second line of expression 4-3 means the differential value (the temporal change rate) of the actual yaw rate γ_act, that is, the actual yaw angular acceleration γdot_act, and therefore the expression of the second line of expression 4-3 can be rewritten to expression 4-7 given below.

$$\gamma dot\_act=\mu\_act*a21*Vgy\_act/Vgx\_act+ \mu\_act*a22*\gamma\_act/Vgx\_act+\mu\_act*b2*\delta f\_act \quad \text{Expression 4-7}$$

The right side of this expression 4-7 corresponds to the value obtained by dividing a moment about the yaw axis acting on the center-of-gravity point of the vehicle 1 due to the resultant force of the actual road surface reaction forces acting on each wheel 2-i from a road surface (i.e., an actual total road surface reaction force resultant yaw moment Mgz_act) by a vehicle yaw inertia moment Iz. Hence, expression 4-7 represents a relationship in which γdot_act agrees with Mgz_act/Iz.

Taking the above expressions 4-6 and 4-7 as simultaneous equations, eliminating Vgv_act results in the following expression 4-8.

$$\gamma dot\_act-(a21/a11)*Accy\_sensor\_act=\mu\_act*((a22-(a21/a11)*a12s)*\gamma\_act/Vx\_act+(b2-(a21/a11)*b1)*\delta f\_act) \quad \text{Expression 4-8}$$

Here, as described above, NSP means the load application point (the working point) of the resultant force of the lateral forces Fsuby_i (i=1, 2, 3, 4) acting on all the wheels 2-i (i=1, 2, 3, 4) when the vehicle center-of-gravity skid angle βg occurs while the vehicle 1 is traveling in the situation where δ1=δ2=0 holds.

Therefore, in the dynamic model of the vehicle 1 represented by the aforesaid expression 4-3, the relationship represented by expression 4-9 given below holds between the distance Lnsp between the vehicle center of gravity and NSP, which is the distance between the center-of-gravity point of the vehicle 1 and NSP, and the cornering powers CPf0 and CPr0 of the aforesaid reference road surface.

$$Lnsp=-(L_f*CP_{f0}-L_r*CP_{r0})/(CP_{f0}+CP_{r0}) \quad \text{Expression 4-9}$$

Further, expression 4-10 given below is derived from the above expression 4-9 and the definitions of a11 and a21 given in the note of the aforesaid expression 4-2.

$$a21/a11=-Lnsp*m/Iz \quad \text{Expression 4-10}$$

Then, applying this expression 4-10 to the left side of the aforesaid expression 4-8 rewrites expression 4-8 to the following expression 4-11.

$$Iz*\gamma dot\_act+Lnsp*m*Accy\_sensor\_act=\mu\_act*p(\gamma\_act,\delta f\_act,Vx\_act) \quad \text{Expression 4-11}$$

where $$p(\gamma\_act,\delta f\_act,Vx\_act)=Iz*((a22-(a21/a11)*a12s)*\gamma\_act/Vx\_act+(b2-(a21/a11)*b1)*\delta f\_act) \quad \text{Expression 4-12}$$

Both sides of expression 4-11 mean an actual moment about the yaw axis at NSP (an actual NSP yaw moment Mnsp_act). More specifically, the actual NSP yaw moment Mnsp_act agrees with the left side and the right side of expression 4-11, as represented by expressions 4-13a and 4-13b given below.

$$Mnsp\_act=Iz*\gamma dot\_act+Lnsp*m*Accy\_sensor\_act \quad \text{Expression 4-13a}$$

$$Mnsp\_act=\mu\_act*p(\gamma\_act,\delta f\_act,Vx\_act) \quad \text{Expression 4-13b}$$

Expression 4-13a represents the actual NSP yaw moment Mnsp_act as an external force moment (a moment with a sign reversed from the sign of an actual inertial force moment) balancing out the actual inertial force moment about the yaw axis generated at NSP by a motion of the vehicle 1 (a moment component of an actual inertial force).

The first term of the right side of expression 4-13a corresponds to an external force moment (i.e., the actual total road surface reaction force resultant yaw moment Mgz_total_act) balancing out the actual inertial force moment about the yaw axis generated at the center-of-gravity point of the vehicle 1 by a motion of the vehicle 1.

The second term of the right side of expression 4-13b corresponds to a moment (=Lnsp*Fgy_total_act) generated about the yaw axis at NSP by a translational external force (i.e., the component in the Y-axis direction of the vehicle body coordinate system Fgy_total_act of the actual total road surface reaction force resultant translational force vector ↑Fg_total_act) balancing out an actual translational inertial force (a translational force component of an actual inertial force) in the Y-axis direction of the vehicle body coordinate system generated at the center-of-gravity point of the vehicle 1 by a motion of the vehicle 1.

Expression 4-13b represents the actual NSP yaw moment Mnsp_act as the actual moment about the yaw axis acting on NSP due to the resultant force of actual road surface reaction forces acting on each wheel 2-$i$ from a road surface, depending on the actual road surface friction coefficient μ_act.

As apparent from the aforesaid expression 4-13b, p (γ_act, δf_act, Vgx_act) defined by expression 4-12 means the ratio of an incremental amount of Mnsp_act relative to an incremental amount of μ_act (a differential value of Mnsp_act based on μ_act), in other words, the sensitivity of Mnsp_act to a change in μ_act (hereinafter referred to as the μ sensitivity). Further, in other words, p (γ_act, δf_act, Vgx_act) denotes the actual NSP yaw moment Mnsp_act in the case where μ_act=1 holds in the case where μ_act is 1 (in the case where the actual road surface friction coefficient μ_act agrees with the friction coefficient of the reference road surface).

Here, the right sides of both expressions 4-13a and 4-13b do not include the actual vehicle center-of-gravity skid speed Vgy_act and the actual road surface bank angle θbank_act. It is therefore understood that the value of the actual NSP yaw moment Mnsp_act is defined without depending directly on the values of the actual vehicle center-of-gravity skid speed Vgy_act and the actual road surface bank angle θbank_act.

More specifically, when the actual vehicle center-of-gravity skid speed Vgy_act changes or the actual road surface bank angle θbank_act changes, the moment component of the first term and the moment component of the second term of the right side of the aforesaid expression 4-13a change due to the above changes; however, the moment components basically change in opposite directions from each other.

Thus, the changes in the moment components of the first term and the second term, respectively, of expression 4-13a caused by a change in Vgy_act or a change in θbank_act take place such that the changes cancel each other. As a result, the actual NSP yaw moment Mnsp_act is hardly influenced by a change in Vgy_act or a change in θbank_act.

Further, as apparent from expression 4-13b, it is understood that the actual NSP yaw moment Mnsp_act changes depending on the actual road surface friction coefficient μ_act and the μ sensitivity p without depending directly on the value of Vgy_act or θbank_act in a situation where the μ sensitivity p (γ_act, δf_act, Vx_act) is not zero (p≠0).

When attention is focused on expression 4-13a out of the aforesaid expressions 4-13a and 4-13b, it is understood that observing the actual yaw angular acceleration γdot_act as the state quantity of the motion of the vehicle 1 and the actual sensed-by-sensor lateral acceleration Accy_sensor_act makes it possible to identify the value of the actual NSP yaw moment Mnsp_act generated by the resultant force of actual road surface reaction forces (which depends on the actual road surface friction coefficient μ_act) acting on each wheel 2-$i$ from a road surface on the basis of the observed values.

In this case, the right side of expression 4-13a does not include the actual road surface friction coefficient μ_act and further does not include the actual vehicle center-of-gravity lateral acceleration Vgy_act and the actual road surface bank angle θbank_act. Thus, the observed value of the actual NSP yaw moment Mnsp_act can be obtained from the observed values of the actual yaw angular acceleration γdot_act and the actual sensed-by-sensor lateral acceleration Accy_sensor_act without the need for the observed values of the actual road surface friction coefficient μ_act, the actual vehicle center-of-gravity lateral acceleration Vgy_act, and the actual road surface bank angle θbank_act.

Here, the aforesaid yaw angular acceleration detected value γdot_sens means the observed value of the actual yaw angular acceleration γdot_act, while the aforesaid vehicle center-of-gravity lateral acceleration detected value Accy_sens means the observed value of the actual sensed-by-sensor lateral acceleration Accy_sensor_act.

Hence, the values calculated by an expression, in which γdot_act and Accy_sensor_act of the right side of expression 4-13a have been replaced by γdot_sens and Accy_sens, which are the observed values thereof, will be hereinafter referred to as the NSP yaw moment detected value Mnsp_sens. This Mnsp_sens is defined by expression 4-14 given below.

$$M\text{nsp\_sens}=Iz*\gamma\text{dot\_sens}+L\text{nsp}*m*\text{Acc}y\_\text{sens} \quad \text{Expression 4-14}$$

In this case, if it is assumed that the yaw angular acceleration detected value γdot_sens and the vehicle center-of-gravity lateral acceleration detected value Accy_sens accurately agree with the actual yaw angular acceleration detected value γdot_act and the actual sensed-by-sensor lateral acceleration Accy_sensor_act, respectively, then Mnsp_act equals Mnsp_sens.

Accordingly, from the yaw angular acceleration detected value γdot_sens and the vehicle center-of-gravity lateral acceleration detected value Accy_sens, the NSP yaw moment detected value Mnsp_sens as the observed value of the actual NSP yaw moment Mnsp_act can be calculated by expression 4-14. The NSP yaw moment detected value Mnsp_sens calculated as described above carries a meaning as the value (detected value) of Mnsp estimated on the basis of the observed value of the state quantity of the motion of the vehicle 1 without the need for the value of the actual external force (actual road surface reaction force) acting on the vehicle 1 or the value of the actual road surface friction coefficient μ_act.

Subsequently, the description will now be given of the processing of estimating the road surface reaction forces acting on a wheel of the vehicle 1 on an appropriate dynamic model of the vehicle 1 on the basis thereof, in addition to the aforesaid NSP yaw moment detected value Mnsp_sens, by using the estimated value of the road surface friction coefficient n and then estimating the value of the NSP yaw moment Mnsp generated by the resultant force of the estimated road surface reaction forces.

Here, in this embodiment, the road surface reaction force estimated value is actually calculated by the vehicle model computing means 24 as described above by using a friction characteristic model or a vehicle motion model. Then, the value of the NSP yaw moment Mnsp can be estimated from the estimated value of the road surface reaction force, as described later.

However, in the description herein, for the convenience of describing the principle of estimating the road surface friction coefficient μ, it is assumed that a vehicle model computing means, which is different from the vehicle model computing means 24, (hereinafter referred to as the vehicle model computing means for the description) sequentially carries out the arithmetic processing for estimating the motion state quantity of the vehicle 1 or the road surface reaction force at a predetermined arithmetic processing cycle by using the dynamic model of the vehicle 1 represented by the aforesaid expression 4-3.

In this case, at each arithmetic processing cycle, it is assumed that the vehicle model computing means for the description receives inputs of the latest values (the previous values or the current values) of the front wheel rudder angle detected value δf_sens, the yaw rate detected value γ_sens, the vehicle center-of-gravity longitudinal velocity estimated value Vgx_estm which serve as the observed values of the vehicle speed, the road surface friction coefficient estimated value μ_estm, and the road surface bank angle estimated value θbank_estm, as the observed values of δf_act, γ_act, Vgx_act, n act, and θbank_act of the right side of expression 4-3, respectively.

Incidentally, Vgx_estm, μ_estm, and θbank_estm mean the observed values obtained by an arbitrary appropriate method. The values of parameters a11, a12s, a21, a22, b1, and b2 in the aforesaid expression 4-3 are to be preset.

Then, the vehicle model computing means for the description carries out the following estimation arithmetic processing. More specifically, the vehicle model computing means for the description calculates the vehicle center-of-gravity skid speed change rate estimated value Vgdot_y_estm, which is the estimated value of the temporal change rate (differential value) of the vehicle center-of-gravity skid speed Vgy, according to the following expression 5-1, in which the actual value of γ_act or the like in the expression of the first line of the aforesaid expression 4-3 has been replaced by an estimated value or a detected value.

$$Vgdot\_y\_estm = \mu\_estm*a11*Vgy\_estm\_p/Vgx\_estm + \mu\_estm*a12s*\gamma\_sens/Vgx\_estm + \mu\_estm*b1*\delta f\_sens - Vgx\_estm*\gamma\_sens - g*\sin(\theta bank\_estm) \quad \text{Expression 5-1}$$

The vehicle center-of-gravity skid speed estimated value Vgy_estm_p required for the computation of the first term of the right side of expression 5-1 is the previous value as the latest value of Vgy_estm, which has already been calculated by the vehicle model computing means for the description.

In this case, the result obtained by removing the fourth term and the fifth term from the right side of expression 5-1 carries a meaning as a value obtained by dividing the estimated value of a lateral component of the vehicle body 1B of the translational force vector acting on the center-of-gravity point of the vehicle 1 due to the resultant force of the road surface reaction forces of each wheel 2-i (i.e., the estimated value Fgy_total_estm of a component in the Y-axis direction of the total road surface reaction force resultant translational force vector ↑Fg_total) by the vehicle mass m.

The fourth term of the right side means the estimated value of the acceleration generated at the center-of-gravity point of the vehicle 1 due to a centrifugal force from a turning motion of the vehicle 1, and the fifth term means the estimated value of the lateral acceleration component of the vehicle body 1B of the gravitational acceleration.

Accordingly, expression 5-1 denotes the processing of calculating the vehicle center-of-gravity skid speed change rate estimated value Vgdot_y_estm by calculating Fgy_total_estm/m on the basis of μ_estm, Vgy_estm_p, Vgx_estm, γ_sens, and δf_sens, and then by subtracting the estimated value of the acceleration of the centrifugal force acting on the center-of-gravity point of the vehicle 1 (=Vgx_estm*γ_sens) and the estimated value of an acceleration component in the lateral direction of the vehicle body 1B out of the gravitational acceleration (=g*sin (θbank_estm)) from the calculated value of Fgy_total_estm/m.

Then, the vehicle model computing means for the description calculates a new vehicle center-of-gravity skid speed estimated value Vgy_estm (the current value) according to the following expression 5-2 representing the integral computation of Vgdot_y_estm on the basis of the vehicle center-of-gravity skid speed change rate estimated value Vgdot_y_estm determined as described above and the previous value of the vehicle center-of-gravity skid speed estimated value Vgy_estm_p. In expression 5-2, ΔT denotes the arithmetic processing cycle of the vehicle model computing means for the description.

$$Vgy\_estm = Vgy\_estm\_p + Vgdot\_y\_estm*\Delta T \quad \text{Expression 5-2}$$

The value of Vgy_estm calculated as described above is used to calculate the new vehicle center-of-gravity skid speed change rate Vgdot_y_estm at the next arithmetic processing cycle.

Further, the vehicle model computing means for the description calculates a sensed-by-sensor lateral acceleration estimated value Accy_sensor_estm, which is the estimated value of the actual acceleration sensed by the lateral acceleration sensor 15 of the vehicle 1 (i.e., the actual sensed-by-sensor lateral acceleration Accy_sensor_act) according to expression 5-3 given below (in other words, by the computation of the first to the third terms of the right side of expression 5-1).

$$Accy\_sensor\_estm = \mu\_estm*a11*Vgy\_estm\_p/Vgx\_estm + \mu\_estm*a12s*\gamma\_sens/Vgx\_estm + \mu\_estm*b1*\delta f\_sens \quad \text{Expression 5-3}$$

Supplementally, regarding this expression 5-3, the following expression 5-4 holds, as is obvious from the aforesaid expression 4-5.

$$Accy\_sensor\_estm = Vgdot\_y\_estm + Vgx\_estm*\gamma\_sens + g*\sin(\theta bank\_estm) \quad \text{Expression 5-4}$$

Further, as is obvious from this expression 5-4 and the aforesaid expression 5-1, the right side of expression 5-4 agrees with the sum of the first to the third terms of the right side of expression 5-1. Hence, the sensed-by-sensor lateral acceleration estimated value Accy_sensor_estm can be calculated according to the aforesaid expression 5-3.

The right side of expression 5-3 means the value obtained by dividing the estimated value of a component in the lateral direction of the vehicle body 1B of the translational force vector acting on the center-of-gravity point of the vehicle 1 due to the resultant force of the road surface reaction force of each wheel 2-i (i.e., the estimated value of a component in the Y-axis direction Fgy_total_estm of the total road surface reaction force resultant translational force vector ↑Fg_total) by the vehicle mass m.

Therefore, expression 5-3 denotes the processing of calculating Fgy_total_estm/m on the basis of μ_estm, Vgy_estm_p, Vgx_estm, γ_sens, and δf_sens, and then obtaining the calculated Fgy_total_estm/m as Accy_sensor_estm.

Further, the vehicle model computing means for the description calculates the yaw angular acceleration estimated value γdot_estm, which is the estimated value of the temporal change rate (a differential value) of the yaw angular acceleration γdot, according to the following expression 5-5 obtained by replacing the actual value of γ_act or the like in the expression on the second line of the aforesaid expression 4-3 by an estimated value or a detected value.

$$\gamma dot\_estm = \mu\_estm*a21*Vgy\_estm\_p/Vgx\_estm + \mu\_estm*a22*\gamma\_sens/Vgx\_estm + \mu\_estm*b2*\delta f\_sens \quad \text{Expression 5-5}$$

The right side of this expression 5-5 means the arithmetic processing of finding the value obtained by dividing the estimated value of a moment about the yaw axis acting on the center-of-gravity point of the vehicle 1 due to the resultant force of the road surface reaction forces of each wheel 2-*i* (i.e., the total road surface reaction force resultant yaw moment estimated value Mgz_estm) by a vehicle yaw inertia moment Iz.

Therefore, expression 5-5 denotes the processing of calculating Mgz_estm/Iz on the basis of μ_estm, Vgy_estm_p, Vgx_estm, γ_sens, and δf_sens, and then obtaining the calculated value of Mgz_estm/Iz as the yaw angular acceleration estimated value γdot_estm.

Here, Vgy_estm is eliminated with the above expressions 5-3 and 5-5 as simultaneous equations and further the aforesaid expression 4-10 is applied, by which expression 5-6 given below is obtained.

$$Iz*\gamma dot\_estm + Lnsp*m*Accy\_sensor\_estm = \mu\_estm*p(\gamma\_sens, \delta f\_sens, Vgx\_estm)$$ Expression 5-6 where:

$$p(\gamma\_sens, \delta f\_sens, Vgx\_estm) = Iz*((a22-(a21/a11)*a12s)*\gamma\_sens/Vgx\_estm + (b2-(a21/a11)*b1)*\delta f\_sens)$$ Expression 5-7

Incidentally, p(γ_sens, δf_sens, Vgx_estm) defined by expression 5-7 means the value of the μ sensitivity calculated from γ_sens, δf_sens, and Vgx_estm, which are the observed values of γ, δf, and Vgx. In the following description, the μ sensitivity p is assumed to mean p(γ_sens, δf_sens, Vgx_estm) defined by the above expression 5-7 unless otherwise specified.

More generally, the μ sensitivity p defined by expression 5-7 denotes the value of the μ sensitivity calculated by linearly combining γ_sens and δf_sens. In this case, if the coefficients by which γ_sens and δf_sens are multiplied are denoted by A1 and A2, respectively (if p=A1*γ_sens+A2*δf_sens), then A1=Iz*((a22−(a21/a11)*a12s)/Vgx_estm and A2=(b2−(a21/a11)*b1) hold.

Therefore, the coefficients A1 and A2 may be said to be the coefficients that are set such that A1 and A2 change according to Vgx_estm as the observed value of the vehicle speed of the vehicle 1 (such that A2/A1 changes in proportion to Vgx_estm).

In other words, the linear combination of γ_sens and δf_sens by expression 5-7 may be said to be the linear combination formed such that the value of the μ sensitivity p calculated by the linear combination is proportional to the value of the actual NSP yaw moment Mnsp_act identified using the observed values (the detected values) γ_sens, δf_sens, and Vgx_estm as the values of γ_act, δf_act, and Vgx_act in the case where it is assumed that the road surface friction coefficient μ_act takes a constant value in the linear two-wheeled vehicle model denoted by the aforesaid expression 4-3.

Supplementally, in this embodiment, the yaw rate estimated value γ_estm is determined so as to agree or substantially agree with the yaw rate detected value γ_sens, as described above. Hence, an expression, in which γ_sens in the right side of the aforesaid expression 5-7 has been replaced by γ_estm, may be used as a definitional expression for finding the value of the μ sensitivity p.

Both sides of the above expression 5-6 mean an NSP yaw moment estimated value Mnsp_estm, which is the estimated value of a moment about the yaw axis at NSP (the value of a moment on a model based on the aforesaid expression 4-3). In other words, the NSP yaw moment estimated value Mnsp_estm agrees with the left side and the right side of expression 5-6, as represented by expressions 5-8a and 5-8b given below.

$$Mnsp\_estm = Iz*\gamma dot\_estm + Lnsp*m*Accy\_sensor\_estm$$ Expression 5-8a $$Mnsp\_estm = \mu\_estm*p(\gamma\_sens, \delta f\_sens, Vgx\_estm)$$ Expression 5-8b Expression 5-8a represents the NSP yaw moment estimated value Mnsp_estm as the estimated value of a moment balancing out an inertial force moment (a moment with a sign reversed from the sign of the inertial force moment) generated about the yaw axis at NSP by a motion of the vehicle 1 on the model.

Expression 5-8b represents the NSP yaw moment estimated value Mnsp_estm as the estimated value of a moment about the yaw axis generated at NSP due to the resultant force of the road surface reaction forces of each wheel 2-*i*, which depends on μ_estm (the resultant force of road surface reaction forces on the model).

In this case, the NSP yaw moment estimated value Mnsp_estm calculated by expression 5-8b out of expressions 5-8a and 5-8b is calculated depending on the road surface friction coefficient estimated value μ_estm, and therefore the Mnsp_estm reflects an influence of an error of the road surface friction coefficient estimated value μ_estm.

The right side of expression 5-8b does not directly include the vehicle center-of-gravity lateral acceleration estimated value Vgy_estm or the road surface bank angle estimated value θbank_estm. For this reason, the NSP yaw moment estimated value Mnsp_estm calculated by expression 5-8b is not directly subjected to the influence of an error of the vehicle center-of-gravity lateral acceleration estimated value Vgy_estm or the road surface bank angle estimated value θbank_estm in the same manner as for the description on the actual NSP yaw moment Mnsp_act.

Accordingly, the vehicle model computing means for the description calculates the NSP yaw moment estimated value Mnsp_estm by expression 5-8b. Further generalizing the NSP yaw moment estimated value Mnsp_estm thus calculated, the estimated value Mnsp_estm carries a meaning as the estimated value of Mnsp_act calculated depending on μ_estm on the basis of a dynamic model of the vehicle 1 (more specifically, the estimated value of Mnsp_act calculated on the assumption that μ_estm is accurate).

The above has described the processing by the vehicle model computing means for the description. Supplementally, for the convenience of description of the principle for estimating the road surface friction coefficient μ, the vehicle model computing means for the description is assumed to calculate the vehicle center-of-gravity skid speed change rate estimated value Vgdot_y_estm, the vehicle center-of-gravity skid speed estimated value Vgy_estm, the yaw angular acceleration estimated value γdot_estm, and the sensed-by-sensor lateral acceleration estimated value Accy_sensor_estm. However, if the NSP yaw moment estimated value Mnsp_estm is calculated according to the aforesaid expression 5-8b on the basis of the dynamic model (the linear two-wheeled vehicle model) represented by the aforesaid expression 4-3, then Vgdot_y_estm, Vgy_estm, γdot_estm, and Accy_sensor_estm are not required, as is obvious from the aforesaid expressions 5-7 and 5-8b.

If the dynamic model represented by the aforesaid expression 4-3 is used, then the value of the computation result of the right side of the aforesaid expression 5-8a is the same as the value of the computation result of the right side of the aforesaid expression 5-8b. Therefore, Mnsp_estm may alternatively be calculated by expression 5-8a.

A method for estimating the road surface friction coefficient μ will now be discussed on the basis of the NSP yaw moment detected value Mnsp_sens obtained by the aforesaid expression 4-14 and the NSP yaw moment estimated value Mnsp_estm calculated by the aforesaid expression 5-8b.

As described above, Mnsp_sens carries a meaning as the observed value (detected value) of Mnsp_act obtained on the basis of the observed value of the state quantity of a motion of the vehicle 1 (γdot_sens, Accy_sens) without the need for the value of a road surface reaction force acting on the vehicle 1 as an external force or the value of the road surface friction coefficient μ.

Further, Mnsp_estm carries a meaning as the observed value (estimated value) of Mnsp_act calculated using μ_estm on the basis of the dynamic model of the vehicle 1. Hence, the deviation between Mnsp_sens and Mnsp_estm is considered to have correlation with the error of μ_estm relative to μ_act.

Here, it is assumed that the yaw rate detected value γ_sens, the yaw angular acceleration detected value γdot_sens, the front wheel rudder angle detected value δf_sens, the vehicle center-of-gravity longitudinal velocity estimated value Vgx_estm (the estimated value of a vehicle speed), and the vehicle center-of-gravity lateral acceleration detected value Accy_sens accurately coincide with the actual yaw rate γ_act, the actual yaw angular acceleration γdot_act, the actual front wheel rudder angle detected value of act, the actual vehicle center-of-gravity longitudinal velocity Vgx_act, and the actual sensed-by-sensor lateral acceleration Accy_sensor_act, respectively. At this time, expression 6-1 given below is derived from the aforesaid expression 4-11.

$$Iz*\gamma dot\_sens + Lnsp*m*Accy\_sens = \mu\_act*p(\gamma\_sens, \delta f\_sens, Vgx\_estm) \quad \text{Expression 6-1}$$

Further, expression 6-2 given blow is derived from this expression 6-1 and the aforesaid expressions 4-14, 5-6, and 5-8b.

$$\begin{aligned} \text{Mnsp\_sens} - \text{Mnsp\_estm} &= \\ (Iz*\gamma dot\_sens + Lnsp*m*Accy\_sens) &- \\ (Iz*\gamma dot\_estm + Lnsp*m*Accy\_sensor\_estm) &= \\ (\mu\_act - \mu\_estm)*p(\gamma\_sens, \delta f\_sens, Vgx\_estm) & \end{aligned} \quad \text{Expression 6-2}$$

Based on this expression 6-2, the road surface friction coefficient estimated value μ_estm may be determined such that Mnsp_estm agrees with Mnsp_sens in order to cause the value of μ_estm to coincide with the actual road surface friction coefficient μ_act in a situation where p(γ_sens, δf_sens, and Vgx_estm) is not zero (≠0).

More generally, this means that the road surface friction coefficient estimated value μ_estm to be applied to the dynamic model may be determined such that the estimated value of the actual NSP yaw moment Mnsp_act (the NSP yaw moment estimated value Mnsp_estm) calculated using a dynamic model including the friction characteristic of each wheel 2-i of the vehicle 1 (a dynamic model dependent upon the road surface friction coefficient estimated value μ_estm) agrees with the estimated value of the actual NSP yaw moment Mnsp_act (NSP yaw moment detected value Mnsp_sens) calculated from the yaw angular acceleration detected value γdot_sens as the observed value of a motion state quantity of the vehicle 1 and the vehicle center-of-gravity lateral acceleration detected value Accy_sens (=the detected value of the sensed-by-sensor lateral acceleration Accy_sensor).

In this case, p(γ_sens, δf_sens, Vgx_estm) of the right side of expression 6-2 does not include the vehicle center-of-gravity skid speed estimated value Vgy_estm or the road surface bank angle estimated value θbank_estm, as is obvious from the aforesaid expression 5-7.

Therefore, in the situation where p(γ_sens, δf_sens, Vgx_estm) is not zero (≠0), the value of the difference between Mnsp_sens and Mnsp_estm (the left side of expression 6-2) is considered to have high correlation with the deviation between μ_act and μ_estm (i.e., the error of μ_estm). In other words, in the situation where p(γ_sens, δf_sens, Vgx_estm) is not zero (≠0), the deviation between Mnsp_sens and Mnsp_estm is considered primarily due to the error of μ_estm.

Accordingly, it is considered that determining the road surface friction coefficient estimated value μ_estm on the basis of expression 6-2 makes it possible to estimate the actual road surface friction coefficient μ_act while restraining the influence of the error of the vehicle center-of-gravity skid speed estimated value Vgy_estm or the road surface bank angle estimated value θbank_estm. Thus, the μ estimating means 26 in this embodiment calculates the road surface friction coefficient estimated value μ_estm on the basis of the aforesaid expression 6-2.

To determine the road surface friction coefficient estimated value μ_estm on the basis of expression 6-2 as described above such that Mnsp_estm agrees with Mnsp_sens in the situation where p(γ_sens, δf_sens, Vgx_estm) is not zero (≠0), it is conceivable to determine the road surface friction coefficient estimated value μ_estm such that, for example, the following expression 6-3 is satisfied.

$$M\text{nsp\_sens} = \mu\_estm*p(\gamma\_sens, \delta f\_sens, Vgx\_estm) \quad \text{Expression 6-3}$$

$$M\text{nsp\_sens} = \mu\_estm*p(\gamma\_sens, \delta f\_sens, Vgx\_estm) \quad \text{Expression 6-3}$$

In this case, however, the road surface friction coefficient estimated value μ_estm tends to fluctuate excessively due to errors of Mnsp_sens, γ_sens, δf_sens, and Vgx_sens. Especially when the value of p(γ_sens, δf_sens, Vgx_estm) is close to zero, it is difficult to secure the reliability and stability of the road surface friction coefficient estimated value μ_estm, which is found on the basis of expression 6-3.

Hence, the μ estimating means 26 in this embodiment carries out feedback arithmetic processing based on the deviation between the NSP yaw moment detected value Mnsp_sens found from the observed value of a motion state quantity of the vehicle 1 and the NSP yaw moment estimated value Mnsp_estm found on the basis of a road surface reaction force, which is estimated depending on the road surface friction coefficient estimated value μ_estm, so as to sequentially determine the increasing/decreasing manipulated variable of μ_estm such that the deviation converges to zero (such that Mnsp_estm converges to Mnsp_sens) and then to update the value of μ_estm according to the increasing/decreasing manipulated variable.

Thus, the road surface friction coefficient estimated value μ_estm is sequentially calculated so as to converge to the actual road surface friction coefficient μ_act (steadily so as to agree with μ_act). Hereinafter, the deviation between Mnsp_sens and Mnsp_estm (=Mnsp_sens−Mnsp_estm) is referred to as the NSP yaw moment estimation error Mnsp_err in some cases.

In this case, as is obvious from the aforesaid expression 6-2, the NSP yaw moment estimation error Mnsp_err is proportional to the μ sensitivity p. As the μ sensitivity p approaches zero, the sensitivity of Mnsp_err to the error of μ_estm (the magnitude of the rate of change in Mnsp_err with respect to a change in the error of μ_estm) decreases.

In this embodiment, therefore, the gain value, which indicates the rate of change in the increasing/decreasing manipulated variable of μ_estm with respect to the change in Mnsp_err (i.e., the feedback gain of the feedback arithmetic processing for converging Mnsp_err to zero), is changed according to the μ sensitivity p in order to secure the reliability and stability of μ_estm.

The above has described the basic principle for estimating the road surface friction coefficient μ in this embodiment.

The NSP yaw moment detected value Mnsp_sens often includes a steady offset component (a DC low-frequency component) caused by a drift of the output of the lateral acceleration sensor 15, an actual road surface bank angle θbank_act, or the like.

In this case, if the actual NSP yaw moment Mnsp_act changes in polarity from one of the positive and negative polarities to the other polarity, a difference occurs between this change timing (so-called zero-cross timing) and the change timing (zero-cross timing) of the NSP yaw moment detected value Mnsp_sens.

Particularly around the zero-cross timing of Mnsp_act, the above is apt to cause a situation where the polarity of the NSP yaw moment estimation error Mnsp_err is reverse to the polarity of the deviation between the actual NSP yaw moment Mnsp_act and the NSP yaw moment estimated value Mnsp_estm (=Mnsp_act−Mnsp_estm).

Then, in such a situation, when the road surface friction coefficient estimated value μ_estm is updated to find the increasing/decreasing manipulated variable (hereinafter, sometimes referred to as "friction coefficient increasing/decreasing manipulated variable") of the road surface friction coefficient estimated value μ_estm such that Mnsp_err is brought close to zero, such a friction coefficient increasing/decreasing manipulated variable is found that updates μ_estm in a direction of being farther away from the actual road surface friction coefficient μ_act. Consequently, the road surface friction coefficient estimated value μ_estm might diverge from the actual road surface friction coefficient μ_act.

Accordingly, the μ estimating means 26 of this embodiment finds the friction coefficient increasing/decreasing manipulated variable so as to converge the deviation Mnsp_err itself between Mnsp_sens and Mnsp_estm to zero and further finds a deviation between a value, which is obtained by passing Mnsp_sens through a filter for frequency component adjustment, and a value, which is obtained by passing Mnsp_estm through the filter, to find the friction coefficient increasing/decreasing manipulated variable such that the deviation is converged to zero.

In other words, the μ estimating means 26 in this embodiment finds a plurality of types of deviations different in the range of included frequency components from each other for a deviation between Mnsp_sens and Mnsp_estm and then finds a friction coefficient increasing/decreasing manipulated variable corresponding to each deviation so as to converge each deviation to zero.

Then, the μ estimating means 26 determines an updating increasing/decreasing manipulated variable to be actually used for updating the road surface friction coefficient estimated value μ_estm from those friction coefficient increasing/decreasing manipulated variables and then determines a new μ_estm value by updating the value μ_estm on the basis of the determined updating increasing/decreasing manipulated variable.

Based on the basic principle for estimating the road surface friction coefficient μ described above, the processing by the μ estimating means 26 in this embodiment will be described with reference to FIG. 9 to FIG. 13.

Figure 9:
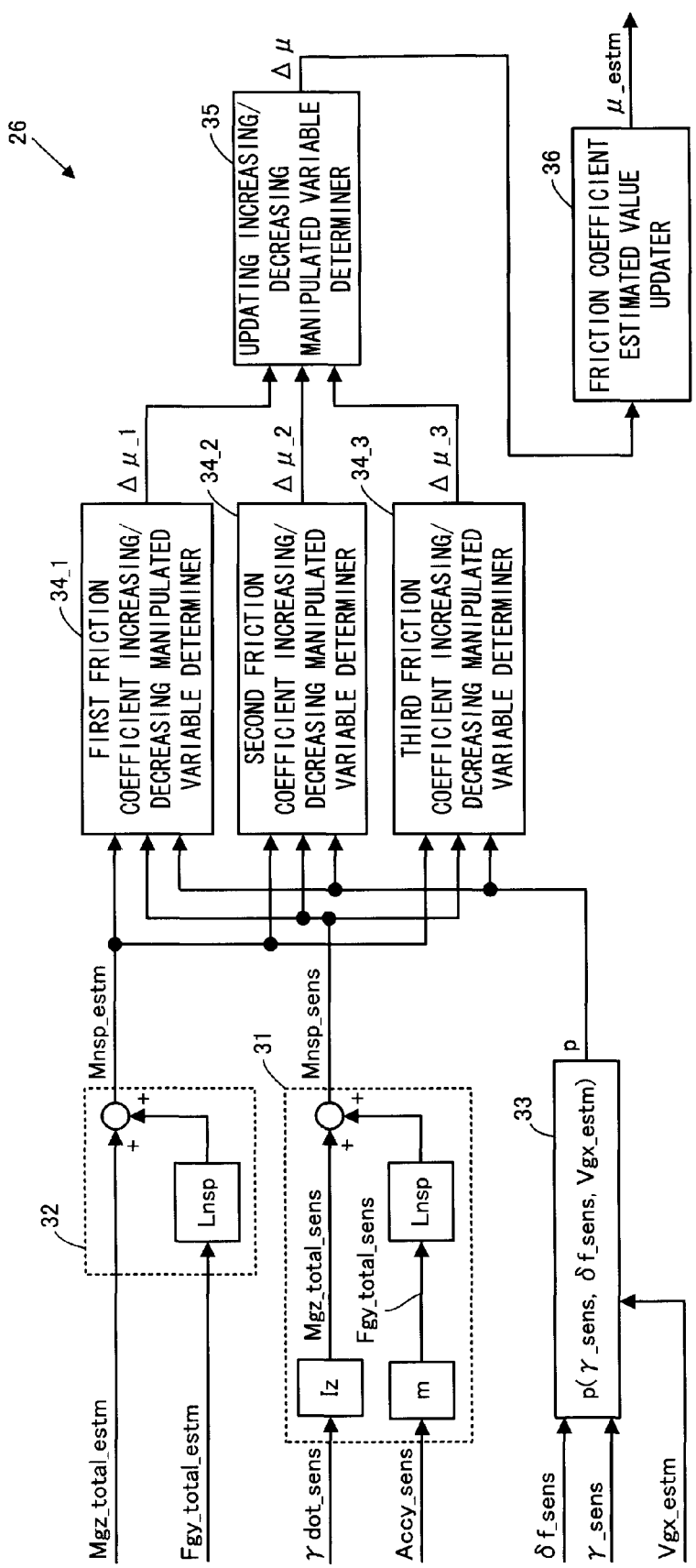
FIG. 9 is a block diagram illustrating the functions of a μ estimating means illustrated in FIG. 3.

As illustrated in the block diagram of FIG. 9, the μ estimating means 26 includes, as its functions, an Mnsp_sens calculator 31, which calculates the NSP yaw moment detected value Mnsp_sens, an Mnsp_estm calculator 32, which calculates an NSP yaw moment estimated value Mnsp_estm, a μ sensitivity calculator 33, which calculates the μ sensitivity p(γ_sens, δf_sens, Vgx_estm), first to M-th friction coefficient increasing/decreasing manipulated variable determiners 34_*k* (k=1, 2, . . . , M), which are M (a plurality of) friction coefficient increasing/decreasing manipulated variable determiners that determine friction coefficient increasing/decreasing manipulated variables Δμ_k (k=1, 2, . . . , M), respectively, on the basis of the calculated Mnsp_sens, Mnsp_estm, and p, and an updating increasing/decreasing manipulated variable determiner 35, which determines an updating increasing/decreasing manipulated variable Δμ for use in actually updating the road surface friction coefficient estimated value μ_estm from these friction coefficient increasing/decreasing manipulated variables Δμ_k (k=1, 2, . . . , M), and a friction coefficient estimated value updater 36, which updates the road surface friction coefficient estimated value μ_estm according to the updating increasing/decreasing manipulated variable Δμ. In this embodiment, the number M of the friction coefficient increasing/decreasing manipulated variable determiners 34_1 to 34_M is, for example, three.

Figure 10:
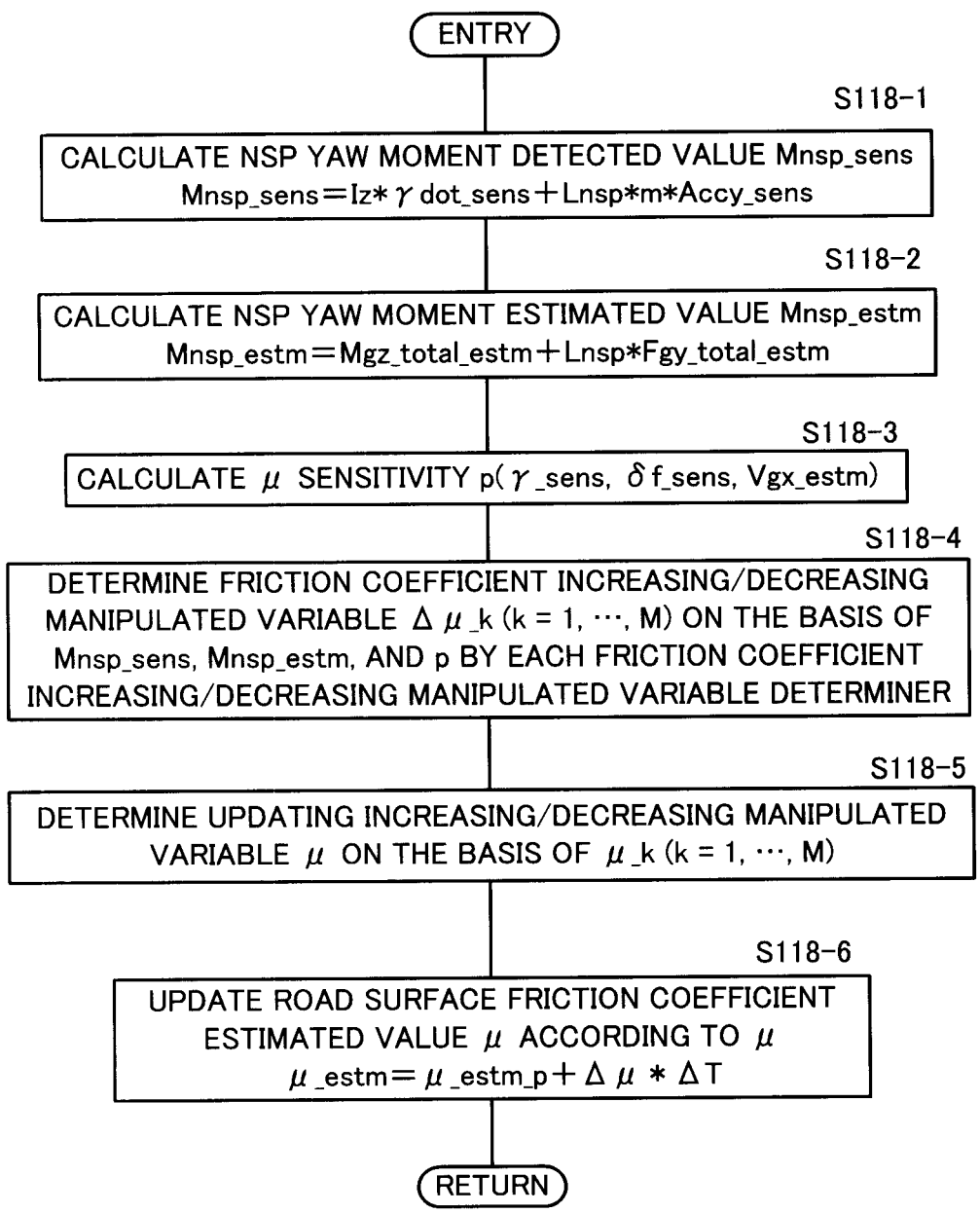
FIG. 10 is a flowchart illustrating the processing of the μ estimating means illustrated in FIG. 3.

The μ estimating means 26 performs the processing of the flowchart in FIG. 10, thereby sequentially determining the road surface friction coefficient estimated value μ_estm.

More specifically, the μ estimating means 26 performs the processing of an Mnsp_sens calculator 31 in S118-1 to calculate the NSP yaw moment detected value Mnsp_sens.

To be more specific, the Mnsp_sens calculator 31 calculates Mnsp_sens by computing the right side of the aforesaid expression 4-14 using the yaw angular acceleration detected value γdot_sens as the observed value of a motion state quantity of the vehicle 1 associated with an inertial force moment balancing out the NSP yaw moment Mnsp and the vehicle center-of-gravity lateral acceleration detected value Accy_sens (the sensed-by-sensor lateral acceleration detected value) out of the quantity-to-be-observed detected values generated by the quantity-to-be-observed detecting means 22 in the aforesaid S100.

In this case, predetermined values set in advance are used as the value of the vehicle yaw inertia moment Iz, the value of the vehicle mass m, and the distance Lnsp between the vehicle center of gravity and the NSP, which are necessary to compute expression 4-14. The first term of the right side of expression 4-14 corresponds to a total road surface reaction force resultant yaw moment detected value Mgz_total_sens, and m*Accy_sens in the second term corresponds to the total road surface reaction force resultant lateral force detected value Fgy_total_sens.

Further, the μ estimating means 26 performs the processing of an Mnsp_estm calculator 32 in S118-2 to calculate the NSP yaw moment estimated value Mnsp_estm.

To be more specific, the Mnsp_estm calculator 32 calculates Mnsp_estm according to expression 7-1 given below on the basis of the total road surface reaction force resultant lateral force estimated value Fgy_total_estm (a component in the Y-axis direction of the total road surface reaction force resultant translational force vector estimated value ↑Fg_total_estm) and the total road surface reaction force resultant yaw moment estimated value Mgz_total_estm, which have been calculated by the vehicle model computing means 24 in the aforesaid S112.

$$M\text{nsp\_estm}=Mgz\_\text{total\_estm}+L\text{nsp}*Fgy\_\text{total\_estm} \quad \text{Expression 7-1}$$

Subsequently, the μ estimating means 26 performs the processing of the μ sensitivity calculator 33 in S118-3 to calculate the μ sensitivity p.

To be more specific, the μ sensitivity calculator 33 calculates the μ sensitivity p(γ_sens, δf_sens, Vgx_estm) by computing the right side of the aforesaid expression 5-7 from the yaw rate detected value γ_sens and the front wheel rudder angle detected value δf_sens, which have been generated by the quantity-to-be-observed detecting means 22 in the aforesaid S100, and the vehicle center-of-gravity longitudinal velocity estimated value Vgx_estm found by the vehicle model computing means 24 in the aforesaid S114. In this case, predetermined values that are set beforehand are used as the value of the vehicle inertia yaw moment Iz and the values of the parameters a11, a12s, a21, a22, b1 and b2, which are necessary for the computation of expression 5-7.

In this case, as is obvious from expression 5-7, the μ sensitivity p is found by linearly combining γ_sens and δf_sens. In this linear combination, the ratio between a coefficient by which γ_sens is multiplied and a coefficient by which δf_sens is multiplied changes according to Vgx_estm.

Subsequently, the μ estimating means 26 performs the processing of each of the friction coefficient increasing/decreasing manipulated variable determiners 34_1 to 34_M in S118-4 to calculate the friction coefficient increasing/decreasing manipulated variables Δμ_k (k=1, ... , M). The processing thereof will be described below with reference to FIG. 11 and FIG. 12.

Figure 11:
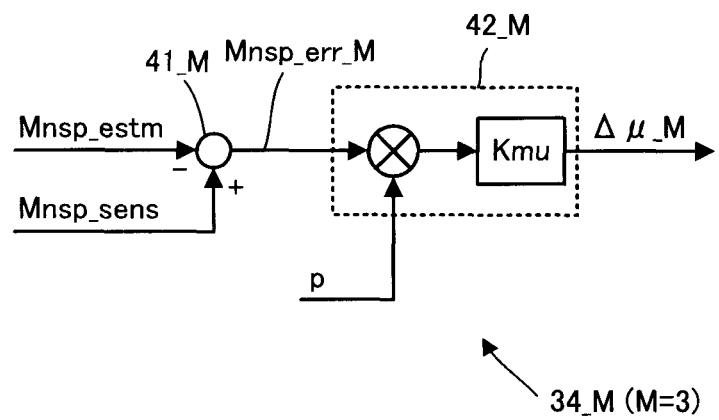
FIG. 11 is a block diagram illustrating the processing of a third friction coefficient increasing/decreasing manipulated variable determiner illustrated in FIG. 9.
Figure 12:
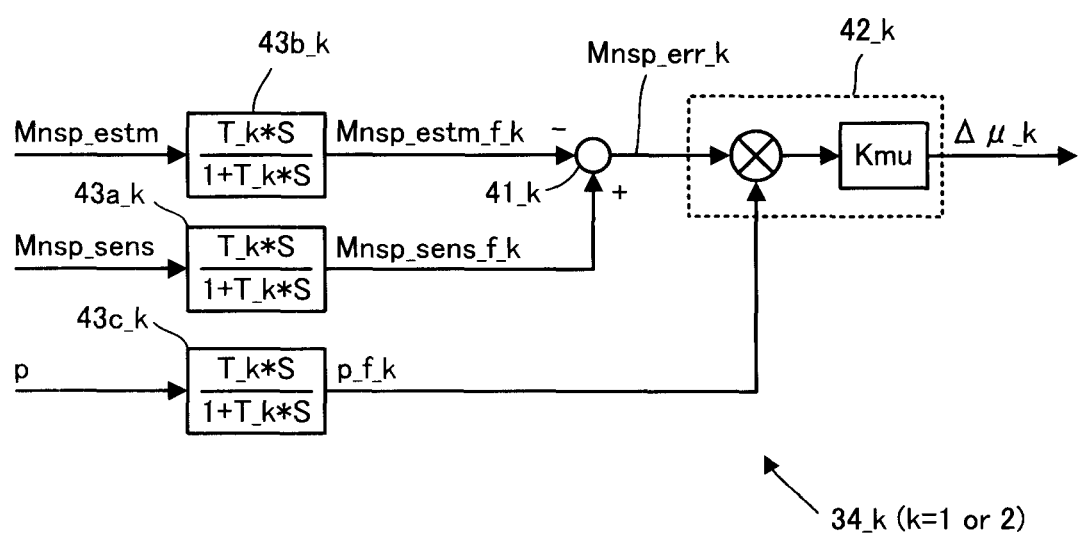
FIG. 12 is a block diagram illustrating the processing of the first and second friction coefficient increasing/decreasing manipulated variable determiners illustrated in FIG. 9.

FIG. 11 is a block diagram illustrating the processing of the M-th friction coefficient increasing/decreasing manipulated variable determiner 34_M (=the third friction coefficient increasing/decreasing manipulated variable determiner 34_3). As illustrated, the M-th friction coefficient increasing/decreasing manipulated variable determiner 34_M includes an Mnsp_err calculator 41_M and a Δμ calculator 42_M.

Then, in the processing of the M-th friction coefficient increasing/decreasing manipulated variable determiner 34_M, first, the NSP yaw moment detected value Mnsp_sens and the NSP yaw moment estimated value Mnsp_estm, which have been calculated in the aforesaid S118-1 and 118-2, respectively, are input to the Mnsp_err calculator 41_M.

The aforesaid Mnsp_err calculator 41_M calculates the M-th NSP yaw moment deviation Mnsp_err_M (=Mnsp_sens−Mnsp_estm), which is a deviation between Mnsp_sens and Mnsp_estm, by subtracting Mnsp_estm from Mnsp_sens. In other words, the Mnsp_err calculator 41_M calculates the NSP yaw moment estimation error Mnsp_err as the M-th NSP yaw moment deviation Mnsp_err_M directly.

Subsequently, the M-th NSP yaw moment deviation Mnsp_err_M calculated as described above and the μ sensitivity p calculated in the aforesaid S118-3 are input to the Δμ calculator 42_M. The Δμ calculator 42_M calculates the friction coefficient increasing/decreasing manipulated variable Δμ_M from these input values.

In this processing, the friction coefficient increasing/decreasing manipulated variable Δμ_M is determined according to the feedback control law such that Mnsp_err_M is converged to zero (i.e., such that Mnsp_estm is converged to Mnsp_sens). In this case, the proportional law is used as the feedback control law, and the value of Δμ_M is calculated by multiplying Mnsp_err_M by a certain gain value Gmu.

More specifically, Δμ_M is determined to be proportional to the product of Mnsp_err_M and the aforesaid μ sensitivity p. Thus, the gain value Gmu indicative of the rate of change in Δμ with respect to a change in Mnsp_err_M (hereinafter, Gmu is referred to as the friction coefficient operation gain) is determined such that the gain value Gmu changes according to the μ sensitivity p.

To be more specific, in this embodiment, the Δμ calculator 42_M calculates Δμ according to expression 7-2-1 given below. Incidentally, Kmu in expression 7-2-1 takes a predetermined positive value that has been set beforehand.

$$\Delta\mu\_M = \text{Mnsp\_err\_M} * Gmu \quad \text{Expression 7-2-1}$$
$$= \text{Mnsp\_err\_M} *$$
$$(p(\gamma\_\text{sens}, \delta f\_\text{sens}, \text{Vgx\_estm}) * Kmu)$$

The Δμ calculator 42_M defines the result obtained by multiplying the μ sensitivity p, which has been calculated in S118-3, by the basic gain Kmu taking a predetermined positive value set beforehand (=Kmu*p) as the friction coefficient operation gain Gmu, and then the M-th NSP yaw moment estimation error Mnsp_err_M (=Mnsp_sens−Mnsp_estm) calculated by the Mnsp_err calculator 41_M is multiplied by the friction coefficient operation gain Gmu so as to determine the friction coefficient increasing/decreasing manipulated variable Δμ_M.

In this case, the friction coefficient operation gain Gmu has the same polarity as that of the μ sensitivity p and Gmu is determined such that the magnitude (the absolute value) of Gmu decreases as the magnitude (the absolute value) of the μ sensitivity p decreases (such that the magnitude of Δμ_M decreases as the magnitude (the absolute value) of the μ sensitivity p decreases).

The above is the details of the processing of the M-th friction coefficient increasing/decreasing manipulated variable determiner 34_M (M=3).

Subsequently, FIG. 11 is a block diagram illustrating the processing of the respective friction coefficient increasing/decreasing manipulated variable determiners 34_1 to 34_N (N=M−1) except the M-th friction coefficient increasing/decreasing manipulated variable determiner 34_M. The algorithms of the processing of the friction coefficient increasing/decreasing manipulated variable determiners 34_1 to 34_N except the M-th friction coefficient increasing/decreasing manipulated variable determiner 34_M are the same as each other. The processing will be described below.

The friction coefficient increasing/decreasing manipulated variable determiners 34_1 to 34_N will be described on the assumption that k in the description and in FIG. 11 is any arbitrary one of integer values 1 to N, unless otherwise specified. In this case, M=3 (N=2) holds in this embodiment and therefore k in the description and FIG. 11 means 1 or 2.

Each friction coefficient increasing/decreasing manipulated variable determiner 34_k of the first to N-th friction coefficient increasing/decreasing manipulated variable determiners 34_1 to 34_N includes an Mnsp_err calculator 41_k and a Δμ calculator 42_k, which perform the same processing as that of the third friction coefficient increasing/decreasing manipulated variable determiner 34_3, and further includes filters for frequency component adjustment 43a_k, 43b_k, and 43c_k, which receive inputs of the NSP yaw moment detected value Mnsp_sens calculated in S118-1, the NSP yaw moment estimated value Mnsp_estm calculated in S118-2, and the μ sensitivity p calculated in S118-3, respectively.

Then, in the processing of each friction coefficient increasing/decreasing manipulated variable determiner 34_k, first, the values Mnsp_sens, Mnsp_estm, and p are passed through the filters 43a_k, 43b_k, and 43c_k, respectively, by which the filtering processing of each friction coefficient increasing/decreasing manipulated variable determiner 34_*k* is performed.

In this embodiment, in each of the first to N-th friction coefficient increasing/decreasing manipulated variable determiner 34_1 to 34_N, all of the filters 43*a*_k, 43*b*_k, and 43*c*_k have a low-cut characteristic (a characteristic that cuts off low-frequency components of a predetermined frequency or lower).

More specifically, the respective filters 43*a*_k, 43*b*_k, and 43*c*_k of each friction coefficient increasing/decreasing manipulated variable determiner 34_*k* have a transfer function, which is represented by, for example, T_k*S/(1+T_k*S), and the frequency characteristics of the filters are set to share the same target characteristic (a low-cut characteristic) (set to share the same transfer function time constant T_k).

The frequency characteristics of the filters 43*a*_k, 43*b*_k, and 43*c*_k of each friction coefficient increasing/decreasing manipulated variable determiner 34_*k*, however, are set to frequency characteristics different from each other among the first to N-th friction coefficient increasing/decreasing manipulated variable determiner 34_1 to 34_N.

More specifically, in this embodiment, time constants T_1 and T_2 are set to values different from each other so that, for example, the low-pass side cutoff frequencies of the filters 43*a*_1, 43*b*_1, and 43*c*_1 of the first friction coefficient increasing/decreasing manipulated variable determiner 34_1 are higher than the low-pass side cutoff frequencies of the filters 43*a*_2, 43*b*_2, and 43*c*_2 of the second friction coefficient increasing/decreasing manipulated variable determiner 34_2.

This causes the filters 43*a*_1, 43*b*_1, and 43*c*_1 of the first friction coefficient increasing/decreasing manipulated variable determiner 34_1 to be different in frequency characteristic (here, the low-pass side cutoff frequency) from the filters 43*a*_2, 43*b*_2, and 43*c*_2 of the second friction coefficient increasing/decreasing manipulated variable determiner 34_2.

In each of the first to N-th friction coefficient increasing/decreasing manipulated variable determiner 34_1 to 34_N, the respective frequency characteristics of the filters 43*a*_k, 43*b*_k, and 43*c*_k need not be always the same as each other.

If a phase disagreement between Mnsp_err and p or a phase disagreement between Mnsp_sens and Mnsp_estm takes place in a state where μ_estm and μ_act are in accurate agreement due to, for example, different frequency characteristics or the like of the sensors used to generate input values, then the frequency characteristics of the filters 43*a*_k, 43*b*_k, and 43*c*_k may be shifted from each other to resolve the phase disagreement.

Then, in the processing of each friction coefficient increasing/decreasing manipulated variable determiner 34_*k* of the first to N-th friction coefficient increasing/decreasing manipulated variable determiners 34_1 to 34_N, the Mnsp_err calculator 41_*k* receives the inputs of the k-th NSP yaw moment filtering detected value Mnsp_sens_f_k, which is an output of the filter 43*a*_k, and the k-th NSP yaw moment filtering estimated value Mnsp_estm_f_k, which is an output of the filter 43*b*_k.

Further, the Mnsp_err calculator 41_*k* calculates a k-th NSP yaw moment deviation Mnsp_err_k (=Mnsp_sens_f_k−Mnsp_sens_f_k), which is a deviation between the input Mnsp_sens_f_k and Mnsp_estm_f_k. The k-th NSP yaw moment deviation Mnsp_err_k has a meaning of a filtering value of the NSP yaw moment estimation error Mnsp_err (=Mnsp_err_3).

In this embodiment, the frequency characteristics of the filters 43*a*_k and 43*b*_k are the same as each other in each of the first to N-th friction coefficient increasing/decreasing manipulated variable determiners 34_1 to 34_N. Therefore, finding the deviation Mnsp_err_k between Mnsp_sens_f_k and Mnsp_estm_f_k as described above is equivalent to finding the Mnsp_err_k by passing the NSP yaw moment estimation error Mnsp_err (=Mnsp_err_1), which is a deviation between Mnsp_sens and Mnsp_estm, through the filter having the same frequency characteristic as that of the filters 43*a*_k and 43*b*_k.

Therefore, in place of the filters 43*a*_k and 43*b*_k, a filter which receives Mnsp_err (a filter having the same frequency characteristic as those of the filters 43*a*_k and 43*b*_k) may be provided so as to obtain Mnsp_err_k by passing Mnsp_err through the filter.

Subsequently, the k-th NSP yaw moment deviation Mnsp_err_k calculated as described above and the output p_f_k of the filter 43*c*_k, i.e., the filtering value p_f_k of the μ sensitivity p calculated in S118-3 (hereinafter, referred to as μ sensitivity dependent value p_f_k) are input to the Δμ calculator 42_*k*. The Δμ calculator 42_*k* calculates the friction coefficient increasing/decreasing manipulated variable Δμ_k from these input values.

More specifically, the Δμ calculator 42_*k* of the k-th friction coefficient increasing/decreasing manipulated variable determiner 34_*k* (k=1, . . . , N) calculates Δμ_k by the arithmetic processing of the following expression 7-2-k in which Mnsp_err_k and p on the right side of the aforesaid expression 7-2 are replaced by the k-th NSP yaw moment deviation Mnsp_err_k and the μ sensitivity dependent value p_f_k.

$$\Delta\mu\_k = \text{Mnsp\_err\_k} * Gmu \qquad \text{Expression 7-2-k}$$
$$= \text{Mnsp\_err\_k} * (p\_f\_k * Kmu)$$

In other words, the Δμ determiner 42_*k* defines the value obtained by multiplying the μ sensitivity dependent value p_f_k, which is a value obtained by passing the μ sensitivity p through the filter 43*c*_k, by the basic gain Kmu (=Kmu*p_f_k) as a friction coefficient operation gain Gmu, and then determines the friction coefficient increasing/decreasing manipulated variable Δμ_k by multiplying the k-th NSP yaw moment deviation Mnsp_err_k (=Mnsp_sens_f_k−Mnsp_estm_f_k), which has been calculated by the Mnsp_err calculator 41_*k*, by the friction coefficient operation gain Gmu.

The above has described the details of the processing carried out by each friction coefficient increasing/decreasing manipulated variable determiner 34_*k* (k=1, . . . , N) except the M-th friction coefficient increasing/decreasing manipulated variable determiner 34_M (the third friction coefficient increasing/decreasing manipulated variable determiner 34_M).

Referring back to FIG. 10, the μ estimating means 26 then performs the processing of the first to M-th friction coefficient increasing/decreasing manipulated variable determiners 34_1 to 34_M as described above and thereafter performs the processing of the updating increasing/decreasing manipulated variable determiner 35 in S118-5 to determine the updating increasing/decreasing manipulated variable Δμ of the road surface friction coefficient estimated value μ_estm.

Figure 13:
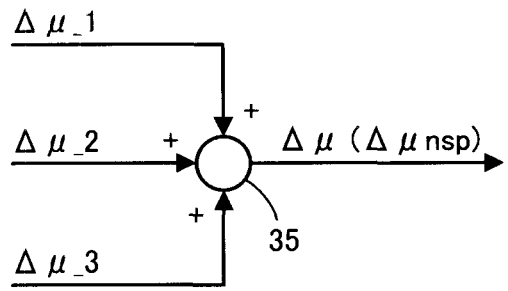
FIG. 13 is a diagram illustrating the processing of the updating increasing/decreasing manipulated variable determiner illustrated in FIG. 9.

In this embodiment, as illustrated in the block diagram of FIG. 13, the updating increasing/decreasing manipulated variable determiner 35 is configured as an addition operation unit, which adds up the friction coefficient increasing/decreasing manipulated variables $\Delta\mu\_k$ (k=1, . . . , M) that have been determined by the first to M-th friction coefficient increasing/decreasing manipulated variable determiner 34_1 to 34_M, respectively.

In other words, the updating increasing/decreasing manipulated variable determiner 35 determines the value obtained by adding up all friction coefficient increasing/decreasing manipulated variables $\Delta\mu\_k$ (k=1, . . . , M) (in this embodiment, $\Delta\mu\_1 + D\mu\_2 + \Delta\mu\_3$), which have been determined in S118-4, as the updating increasing/decreasing manipulated variable $\Delta\mu$. The reference character $\Delta\mu$ nsp in FIG. 13 is a reference character to be used in other embodiments described later.

Subsequently, the $\mu$ estimating means 26 performs the processing of the friction coefficient estimated value updater 36 in S118-6 to update the road surface friction coefficient estimated value $\mu\_estm$.

To be more specific, the friction coefficient estimated value updater 36 adds a value obtained by multiplying the updating increasing/decreasing manipulated variable $\Delta\mu$, which has been determined as described above in S118-5, by an arithmetic processing cycle $\Delta T$ of the controller 20 ($=\Delta\mu \ast \Delta T$) to the previous value $\mu\_estm\_p$ of the road surface friction coefficient estimated value so as to update the road surface friction coefficient estimated value $\mu\_estm$ from the previous value $\mu\_estm\_p$, thereby finding a new road surface friction coefficient estimated value $\mu\_estm$ (the current value). In other words, this processing is carried out to find the road surface friction coefficient estimated value $\mu\_estm$ by integrating $\Delta\mu$.

The above has described the details of the processing of the $\mu$ estimating means 26 in this embodiment.

Supplementally, this embodiment is one embodiment of the aforesaid second aspect of the invention. In this case, the first estimating means of the to-be-compared external force in the present invention is implemented by the processing of the vehicle model computing means 24 (the processing of S102 to S116 in FIG. 4) and the processing of finding the NSP yaw moment estimated value Mnsp_estm by the $\mu$ estimating means 26 (S118-2 in FIG. 10).

In this case, Mnsp_estm corresponds to a first estimated value of a to-be-compared external force in the present invention. Further, the detected values of the quantity to be observed ($\delta 1\_sens$, $\delta 2\_sens$, Vw_i_sens, $\gamma\_sens$, Accx_sens, Accy_sens, Tq_i_sens) input to the vehicle model computing means 24 correspond to the observed values of the predetermined types of quantities to be observed in the present invention. The detected values of the quantities to be observed (M sens, $\delta 2\_sens$, Vw_i_sens, $\gamma\_sens$, Accx_sens, Accy_sens, Tq_i_sens) are the detected values of the quantities to be observed that are necessary for identifying the values of input parameters ($\kappa i$, $\beta i$, Fz_i) other than the road surface friction coefficient $\mu$ among the input parameters in the aforesaid friction characteristic model.

The steps from S102 to S116 in the processing performed by the vehicle model computing means 24 implements the vehicle motion/road surface reaction force estimating means. In this case, the vehicle motion skid speed Vgy_estm corresponds to the state quantity of a skid motion of the vehicle.

Further, the relationship represented by the aforesaid expression 1-14 corresponds to the dynamic relationship related to the vehicle motion/road surface reaction force estimating means. The processing in S118-2 of FIG. 10 may alternatively be performed by the vehicle model computing means 24.

Further, in this embodiment, the processing in which the $\mu$ estimating means 26 finds the NSP yaw moment detected value Mnsp_sens (S118-1 in FIG. 10) implements the second estimating means of the to-be-compared external force in the present invention. In this case, Mnsp_sens corresponds to the second estimated value of the to-be-compared external force in the present invention.

Moreover, the yaw angular acceleration detected value $\gamma dot\_sens$ and the vehicle center-of-gravity lateral acceleration detected value Accy_sens (sensed-by-sensor lateral acceleration detected value Accy_sensor_sens) corresponds to the observed value of the motion state quantity of the vehicle 1, which defines the inertial force moment about the yaw axis in NSP (the inertial force corresponding to the to-be-compared external force).

Moreover, the third (M-th) friction coefficient increasing/decreasing manipulated variable determiner 34_3 (34_M) of the $\mu$ estimating means 26 implements the (N+1)th friction coefficient increasing/decreasing manipulated variable determining means in the present invention, and the first and second friction coefficient increasing/decreasing manipulated variable determiners 34_1 and 34_2 implement the first to N-th friction coefficient increasing/decreasing manipulated variable determining means (N=2 in the embodiment) in the present invention.

In this case, each of the respective filters $43b\_k$ and $43a\_k$ of each of the first and second friction coefficient increasing/decreasing manipulated variable determiners 34_1 and 34_2 correspond to the (1_k)th filter and the (2_k)th filter, respectively. In addition, the k-th NSP yaw moment filtering estimated value Mnsp_estm_f_k corresponds to the (1_k)th estimated filtering value, and the k-th NSP yaw moment filtering detected value Mnsp_sens_f_k corresponds to the (2_k)th estimated filtering value. Further, the friction coefficient increasing/decreasing manipulated variable $\Delta\mu\_k$ (k=1, . . . , M) determined by the respective friction coefficient increasing/decreasing manipulated variable determiners 34_1 to 34_M correspond to the increasing/decreasing manipulated variables in the present invention.

Further, the processing performed by the updating increasing/decreasing manipulated variable determiner 35 and the friction coefficient estimated value updater 36 implements the friction coefficient estimated value updating means in the present invention. In this case, in this embodiment, the road surface friction coefficient estimated value $\mu\_estm$ is updated according to the updating increasing/decreasing manipulated variable $\Delta\mu$ as a manipulated variable, which is obtained by adding up the friction coefficient increasing/decreasing manipulated variables $\Delta\mu\_k$ (k=1, . . . , M).

Further, the processing performed by the $\mu$ sensitivity calculator 33 of the $\mu$ estimating means 26 (the processing in S118-3 of FIG. 10) implements the $\mu$ sensitivity calculating means in the present invention. In addition, in this embodiment, all of the friction coefficient increasing/decreasing manipulated variable determiners 34_1 to 34_M function as the friction coefficient increasing/decreasing manipulated variable determining means in the $\mu$ sensitivity using system. Further, the respective filters $43c\_k$ of the first and second friction coefficient increasing/decreasing manipulated variable determiner 34_1 and 34_2 function as filters through which the value of the $\mu$ sensitivity p is passed.

The same correspondence relationship between this embodiment described above and the present invention is also applicable to a second embodiment to an eighth embodiment.

In the embodiment described hereinabove, each friction coefficient increasing/decreasing manipulated variable $\Delta\mu\_k$ (k=1, . . . , M) (M=3 in this embodiment) is determined such that the k-th NSP yaw moment deviation Mnsp_err_k is converged to zero.

In this case, the M-th NSP yaw moment deviation Mnsp_err_M is a difference between Mnsp_sens itself and Mnsp_estm itself, and each of other k-th NSP yaw moment deviations (k=1, . . . , N) (N=2 in this embodiment) is a difference between the filtering value Mnsp_sens_f_k obtained by passing Mnsp_sens through the filter having a low-cut characteristic $43a\_k$ and the filtering value Mnsp_estm_f_k obtained by passing Mnsp_estm through the filter having a low-cut characteristic $43b\_k$. Then, the frequency characteristics of the filters $43a\_k$ and $43b\_k$ are set to frequency characteristics different among the first to N-th friction coefficient increasing/decreasing manipulated variable determiners 34_1 to 34_N.

For this reason, basically the friction coefficient increasing/decreasing manipulated variables $\Delta\mu\_1$ to $\Delta\mu\_M$ having positive polarity and those having the negative polarity are mixed in the M friction coefficient increasing/decreasing manipulated variables $\Delta\mu\_1$ to $\Delta\mu\_M$ around the zero-cross timing at which the polarity (direction) of the actual NSP yaw moment Mnsp_act changes.

As a result, the updating increasing/decreasing manipulated variable $\Delta\mu$, which is obtained by adding up the values $\Delta\mu\_1$ to $\Delta\mu\_M$, is zero or close thereto around the aforesaid zero-cross timing. This prevents the road surface friction coefficient estimated value μ_estm from being updated so as to largely deviate from the actual road surface friction coefficient μ_act around the aforesaid zero-cross timing.

In a state where the absolute value of the actual NSP yaw moment Mnsp_act is relatively large, the M friction coefficient increasing/decreasing manipulated variables $\Delta\mu\_1$ to $\Delta\mu\_M$ uniformly have such polarities that basically bring the road surface friction coefficient estimated value μ_estm close to the actual road surface friction coefficient μ_act, and therefore the road surface friction coefficient estimated value μ_estm is able to be appropriately updated by using the updating increasing/decreasing manipulated variable $\Delta\mu$.

As a result, according to this embodiment, the road surface friction coefficient μ is able to be estimated stably and accurately without the deviation of the road surface friction coefficient estimated value μ_estm from the actual road surface friction coefficient μ_act.

Moreover, the NSP yaw moment is used as the to-be-compared external force, and therefore the value μ_estm is able to be determined while preventing an error of the estimated value of the state quantity of the skid motion of the vehicle 1, such as a vehicle center-of-gravity skid speed estimated value Vgy_estm, and a change in the actual road surface bank angle θ_act from affecting the road surface friction coefficient estimated value μ_estm. Therefore, highly reliable μ_estm is able to be stably found.

Moreover, each friction coefficient increasing/decreasing manipulated variable determiner 34_k (k=1, . . . , M) is determined such that the friction coefficient increasing/decreasing manipulated variable $\Delta\mu\_k$ is proportional to the product of the k-th NSP yaw moment deviation Mnsp_err_k and the μ sensitivity p calculated by the linear combination of γ_sens and δf_sens illustrated in the aforesaid expression 5-7 or the μ sensitivity dependent value p_f_k, which is obtained by passing the μ sensitivity p through the filter 43c_k. Consequently, the friction coefficient operation gain Gmu is set such that the magnitude of Gmu decreases as the magnitude of the μ sensitivity p or the μ sensitivity dependent value p_f_k decreases.

This arrangement is able to prevent the friction coefficient increasing/decreasing manipulated variable $\Delta\mu\_k$, which causes the road surface friction coefficient estimated value μ_estm to be excessively updated, from being calculated in a situation where the value of the μ sensitivity p is zero or close to zero, i.e., in a situation where Mnsp_err_k is likely to include relatively many unwanted components that do not depend on an error of the road surface friction coefficient estimated value μ_estm (a situation where the S/N ratio of Mnsp_err_k is likely to be low), such as the situation where the vehicle 1 is traveling straight.

Thus, the robustness of the estimation of the road surface friction coefficient μ is able to be enhanced, and the Mnsp_err_k is able to be reflected in calculating the friction coefficient increasing/decreasing manipulated variable $\Delta\mu\_k$ according to the degree of dependence of Mnsp_err_k on the error of the road surface friction coefficient estimated value μ_estm.

Second Embodiment

Figure 14:
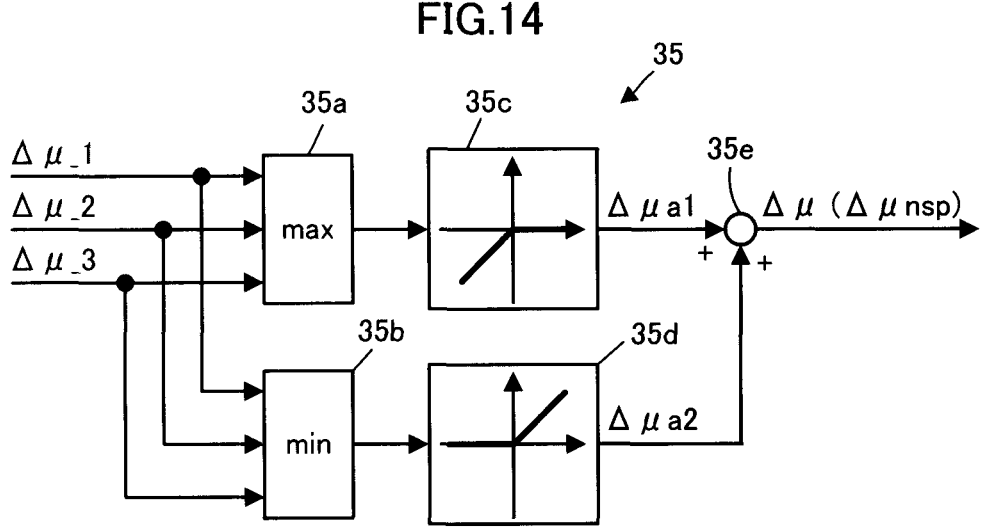
FIG. 14 is a block diagram illustrating the processing of the updating increasing/decreasing manipulated variable determiner illustrated in FIG. 9 in a second embodiment.

Subsequently, a second embodiment of the present invention will be described with reference to FIG. 14. This embodiment differs from the aforesaid first embodiment only in the processing of the updating increasing/decreasing manipulated variable determiner 35 (the processing of S118-5 in FIG. 10) of the μ estimating means 26. FIG. 14 is a block diagram illustrating the processing.

As illustrated, the updating increasing/decreasing manipulated variable determiner 35 in this embodiment includes processors 35a and 35b, which input all of the friction coefficient increasing/decreasing manipulated variables $\Delta\mu\_k$ determined by the first to M-th friction coefficient increasing/decreasing manipulated variable determiners 34_k (k=1, . . . , M), respectively, in S118-4, the processors 35c and 35d, which input the outputs of the processors 35a and 35b, and a computing unit 35e, which adds up the outputs of the processors 35c and 35d.

Then, the updating increasing/decreasing manipulated variable determiner 35, first, performs the processing of the processors 35a and 35b. In this case, the processor 35a finds the maximum value max ($\Delta\mu\_1$, A, $\Delta\mu\_2$, $\Delta\mu\_3$) among the input M (three) friction coefficient increasing/decreasing manipulated variables $\Delta\mu\_1$, $\Delta\mu\_2$, and $\Delta\mu\_3$ and outputs the maximum value.

In addition, the processor 35b finds the minimum value min ($\Delta\mu\_1$, $\Delta\mu\_2$, $\Delta\mu\_3$) among the input M (three) friction coefficient increasing/decreasing manipulated variables $\Delta\mu\_1$, $\Delta\mu\_2$, and $\Delta\mu\_3$ and outputs the minimum value.

Subsequently, the updating increasing/decreasing manipulated variable determiner 35 inputs the output of the processor 35a into the processor 35c, inputs the output of the processor 35b into the processor 35d, and then performs the processing of the processors 35c and 35d.

In this case, the processor 35c outputs the input value directly if the input value is equal to or less than zero. If the input value is more than zero, the processor 35c outputs zero independently of the input value. In addition, the processor 35d outputs the input value directly if the input value is equal to or more than zero and outputs zero independently of the input value if the input value is less than zero.

Therefore, if all of the friction coefficient increasing/decreasing manipulated variables $\Delta\mu\_k$ (k=1, . . . , M) have the negative polarities, the output of the processor 35c (hereinafter, the output is referred to as "output $\Delta\mu a1$") is an increasing/decreasing manipulated variable closest to zero (an increasing/decreasing manipulated variable having the minimum absolute value) among the friction coefficient increasing/decreasing manipulated variables. If at least one of the friction coefficient increasing/decreasing manipulated variables $\Delta\mu\_k$ (k=1, ..., M) has the positive polarity, the output $\Delta\mu a1$ is zero.

Moreover, if all of the friction coefficient increasing/decreasing manipulated variables $\Delta\mu\_k$ (k=1, ..., M) have the positive polarities, the output of the processor 35d (hereinafter, the output is referred to as "output $\Delta\mu a2$") is an increasing/decreasing manipulated variable closest to zero (an increasing/decreasing manipulated variable having the minimum absolute value) among the friction coefficient increasing/decreasing manipulated variables. If at least one of the friction coefficient increasing/decreasing manipulated variables $\Delta\mu\_k$ (k=1, ..., M) has the negative polarity, the output $\Delta\mu a2$ is zero. In addition, at least one of the outputs $\Delta\mu a1$ and $\Delta\mu a2$ is zero.

Subsequently, the updating increasing/decreasing manipulated variable determiner 35 inputs the outputs $\Delta\mu a1$ and $\Delta\mu a2$ of the processors 35c and 35d into the computing unit 35e and then performs the processing of the computing unit 35e. The computing unit 35e adds up the outputs $\Delta\mu a1$ and $\Delta\mu a2$ of the processors 35c and 35d and outputs the value of a result of the addition as the updating increasing/decreasing manipulated variable $\Delta\mu$.

In this case, as a result of the determination of the updating increasing/decreasing manipulated variable $\Delta\mu$ as described above, $\Delta\mu=\Delta\mu a1$ holds if all of the friction coefficient increasing/decreasing manipulated variables $\Delta\mu\_k$ (k=1, ..., M) have the negative polarities, and $\Delta\mu=\Delta\mu a2$ holds if all of the friction coefficient increasing/decreasing manipulated variables $\Delta\mu\_k$ (k=1, ..., M) have the positive polarities. Further, in the cases other than the above, $\Delta\mu=0$ holds, and therefore the road surface friction coefficient estimated value $\mu\_estm$ is inhibited from being updated according to the friction coefficient increasing/decreasing manipulated variable $\Delta\mu\_k$ (k=1, ..., M).

In other words, $\Delta\mu$ is determined to be a value of the friction coefficient increasing/decreasing manipulated variable closest to zero (the friction coefficient increasing/decreasing manipulated variable having the minimum absolute value) among the friction coefficient increasing/decreasing manipulated variables $\Delta\mu\_k$ (k=1, ..., M) only when the condition that all of the friction coefficient increasing/decreasing manipulated variables $\Delta\mu\_k$ (k=1, ..., M) are the same in polarity is satisfied, and is determined to be zero in other cases.

This embodiment is the same as the first embodiment except for the processing of the updating increasing/decreasing manipulated variable determiner 35 described hereinabove.

This embodiment described above is able to provide an effect described below in addition to the same effects as the first embodiment. In other words, in this embodiment, the updating increasing/decreasing manipulated variable determiner 35, as a constituent of the friction coefficient estimated value updating means in the present invention, determines the friction coefficient increasing/decreasing manipulated variable, which is closest to zero, as the updating increasing/decreasing manipulated variable $\Delta\mu$ only when the condition that all of the friction coefficient increasing/decreasing manipulated variables $\Delta\mu\_k$ (k=1, ..., M) are the same as each other in polarity is satisfied as described above. In addition, the updating increasing/decreasing manipulated variable determiner 35 determines $\Delta\mu$ to be zero in other cases and thus inhibits $\mu\_estm$ from being updated according to the friction coefficient increasing/decreasing manipulated variable $\Delta\mu\_k$ (k=1, ..., M).

This arrangement is able to reliably prevent the road surface friction coefficient estimated value $\mu\_estm$ from being farther away from the actual road surface friction coefficient $\mu\_act$ around the zero-cross timing of the actual road surface friction coefficient $\mu\_act$. Moreover, in the timings other than the zero-cross timing and those around the zero-cross timing, it is possible to prevent the road surface friction coefficient estimated value $\mu\_estm$ from being excessively updated and possible to converge the value $\mu\_estm$ to the actual road surface friction coefficient $\mu\_act$ smoothly.

Third Embodiment

Figure 15:
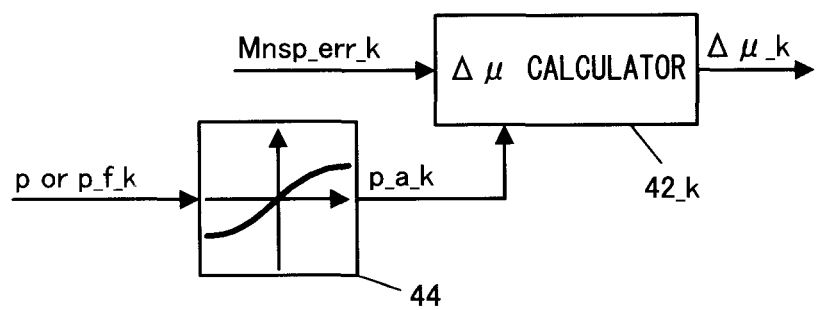
FIG. 15 is a block diagram illustrating the processing of a substantial part of the first to third friction coefficient increasing/decreasing manipulated variable determiners illustrated in FIG. 9 in a third embodiment.

Subsequently, a third embodiment of the present invention will be described with reference to FIG. 15. This embodiment differs from the aforesaid first and second embodiments only in a part of the processing of each friction coefficient increasing/decreasing manipulated variable determiner 34\_k (k=1 to M) of the $\mu$ estimating means 26. FIG. 15 illustrates the processing of the substantial part of each friction coefficient increasing/decreasing manipulated variable determiner 34\_k.

As illustrated, in this embodiment, each friction coefficient increasing/decreasing manipulated variable determiner 34\_k has a saturation characteristic element 44\_k, which inputs the $\mu$ sensitivity p or a $\mu$ sensitivity dependent value p_f_k obtained by passing the $\mu$ sensitivity p through the filter 43c\_k.

In this case, more specifically, in the M-th friction coefficient increasing/decreasing manipulated variable determiner 34\_M (M=3 in this embodiment), the $\mu$ sensitivity p calculated in the aforesaid S118-3 is input to the saturation characteristic element 44\_k. In other friction coefficient increasing/decreasing manipulated variable determiners 34_1 to 34\_N (N=2 in this embodiment), the $\mu$ sensitivity dependent value p_f_k, as a filtering value obtained by passing the $\mu$ sensitivity p through the filter 43c\_k of each determiner, is input to the saturation characteristic elements 44\_k.

Here, the saturation characteristic element 44\_k generates an output (a function value of p or p_f_k) having a saturation characteristic for the $\mu$ sensitivity p or the $\mu$ sensitivity dependent value p_f_k to be input. Hereinafter, a reference character p_a_k is appended to the output value of the saturation characteristic element 44\_k and the output value is sometimes referred to as a $\mu$ sensitivity dependent value p_a_k.

In this case, a relationship between the input value p or p_f_k and the output value p_a_k is set beforehand in the form of a map data or an arithmetic expression. More specifically, the relationship is set such that if the output value p_a_k is zero under the condition that the input value p or p_f_k is zero, and then the output value p_a_k monotonically increases as the input value p or p_f_k increases and the magnitude of the change rate of the output value p_a_k with respect to an increase in the input value p or p_f_k (a value obtained by differentiating the output value p_a_k by the input value p or p_f_k) decreases (the output value p_a_k gradually saturates) as the absolute value of the input value p or p_f_k increases.

Further, in this embodiment, in the processing of each friction coefficient increasing/decreasing manipulated variable determiner 34\_k (k=1, ..., M), the u sensitivity dependent value p_a_k, which is obtained by passing the $\mu$ sensitivity p or the $\mu$ sensitivity dependent value p_f_k through the saturation characteristic element 44\_k, is input to the $\Delta\mu$ calculator 42\_k, in place of the $\mu$ sensitivity p or the $\mu$ sensitivity dependent value p_f_k.

Then, the Δμ calculator 42_1 of the M-th friction coefficient increasing/decreasing manipulated variable determiner 34_M determines the friction coefficient increasing/decreasing manipulated variable Δμ_M by computing the right side of expression 7-2-1 by using the μ sensitivity dependent value p_a_M (the μ sensitivity dependent value p_a_M obtained by passing p through the saturation characteristic element 44), which has been input in place of μ sensitivity p.

Similarly, the Δμ calculator 42_k of each friction coefficient increasing/decreasing manipulated variable determiner 34_k (k=1, . . . , N) other than the M-th friction coefficient increasing/decreasing manipulated variable determiner 34_M determines the friction coefficient increasing/decreasing manipulated variable Δμ_k by computing the right side of expression 7-2-k by using the μ sensitivity dependent value p_a_k (the μ sensitivity dependent value p_a_k obtained by passing p_f_k through the saturation characteristic element 44_k), which has been input in place of μ sensitivity p_f_k.

In other words, in this embodiment, the Δμ calculator 42_k of each of the first to M-th friction coefficient increasing/decreasing manipulated variable determiners 34_1 to 34_M calculates Δμ_k (k=1, . . . , M) by expression 7-2a given below.

$$\Delta \mu\_k = Mnsp\_err\_k * Gmu$$
$$= Mnsp\_err\_k * (p\_a\_k * Kmu)$$

Expression 7-2a

Therefore, in this embodiment, each friction coefficient increasing/decreasing manipulated variable determiner 34_k of the first to M-th friction coefficient increasing/decreasing manipulated variable determiners 34_1 to 34_M determines the friction coefficient increasing/decreasing manipulated variable Δμ_k such that the variable Δμ_k is proportional to the product of the k-th NSP yaw moment deviation Mnsp_err_k and the μ sensitivity dependent value p_a_k.

This embodiment is the same as the first or second embodiments except for the aspects described above.

In this embodiment, when each friction coefficient increasing/decreasing manipulated variable determiner 34_k determines the friction coefficient increasing/decreasing manipulated variable Δμ_k such that Mnsp_err_k converges to zero, the magnitude of a friction coefficient operation gain Gmu (feedback gain) is prevented from becoming excessively large particularly when the absolute value of the μ sensitivity p or the μ sensitivity dependent value p_f_k, which is a filtering value thereof, is large.

As a result, it is possible to prevent each friction coefficient increasing/decreasing manipulated variable Δμ_k from unstably fluctuating or oscillating.

In the case where the absolute value of the μ sensitivity p or the μ sensitivity dependent value p_f_k, which is the filtering value thereof, is not so large, the saturation characteristic element 44 does not need to be provided.

Supplementally, in this embodiment, each of the first to N-th friction coefficient increasing/decreasing manipulated variable determiners 34_1 to 34_N, the μ sensitivity p has been passed through the filter 43c_k and then passed through the saturation characteristic element 44. Alternatively, it is also possible to obtain the μ sensitivity dependent value p_a_k by passing the μ sensitivity p through the saturation characteristic element 44 and then through the filter 43c_k.

Fourth Embodiment

A fourth embodiment of the present invention will now be described with reference to FIG. 16 and FIG. 17. This embodiment differs from the first to third embodiments only in a part of the processing of the μ estimating means 26.

Figure 16:
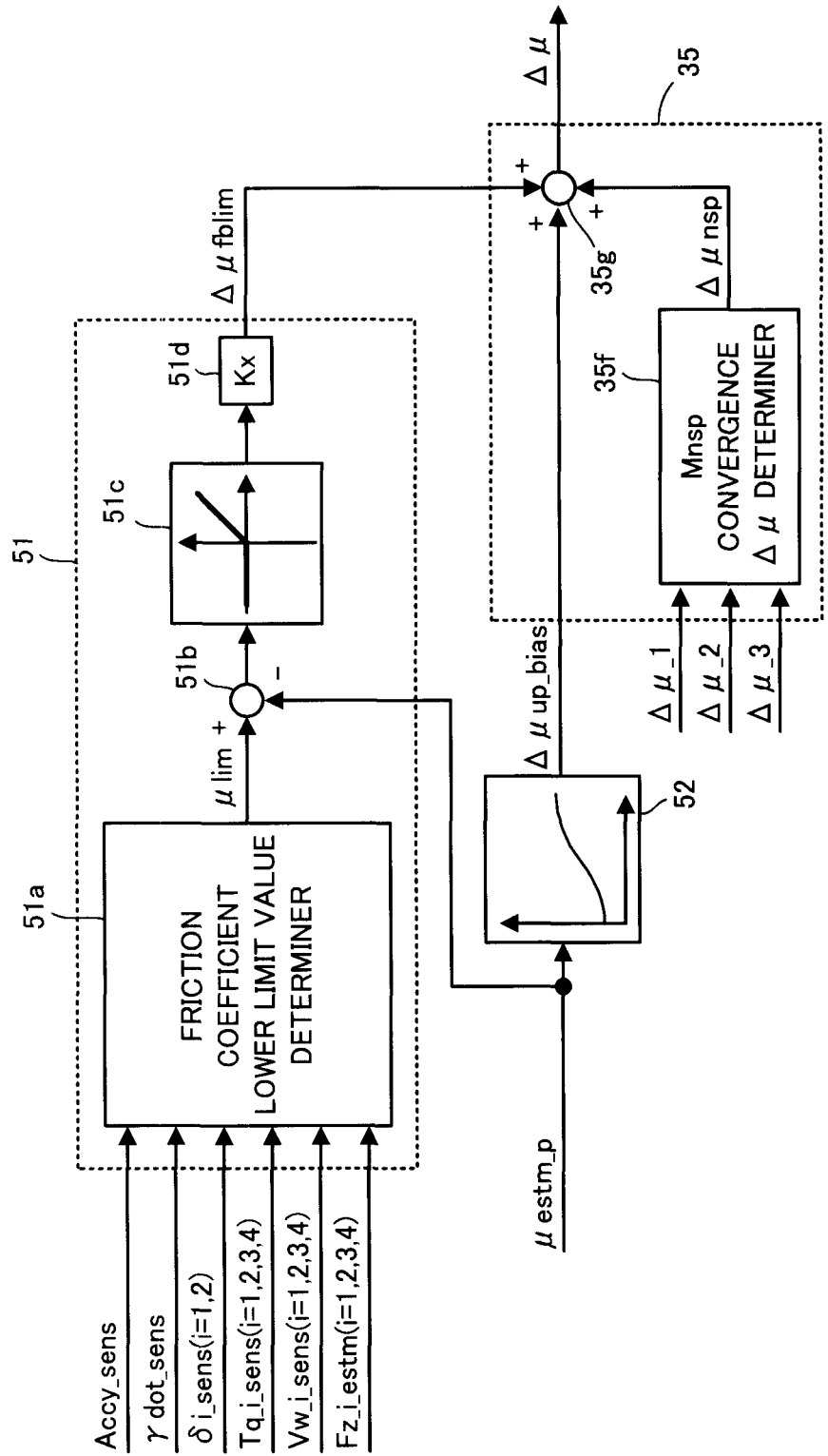
FIG. 16 is a block diagram illustrating the processing of a substantial part of a μ estimating means in a fourth embodiment.
Figure 17:
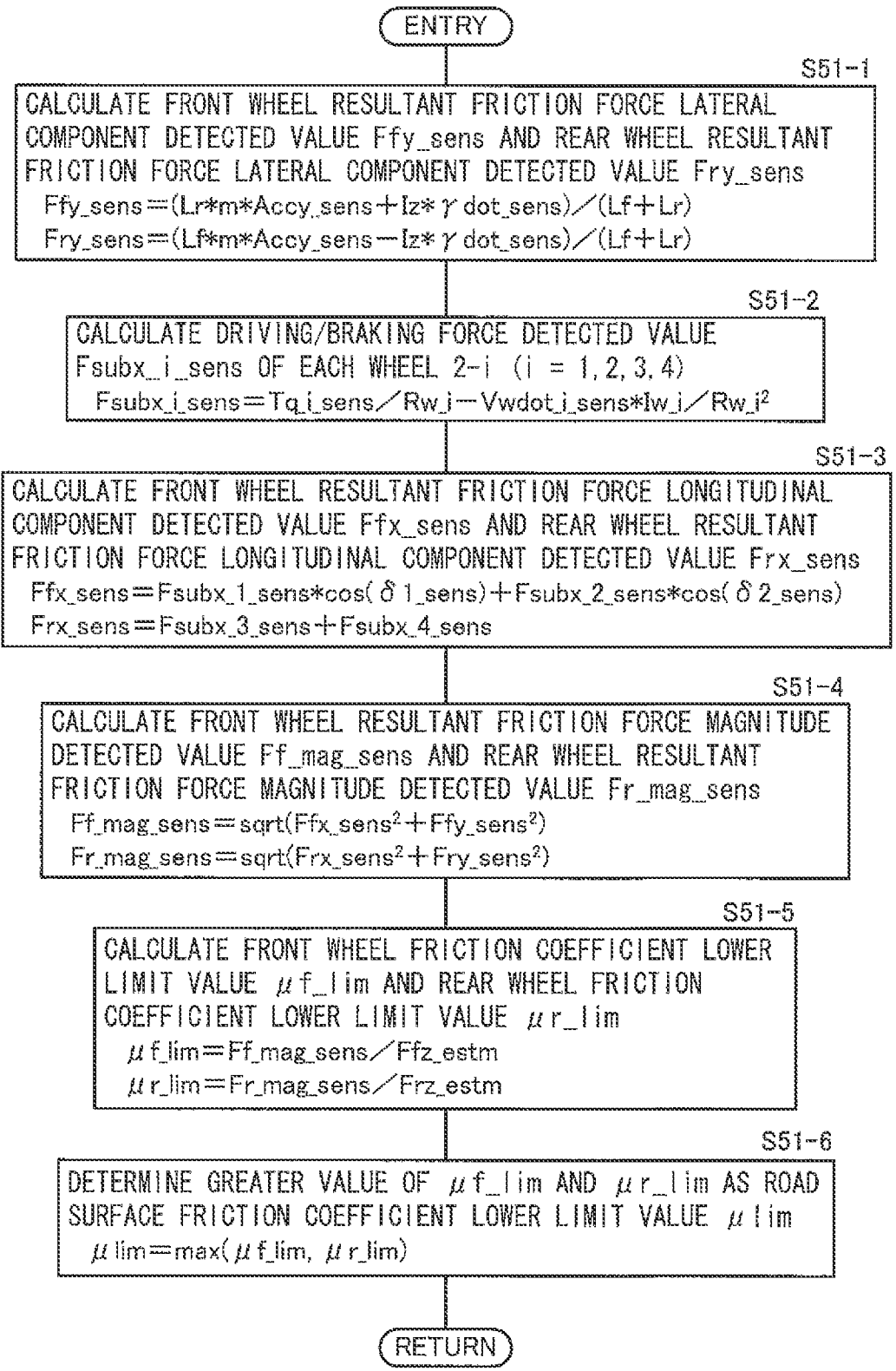
FIG. 17 is a flowchart illustrating the processing of a friction coefficient lower limit value determiner illustrated in FIG. 16.

FIG. 16 illustrates the processing of a substantial part of the μ estimating means 26. As illustrated, in addition to the first to M-th friction coefficient increasing/decreasing manipulated variable determiners 34_1 to 34_M (not illustrated in FIG. 16) described in the first to third embodiments, the μ estimating means 26 of this embodiment includes a first auxiliary increasing/decreasing manipulated variable determiner 51 and a second auxiliary increasing/decreasing manipulated variable determiner 52, which determine a first auxiliary increasing/decreasing manipulated variable Δμ fb_lim and a second auxiliary increasing/decreasing manipulated variable Δμ up_bias as auxiliary friction coefficient increasing/decreasing manipulated variables, respectively.

Further, in this embodiment, the updating increasing/decreasing manipulated variable determiner 35 receives the first auxiliary increasing/decreasing manipulated variable Δμ fb_lim and the second auxiliary increasing/decreasing manipulated variable Δμ up_bias as inputs, in addition to the friction coefficient increasing/decreasing manipulated variables Δμ_1 to Δμ_M, which have been determined as described above by the first to M-th friction coefficient increasing/decreasing manipulated variable determiners 34_1 to 34_M (M=3 in this embodiment), respectively.

The following describes the first auxiliary increasing/decreasing manipulated variable determiner 51 and the second auxiliary increasing/decreasing manipulated variable determiner 52 in more details.

The first auxiliary increasing/decreasing manipulated variable determiner 51 determines the first auxiliary increasing/decreasing manipulated variable Δμ fb_lim as a manipulated variable for use in restricting the lower limit of the road surface friction coefficient estimated value μ_estm such that the magnitude of the friction force (the maximum friction force), which is likely to actually occur between each wheel 2-i and the road surface according to the road surface friction coefficient estimated value μ_estm, is not lower than the magnitude of the friction force that is inferred to actually occur between the wheel 2-i and the road surface on a road surface having the road surface friction coefficient estimated value μ_estm.

In other words, the situation where the maximum value of the magnitude of the friction force (the maximum friction force), which is likely to occur between each wheel 2-i and the road surface according to μ_estm, is lower than the magnitude of the friction force, which is inferred to actually occur between the wheel 2-i and the road surface is a situation where the value of the road surface friction coefficient estimated value μ_estm is excessively small relative to the actual road surface friction coefficient μ_act for some reason.

Therefore, in this situation, the first auxiliary increasing/decreasing manipulated variable determiner 51 in this embodiment determines the first auxiliary increasing/decreasing manipulated variable Δμfb_lim as a manipulated variable for use in modifying the road surface friction coefficient estimated value μ_estm in an increasing direction.

The first auxiliary increasing/decreasing manipulated variable determiner 51 includes a friction coefficient lower limit value determiner 51a, which calculates a road surface friction coefficient lower limit value μlim as an allowable lower limit of the road surface friction coefficient estimated value μ_estm, a computing unit 51b, which calculates a deviation (μlim-μ_estm_p) obtained by subtracting the previous value μ_estm_p of the road surface friction coefficient estimated value from the calculated value μlim, a processor 51c, which inputs the deviation, and a gain multiplier 51d, which calculates the first auxiliary increasing/decreasing manipulated variable Δμfb_lim by multiplying an output of the processor 51c by a gain having a predetermined value Kx (>0), which has been set beforehand.

Then, the first auxiliary increasing/decreasing manipulated variable determiner 51 receives a vehicle center-of-gravity lateral acceleration detected value Accy_sens among the detected values generated in S100 by the quantity-to-be-observed detecting means 22, a yaw angular acceleration detected value γdot_sens, front wheel rudder angle detected values δf_sens as the respective rudder angle detected values δ1_sens and δ2_sens of the front wheels 2-1 and 2-2, and a wheel torque detected value Tq_i_sens and a wheel speed detected value Vw_i_sens of each wheel 2-i, and further receives a ground contact load estimated value Fz_i_estm of each wheel 2-i, which has been calculated by the vehicle model computing means 24 in the processing of the wheel ground contact load estimator 24a (the processing in S102), and a previous value μ_estm_p as the latest value of the road surface friction coefficient estimated value μ_estm, which the vehicle model computing means 24 has used to calculate ↑Fsub_i_estm in the friction characteristic model.

The first auxiliary increasing/decreasing manipulated variable determiner 51 determines the first auxiliary increasing/decreasing manipulated variable Δμfb_lim by performing the processing described below by using these input values.

Hereinafter, the processing will be described. The first auxiliary increasing/decreasing manipulated variable determiner 51, first, performs the processing of the friction coefficient lower limit value determiner 51a. The friction coefficient lower limit value determiner 51a calculates the road surface friction coefficient lower limit value μlim by performing the processing illustrated in the flowchart of FIG. 17 by using the vehicle center-of-gravity lateral acceleration detected value Accy_sens, the yaw angular acceleration detected value γdot_sens, the front wheel rudder angle detected value δf_sens (=δ1_sens=δ2_sens), the wheel torque detected value Tq_i_sens (i=1, 2, 3, 4), the wheel speed detected value Vw_i_sens (i=1, 2, 3, 4), and the ground contact load estimated value Fz_i_estm (i=1, 2, 3, 4), which have been input.

In other words, the friction coefficient lower limit value determiner 51a, first in S51-1, calculates a front wheel resultant friction force lateral component detected value Ffy_sens, as a detected value of a lateral component of the vehicle 1 (a component in the Y-axis direction of the vehicle body coordinate system) Ffy out of the resultant force of the friction force (hereinafter, referred to as "front wheel resultant friction force") acting on the front wheels 2-1 and 2-2 from a road surface, and a rear wheel resultant friction force lateral component detected value Fry_sens, as a detected value of a lateral component of the vehicle 1 (a component in the Y-axis direction of the vehicle body coordinate system) Fry out of the resultant force of the friction force (hereinafter, referred to as "rear wheel resultant friction force") acting on the rear wheels 2-3 and 2-4 from a road surface, from the vehicle center-of-gravity lateral acceleration detected value Accy_sens and the yaw angular acceleration detected value γdot_sens according to the expressions illustrated in the diagram.

The front wheel resultant friction force lateral component detected value Ffy_sens is, in other words, a detected value of a component in the Y-axis direction (=Fy_1+Fy_2) of a resultant force of the aforesaid respective two-dimensional road surface reaction forces ↑F1 and ↑F2 of the front wheels 2-1 and 2-2. Similarly, the rear wheel resultant friction force lateral component detected value Fry_sens is, in other words, a detected value of a component in the Y-axis direction (=Fy_3+Fy_4) of a resultant force of the aforesaid respective two-dimensional road surface reaction forces ↑F3 and ↑F4 of the rear wheels 2-3 and 2-4.

In this case, the arithmetic expression of the processing of S51-1 is an arithmetic expression derived from a dynamic equation of a translational motion represented by Ffy+Fry=m*Accy and a dynamic equation of a rotational motion represented by Lf*Ffy−Lr*Fry=Iz*γdot. As the values of Accy and γdot in these dynamic equations, Accy_sens and γdot_sens are used.

Moreover, predetermined values set beforehand are used as the values of the distance between the front wheel axle and the center of gravity Lf, the distance between the rear wheel axle and the center of gravity Lr, the vehicle mass m, and the vehicle yaw inertia moment Iz, which are necessary for the computation of the processing of S51-1.

Although the aforesaid dynamic equation for the rotational motion does not include a moment component, which is to be generated about the yaw axis at the center-of-gravity point of the vehicle 1 by the component in the X-axis direction of the driving/braking force of each wheel 2-i, Ffy_sens and Fry_sens may be calculated by using an arithmetic expression including the moment component.

In this case, the value of the moment component is able to be identified on the basis of the component in the X-axis direction of the driving/braking force detected value Fsubx_i_sens of each wheel 2-i, which is calculated as described later, for example.

Subsequently, the friction coefficient lower limit value determiner 51a calculates the driving/braking force detected value Fsubx_i_sens of each wheel 2-i (i=1, 2, 3, 4) according to an expression illustrated in the diagram from the wheel torque detected value Tq_i_sens of each wheel 2-i, which has been input, and the wheel speed change rate detected value Vwdot_i_sens, which has been calculated as a differential value (temporal change rate) of the wheel speed detected value Vw_i_sens, in S51-2.

This expression is the same as the aforesaid expression 1-8c, which has been described in the first embodiment, wherein the values of the effective wheel radius Rw_i and the wheel inertia moment Iw_i in the right side of the expression are predetermined values set beforehand. The second term in the right side of the expression may be replaced by a term ωwdot_i_sens*Iw_i/Rw_i using ωwdot_i_sens, which is a differential value of the wheel rotational angular velocity detected value ωw_i_sens indicated by an output of the wheel rotational angular velocity sensor 8-i.

Subsequently, in S51-3, the friction coefficient lower limit value determiner 51a calculates a front wheel resultant friction force longitudinal component detected value Ffx_sens, as a detected value of a component in the longitudinal direction of the vehicle 1 (a component in the X-axis direction of the vehicle body coordinate system) Ffx out of the front wheel resultant friction force, and a rear wheel resultant friction force longitudinal component detected value Frx_sens, as a detected value of a component in the longitudinal direction of the vehicle 1 (a component in the X-axis direction of the vehicle body coordinate system) Frx out of the rear wheel resultant friction force.

In this case, the front wheel resultant friction force longitudinal component detected value Ffx_sens is calculated according to the expression illustrated in the diagram from the driving/braking force detected values Fsubx_1_sens and Fsubx_2_sens of the front wheels 2-1 and 2-2, which have been calculated in S51-2, and the rudder angle detected values δ1_sens (=δf_sens) and δ2_sens (=δf_sens).

In other words, Ffx_sens is calculated by adding up the component in the X-axis direction Fsubx_1_sens*cos(δ1_sens) of the driving/braking force detected value Fsubx_1_sens of the first wheel 2-1 and the component in the X-axis direction Fsubx_2_sens*cos(δ2_sens) of the driving/braking force detected value Fsubx_2_sens of the second wheel 2-2.

Although the component in the longitudinal direction of the front wheel resultant friction force also includes a component in the X-axis direction of a lateral force of each of the front wheels 2-1 and 2-2 in a precise sense, the component is generally very small in comparison with the component in the X-axis direction of the driving/braking force of each of the front wheels 2-1 and 2-2 and therefore can be ignored.

Moreover, the rear wheel resultant friction force longitudinal component detected value Frx_sens is calculated according to the expression illustrated in the diagram from the driving/braking force detected values Fsubx_3_sens and Fsubx_4_sens of the rear wheels 2-3 and 2-4, which have been calculated in S51-2.

In other words, the rear wheels 2-3 and 2-4 are non-steering wheels, and therefore the value Frx_sens is calculated by adding up the driving/braking force detected value Fsubx_3_sens of the third wheel 2-3 and the driving/braking force detected value Fsubx_4_sens of the fourth wheel 2-4.

Subsequently, in S51-4, the friction coefficient lower limit value determiner 51*a* calculates a front wheel resultant friction force magnitude estimated value Ff_mag_sens, as a detected value of the magnitude (the absolute value) of the front wheel resultant friction force, and a rear wheel resultant friction force magnitude estimated value Fr_mag_sens, as a detected value of the magnitude (the absolute value) of the rear wheel resultant friction force, according to the expression illustrated in the diagram.

In other words, the friction coefficient lower limit value determiner 51*a* calculates the absolute value of a vector (Ffx_sens, Ffy_sens)$^T$ with Ffy_sens calculated in S51-1 and Ffx_sens calculated in S51-3 as a component in the Y-axis direction and a component in the X-axis direction, respectively, as a front wheel resultant friction force magnitude detected value Ff_mag_sens.

Similarly, the friction coefficient lower limit value determiner 51*a* calculates the absolute value of a vector (Frx_sens, Fry_sens)$^T$ with Fry_sens calculated in S51-1 and Frx_sens calculated in S51-3 as a component in the Y-axis direction and a component in the X-axis direction, respectively, as a rear wheel resultant friction force magnitude detected value Fr_mag_sens. In addition, sqrt( ) of the expression illustrated in the diagram denotes a square root function.

The front wheel resultant friction force magnitude detected value Ff_mag_sens, which is calculated in S51-4 in this manner, has a meaning of an observed value of the magnitude of a resultant force of the friction forces, which are actually generated between each of the front wheels 2-1 and 2-2 and a road surface. Similarly, the rear wheel resultant friction force magnitude detected value Fr_mag_sens has a meaning of an observed value of the magnitude of a resultant force of the friction forces, which are actually generated between each of the rear wheels 2-3 and 2-4 and a road surface.

Subsequently, in S51-5, the friction coefficient lower limit value determiner 51*a* calculates a front wheel side road surface friction coefficient lower limit value μf_lim as a lower limit value of the road surface friction coefficient, which is required to generate a friction force (front wheel resultant friction force) having the magnitude of the front wheel resultant friction force magnitude detected value Ff_mag_sens, and a rear wheel side road surface friction coefficient lower limit value μr_lim as a lower limit value of the road surface friction coefficient, which is required to generate a friction force (rear wheel resultant friction force) having the magnitude of the rear wheel resultant friction force magnitude detected value Fr_maf_sens, according to the expression illustrated in the diagram.

Specifically, the friction coefficient lower limit value determiner 51*a* calculates the front wheel side road surface friction coefficient lower limit value μf_lim by dividing the value Ff_mag_sens, which has been calculated in S51-4, by a front wheel resultant ground contact load estimated value Ffz_estm, which is obtained by adding up the respective ground contact load estimated values Fz_1_estm and Fz_2_estm of the front wheels 2-1 and 2-2, which have been input.

Moreover, the friction coefficient lower limit value determiner 51*a* calculates a rear wheel side road surface friction coefficient lower limit value μr_lim by dividing the value Fr_mag_sens, which has been calculated in S51-4, by a rear wheel resultant ground contact load estimated value Frz_estm, which is obtained by adding up the respective ground contact load estimated values Fz_3_estm and Fz_4_estm of the rear wheels 2-3 and 2-4, which have been input.

Here, the value obtained by multiplying Ffz_estm by the actual road surface friction coefficient μ_act corresponds to the maximum value of the magnitude of the resultant force of the friction forces of the front wheels 2-1 and 2-2, which can be generated according to μ_act. Similarly, the value obtained by multiplying Frz_estm by the actual road surface friction coefficient μ_act corresponds to the maximum value of the magnitude of the resultant force of the friction forces of the rear wheels 2-3 and 2-4, which can be generated according to μ_act.

Therefore, supposing that the front wheel resultant friction force magnitude detected value Ff_mag_sens accurately agrees with the magnitude of an actual front wheel resultant friction force, the actual road surface friction coefficient μ_act is definitely not lower than the front wheel side road surface friction coefficient lower limit value μf_lim. Similarly, supposing that the rear wheel resultant friction force magnitude detected value Fr_mag_sens accurately agrees with the magnitude of an actual rear wheel resultant friction force, the actual road surface friction coefficient μ_act is definitely not lower than the rear wheel side road surface friction coefficient lower limit value μr_lim. Therefore, the road surface friction coefficient estimated value μ_estm is required to be not lower than both of μf_lim and μr_lim.

Therefore, subsequently in S51-6, the friction coefficient lower limit value determiner 51*a* determines a greater value of the front wheel side road surface friction coefficient lower limit value μf_lim and the rear wheel side road surface friction coefficient lower limit value μr_lim, which have been found as described above, i.e., max(μf_lim, μr_lim) as a road surface friction coefficient lower limit value μlim.

The above is the processing of the friction coefficient lower limit value determiner 51*a*.

Subsequently, the first auxiliary increasing/decreasing manipulated variable determiner 51 performs the processing of the computing unit 51*b*. The computing unit 51*b* calculates a deviation (μlim−μ_estm_p) between μlim and μ_estm_p by subtracting the previous value μ_estm_p of the road surface friction coefficient estimated value, which has been input, from the road surface friction coefficient lower limit value μlim, which has been found by the friction coefficient lower limit value determiner 51*a*.

Subsequently, the first auxiliary increasing/decreasing manipulated variable determiner 51 inputs the deviation ($\mu$lim−$\mu$_estm_p), which has been calculated by the computing unit 51b, into the processor 51c.

If the input value≥0 holds, the processor 51c directly outputs the input value. If the input value<0 holds, the processor 51c outputs zero independently of the input value. Therefore, the output value of the processor 51c is the aforesaid deviation ($\mu$lim−$\mu$_estm_p) if $\mu$lim≥$\mu$_estm_p holds, and the output value is zero if $\mu$lim<$\mu$_estm_p holds.

Subsequently, the first auxiliary increasing/decreasing manipulated variable determiner 51 inputs the output value of the processor 51c into the gain multiplier 51d and determines a value obtained by multiplying the output value by a gain having a predetermined value Kx (>0) by the gain multiplier 51d as a first auxiliary increasing/decreasing manipulated variable $\Delta\mu$fb_lim.

The above is the details of the processing of the first auxiliary increasing/decreasing manipulated variable determiner 51.

The first auxiliary increasing/decreasing manipulated variable $\Delta\mu$fb_lim is determined in this manner. Thus, the $\Delta\mu$fb_lim is zero if $\mu$lim≤$\mu$_estm_p holds, while $\Delta\mu$fb_lim is a value proportional to the aforesaid deviation ($\mu$lim−$\mu$_estm_p) if $\mu$lim>$\mu$_estm_p holds.

Therefore, if $\mu$lim>$\mu$_estm_p holds, the $\Delta\mu$fb_lim is determined as a feedback manipulated variable having a function of modifying the road surface friction coefficient estimated value $\mu$_estm so as to be close to $\mu$lim.

In other words, the first auxiliary increasing/decreasing manipulated variable $\Delta\mu$fb_lim is determined as a feedback manipulated variable having a function of modifying the road surface friction coefficient estimated value $\mu$_estm, in a situation where the magnitude of a friction force (the maximum friction force), which is likely to occur between each wheel 2-i and the road surface according to the road surface friction coefficient estimated value $\mu$_estm is lower than the magnitude of the friction force, which is inferred to actually occur between the wheel 2-i and a road surface, on the road surface having the road surface friction coefficient estimated value $\mu$_estm, such that this problem is eliminated.

Subsequently, the second auxiliary increasing/decreasing manipulated variable determiner 52 determines a manipulated variable having a function of adjusting the road surface friction coefficient estimated value $\mu$_estm always in an increasing direction as the second auxiliary increasing/decreasing manipulated variable $\Delta\mu$up_bias.

Here, in the first to third embodiments, for example, when the vehicle 1 is traveling straight, the $\mu$ sensitivity p is zero or a value close thereto and therefore each friction coefficient increasing/decreasing manipulated variable $\Delta\mu$_k (k=1, ..., M) is maintained at zero or a value close thereto. Thus, the road surface friction coefficient estimated value $\mu$_estm is maintained substantially constant.

Therefore, even if the actual road surface friction coefficient $\mu$_act increases, for example, while the vehicle 1 is traveling straight after turning travel on a road surface having a low actual road surface friction coefficient $\mu$_act, the road surface friction coefficient estimated value $\mu$_estm may be maintained at a value lower than the actual road surface friction coefficient $\mu$_act (a value observed during the turning travel or a value close to the value) in some cases.

On the other hand, in the case where the controller 20 controls the behavior of the skid motion or the like of the vehicle 1 to a desired behavior, the controller 20 recognizes that a slip of the vehicle 1 easily occurs (a deviation from the desired behavior easily occurs) if the road surface friction coefficient estimated value $\mu$_estm is relatively small, and therefore the controller 20 actively controls the braking force or the like of each wheel 2-i.

Therefore, in a situation where the road surface friction coefficient estimated value $\mu$_estm is lower than the actual road surface friction coefficient $\mu$_act as described above, a condition requiring a control of the braking force or the like of each wheel 2-i is apt to frequently occur in comparison with a situation where the road surface friction coefficient estimated value $\mu$_estm substantially agrees with the actual road surface friction coefficient $\mu$_act. Accordingly, in this embodiment, there is used a second auxiliary increasing/decreasing manipulated variable $\Delta\mu$up_bias having a function of adjusting the road surface friction coefficient estimated value $\mu$_estm always in an increasing direction.

In this case, in this embodiment, the second auxiliary increasing/decreasing manipulated variable determiner 52 determines the second auxiliary increasing/decreasing manipulated variable $\Delta\mu$up_bias according to the previous value $\mu$_estm_p as the latest value of the road surface friction coefficient estimated value $\mu$_estm. In the second auxiliary increasing/decreasing manipulated variable determiner 52, a relationship between an input value $\mu$_estm_p and an output value (a function value of the input value) $\Delta\mu$up_bias is set beforehand in the form of a map data or an arithmetic expression.

Then, the second auxiliary increasing/decreasing manipulated variable determiner 52 determines the second auxiliary increasing/decreasing manipulated variable $\Delta\mu$up_bias according to the aforesaid relationship from the road surface friction coefficient estimated value (the previous value) $\mu$_estm_p, which has been input.

In this case, in this embodiment, the above relationship is set such that the output value (the value in the vertical axis direction) $\Delta\mu$up_bias monotonically increases as the input value (the value in the horizontal axis direction) $\mu$_estm_p increases as illustrated in the graph of FIG. 16. In other words, the relationship is set such that the greater the value $\mu$_estm_p is, the greater the value $\Delta\mu$up_bias will be.

In the illustrated example, the change rate of $\Delta\mu$up_bias relative to a change in $\mu$_estm_p (a differential value of $\Delta\mu$up_bias according to $\mu$_estm_p) is set so as to change according to the value of $\mu$_estm_p. More specifically, the change rate is set such that the absolute value of the change rate is small ($\Delta\mu$up_bias is maintained substantially constant) when $\mu$_estm_p is relatively large or small in comparison with the case where $\mu$_estm_p is medium.

The above is the details of the processing of the second auxiliary increasing/decreasing manipulated variable determiner 52.

In this embodiment, as described above, the updating increasing/decreasing manipulated variable determiner 35 receives the friction coefficient increasing/decreasing manipulated variables $\Delta\mu$_1 to $\Delta\mu$_M, which have been determined as described above by the first to M-th friction coefficient increasing/decreasing manipulated variable determiners 34_1 to 34_M (M=3 in this embodiment), respectively, and further the first auxiliary increasing/decreasing manipulated variable $\Delta\mu$fb_lim and the second auxiliary increasing/decreasing manipulated variable $\Delta\mu$up_bias as inputs.

Then, the updating increasing/decreasing manipulated variable determiner 35 determines the updating increasing/decreasing manipulated variable NA from these input values.

In this case, the updating increasing/decreasing manipulated variable determiner 35 includes an Mnsp convergence $\Delta\mu$ determiner 35f, which determines an Mnsp convergence increasing/decreasing manipulated variable $\Delta\mu$_nsp as a friction coefficient increasing/decreasing manipulated variable having a function of converging the NSP yaw moment estimated value Mnsp_estm to an NSP yaw moment detected value Mnsp_sens, and a computing unit 35g, which adds up this $\Delta\mu$_nsp, the first auxiliary increasing/decreasing manipulated variable $\Delta\mu$fb_lim, and the second auxiliary increasing/decreasing manipulated variable $\Delta\mu$up_bias. Then, $\Delta\mu$_1 to $\Delta\mu$_M are input to the Mnsp convergence $\Delta\mu$ determiner 35f.

The Mnsp convergence NA determiner 35f calculates the Mnsp convergence increasing/decreasing manipulated variable $\Delta\mu$_nsp by the same processing as the aforesaid updating increasing/decreasing manipulated variable determiner of the first or second embodiment (the processing illustrated in FIG. 13 or FIG. 14) from input values $\Delta\mu$_1 to $\Delta\mu$_M. In other words, the Mnsp convergence NA determiner 35f outputs the value $\Delta\mu$ calculated by the processing in FIG. 13 or FIG. 14 as the Mnsp convergence increasing/decreasing manipulated variable $\Delta\mu$_nsp.

Then, the updating increasing/decreasing manipulated variable determiner 35 determines the updating increasing/decreasing manipulated variable $\Delta\mu$ by adding the first auxiliary increasing/decreasing manipulated variable $\Delta\mu$fb_lim and the second auxiliary increasing/decreasing manipulated variable $\Delta\mu$up_bias to the Mnsp convergence increasing/decreasing manipulated variable $\Delta\mu$_nsp in the computing unit 35g.

This embodiment is the same as any one of the first to third embodiments except for the aspects described above.

This embodiment is able to provide the following effect in addition to the same effects as those of the first to third embodiments.

Specifically, the updating increasing/decreasing manipulated variable $\Delta\mu$ includes the first auxiliary increasing/decreasing manipulated variable $\Delta\mu$fb_lim, by which the road surface friction coefficient estimated value $\mu$_estm is updated so as not to be lower than the road surface friction coefficient lower limit value $\mu$lim, thereby preventing an inappropriate $\mu$_estm from being found such that the magnitude of a friction force (the maximum friction force) likely to occur between each wheel 2-i and the road surface according to $\mu$_estm is lower than the magnitude of the friction force inferred to actually occur between the wheel 2-i and the road surface. Therefore, the reliability of $\mu$_estm is able to be increased.

Moreover, it is possible to reduce the situations where the road surface friction coefficient estimated value $\mu$_estm is maintained lower than the actual road surface friction coefficient $\mu$_act. Therefore, particularly when the behavior of the skid motion or the like of the vehicle 1 is controlled to a desired behavior, it is possible to prevent frequent occurrence of a situation where the braking force or the like of each wheel 2-i is controlled.

Fifth Embodiment

Subsequently, a fifth embodiment of the present invention will be described with reference to FIG. 18.

This embodiment differs from the first to fourth embodiments only in the processing of the $\Delta\mu$ calculator 42_k of each of the first to M-th friction coefficient increasing/decreasing manipulated variable determiners 34_1 to 34_M of the $\mu$ estimating means 26.

First, describing the outline, in this embodiment, the each friction coefficient increasing/decreasing manipulated variable determiner 34_k of the $\mu$ estimating means 26 sets a non-negative predetermined value set beforehand ("0" in this embodiment) as a friction coefficient increasing/decreasing manipulated variable $\Delta\mu$_k in order to prevent the road surface friction coefficient estimated value $\mu$_estm from being updated according to the k-th NSP yaw moment estimation error Mnsp_err_k in the case of satisfying a predetermined updating cancellation condition, which includes a condition related to the polarities of the detected value Mnsp_sens or Mnsp_sens_f_k of the NSP yaw moment and the estimated value Mnsp_estm or Mnsp_estm_f_k, which have been used to calculate the k-th NSP yaw moment deviation Mnsp_err_k to be input to the $\Delta\mu$ calculator 42_k.

In addition, each friction coefficient increasing/decreasing manipulated variable determiner 34_k determines the friction coefficient increasing/decreasing manipulated variable $\Delta\mu$_k according to Mnsp_err_k in the same method as the first to fourth embodiments, if the aforesaid updating cancellation condition is not satisfied.

Here, Mnsp_sens and Mnsp_estm have a meaning of values obtained by estimating the value of the same actual NSP yaw moment Mnsp_act using approaches different from each other. Moreover, the polarity (direction) of the actual NSP yaw moment Mnsp_act can be any one of the positive polarity and the negative polarity according to the traveling state of the vehicle 1.

Therefore, in a situation where Mnsp_act≠0 holds, Mnsp_sens and Mnsp_estm should be moments having the same polarity (moments in the same direction).

Further, in a situation where Mnsp_sens and Mnsp_estm have polarities different from each other, the error of Mnsp_sens or Mnsp_estm is relatively large in comparison with the absolute value of Mnsp_sens or Mnsp_estm. Thus, the reliability of the value of Mnsp_sens or Mnsp_estm is considered to be low (the S/N ratio is low).

Therefore, if the road surface friction coefficient estimated value $\mu$_estm is updated according to the NSP yaw moment estimation error Mnsp_err, which is calculated from Mnsp_sens and Mnsp_estm, in this situation, the absolute value of Mnsp_err further increases and thus the road surface friction coefficient estimated value $\mu$_estm might diverge. The above is the same in the polarity relationship between Mnsp_sens_f_k and Mnsp_estm_f_k.

Accordingly, in this embodiment, the M-th friction coefficient increasing/decreasing manipulated variable determiner 34_M cancels the determination of $\Delta\mu$_M based on Mnsp_err at least when the polarities of Mnsp_sens and Mnsp_estm are different from each other (reverse polarities).

Similarly, each of the first to N-th friction coefficient increasing/decreasing manipulated variable determiners 34_k (k=1, ..., N) cancels the determination of $\Delta\mu$_k based on Mnsp_err_k at least when the polarities of Mnsp_sens_f_k and Mnsp_estm_f_k are different from each other (reverse polarities).

Figure 18:
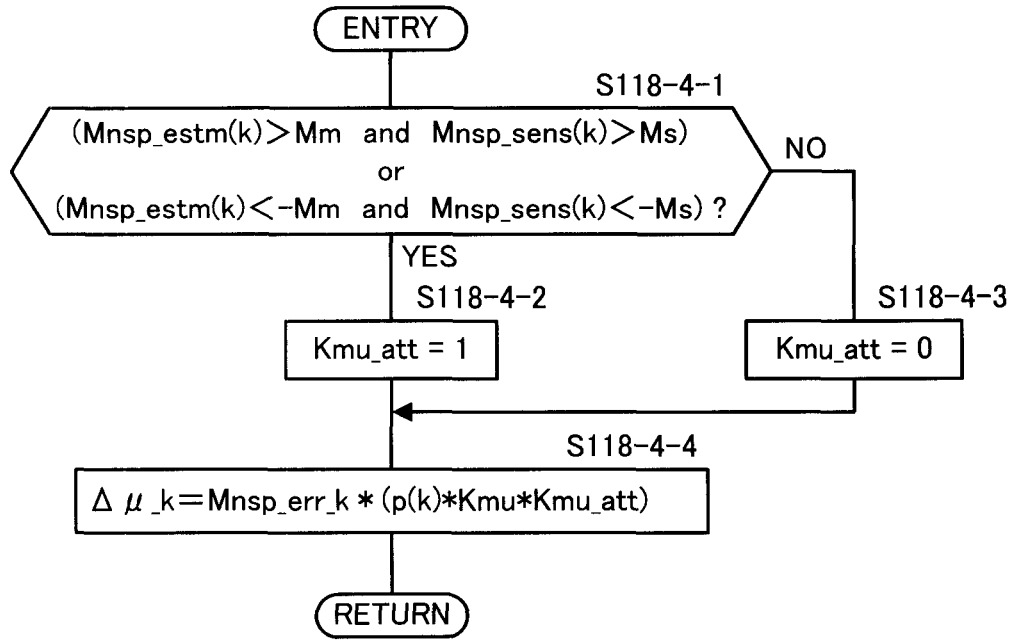
FIG. 18 is a flowchart illustrating the processing in which each friction coefficient increasing/decreasing manipulated variable determiner determines a friction coefficient increasing/decreasing manipulated variable in a fifth embodiment.

More specifically, in this embodiment, each of the friction coefficient increasing/decreasing manipulated variable determiners 34_k of the first to M-th friction coefficient increasing/decreasing manipulated variable determiners 34_1 to 34_M of the $\mu$ estimating means 26 determines the friction coefficient increasing/decreasing manipulated variable $\Delta\mu$_k by performing the processing illustrated in the flowchart of FIG. 18 by the $\Delta\mu$ calculator 42_k.

In this case, in this embodiment, the $\Delta\mu$ calculator 42_k receives the k-th NSP yaw moment deviation Mnsp_err_k and the $\mu$ sensitivity p, the $\mu$ sensitivity dependent value p_f_k, or the $\mu$ sensitivity dependent value p_a_k similarly to the first to fourth embodiments, and further receives Mnsp_sens or Mnsp_sens_f_k and Mnsp_estm or Mnsp_estm_f_k, which are used to calculate the k-th NSP yaw moment deviation Mnsp_err_k as inputs.

In the following description of the flowchart in FIG. 18, Mnsp_sens or Mnsp_sens_f_k, which is used to calculate the k-th NSP yaw moment deviation Mnsp_err_k by the k-th friction coefficient increasing/decreasing manipulated variable determiner 34_k (k=1, ... , M), is denoted by a reference character Mnsp_sens(k) and referred to as the k-th NSP yaw moment detected value.

In addition, Mnsp_estm or Mnsp_estm_f_k to be used to calculate Mnsp_err_k are represented by a reference character Mnsp_estm(k) and referred to as k-th NSP yaw moment estimated values. In this case, in this embodiment, Mnsp_sens(k)=Mnsp_sens and Mnsp_estm(k)=Mnsp_estm hold if k=M is satisfied, and Mnsp_sens(k)=Mnsp_sens_f_k and Mnsp_estm(k)=Mnsp_estm_f_k hold if k≠M is satisfied (if k is any one of 1 to N).

Further, similarly to the above, the μ sensitivity p, the μ sensitivity dependent value p_f_k, or the μ sensitivity dependent value p_a_k, which are input to the Δμ calculator 42_k of the k-th friction coefficient increasing/decreasing manipulated variable determiner 34_k (k=1, ... , M), are each represented by p(k) and referred to as the k-th μ sensitivity. In this case, supposing that the configuration is the same as in the first or second embodiment except for the μ calculator 42_k of the k-th friction coefficient increasing/decreasing manipulated variable determiner 34_k, p(k)=p holds if k=M is satisfied and p(k)=p_f_k holds if k≠M is satisfied (if k is any one of 1 to N).

Further, supposing that the configuration is the same as in the first or second embodiment except for the μ calculator 42_k of the k-th friction coefficient increasing/decreasing manipulated variable determiner 34_k, p(k)=p_a_k (k=1, ... , M) holds. The meanings of these values Mnsp_sens (k), Mnsp_estm(k), and p(k) are the same as those in sixth to eighth embodiments described later.

Hereinafter, the processing of FIG. 18 will be described. The Δμ calculator 42_k of each friction coefficient increasing/decreasing manipulated variable determiner 34_k (k=1, . . . , M), first in S118-4-1, determines whether a condition of Mnsp_estm(k)>Mm and Mnsp_sens(k)>Ms or a condition of Mnsp_estm(k)<−Mm and Mnsp_sens(k)<−Ms is satisfied. Here, Mm and Ms are non-negative predetermined values (zero or a positive value close to zero) set beforehand.

The determination processing in S118-4-1 is processing of determining whether the aforesaid updating cancellation condition is satisfied. A negative determination result in S118-4-1 means that the updating cancellation condition is satisfied.

In this case, if the predetermined values Mm and Ms are set to zero, a negative determination result in S118-4-1 (the updating cancellation condition is satisfied) is equivalent to that Mnsp_estm(k) and Mnsp_sens(k) have polarities different from each other.

On the other hand, if the predetermined values Mm and Ms are positive values, the determination result in S118-4-1 is negative (the updating cancellation condition is satisfied) not only when Mnsp_estm(k) and Mnsp_sens(k) have polarities different from each other, but also when −Mm≤Mnsp_estm (k)≤Mm or −Ms≤Mnsp_sens(k)≤Ms is satisfied (in other words, Mnsp_estm(k) or Mnsp_sens(k) is a value in a range close to zero).

Subsequently, in S118-4-2 or S118-4-3, the Δμ calculator 42_k sets a gain adjustment parameter Kmu_att, which is a parameter for use in adjusting the friction coefficient operation gain Gmu (changes a value by which the k-th NSP yaw moment deviation Mnsp_err_k is multiplied, together with the k-th μ sensitivity p(k), from the basic gain Kmu) according to the determination result in S118-4-1.

To be more specific, the Δμ calculator 42_k sets the value of Kmu_att to 1 in S118-4-2 if the determination result in S118-4-1 is affirmative (if the updating cancellation condition does not hold). If the determination result is negative (if the updating cancellation condition holds), then the Δμ calculator 42_k sets the value of Kmu_att to zero in S118-4-3.

Subsequently, the Δμ calculator 42_k calculates in S118-4-4 the friction coefficient increasing/decreasing manipulated variable Δμ_k according to the following expression 7-2b having a form in which the gain adjustment parameter Kmu_att is added to the expression 7-2-1, 7-2-k, or 7-2a.

$$\Delta\mu\_k = \text{Mnsp\_err\_k} * Gmu \qquad \text{Expression 7-2b}$$
$$= \text{Mnsp\_err\_k} * (p(k) * Kmu * \text{Kmu\_att})$$

Therefore, in this embodiment, a value obtained by further multiplying p(k)*Kmu by Kmu_att is considered as a friction coefficient operation gain Gmu. The friction coefficient increasing/decreasing manipulated variable Δμ_k is determined by multiplying Mnsp_err_k by the value Gmu (=p(k) *Kmu*Kmu_att).

This embodiment is the same as any one of the first to forth embodiments except for the processing of the Δμ calculator 42_k of each friction coefficient increasing/decreasing manipulated variable determiner 34_k described above. This embodiment provides the effect described below, in addition to the effects described in the first to fourth embodiments.

Specifically, the friction coefficient increasing/decreasing manipulated variable Δμ_k is determined as described above, thereby causing the determination result in S118-4-1 to be negative and therefore the value of the gain adjustment parameter Kmu_att is set to zero, in a situation where the k-th NSP yaw moment detected value Mnsp_sens(k) and the k-th NSP yaw moment estimated value Mnsp_estm(k) have polarities different from each other.

Consequently, Δμ_k is forcibly set to zero. Accordingly, Δμ_k does not contribute to the updating of the road surface friction coefficient estimated value μ_estm, by which the updating of the road surface friction coefficient estimated value μ_estm based on Mnsp_err_k is cancelled.

This makes it possible to prevent the road surface friction coefficient estimated value μ_estm from diverging in the situation where Mnsp_sens(k) and Mnsp_estm(k) have polarities different from each other.

Moreover, if the determination result in S118-4-1 is affirmative, i.e., if the updating cancellation condition does not hold, the value Kmu_att is set to 1. Therefore, the friction coefficient increasing/decreasing manipulated variable Δμ_k has a function of a manipulated variable that converges the k-th NSP yaw moment deviation Mnsp_err_k to zero.

Supplementally, in the case where the predetermined values Mm and Ms in the determination processing in S118-4-1 are set to positive values, the determination result in S118-4-1 is negative if the Mnsp sens(k) or Mnsp_estm(k) takes a value in a range close to zero, as described above, and therefore the value of Δμ_k is forcibly set to zero.

Therefore, it is possible to cancel the updating of μ_estm based on Mnsp_err_k in the case where Mnsp_estm(k) and Mnsp_sens(k) have polarities different from each other and also in the case where the error of Mnsp_sens(k) or Mnsp_ estm(k) is likely to be relatively large, as compared with the magnitude of the actual NSP yaw moment Mnsp_act.

In this embodiment, the value of the gain adjustment parameter Kmu_att has been determined on the basis of the determination result in S118-4-1. Alternatively, however, the value of Δμ_k may be determined according to an expression obtained by setting the value of Kmu_att to 1 in the aforesaid expression 7-2b without using Kmu_att in the case where the determination result in S118-4-1 is affirmative, or the value of Δμ_k may be set to zero in the case where the determination result is negative.

Sixth Embodiment

A sixth embodiment of the present invention will now be described with reference to FIG. 19 and FIG. 20. This embodiment differs from the aforesaid fifth embodiment only in the method of setting the gain adjustment parameter Kmu_att in a Δμ calculator 42_k of each friction coefficient increasing/decreasing manipulated variable determiner 34_k (k=1, . . . , M).

In the fifth embodiment described above, Kmu_att has always been set to 1 in the case where the determination result in S118-4-1 is affirmative (if the updating cancellation condition does not hold).

Figure 19:
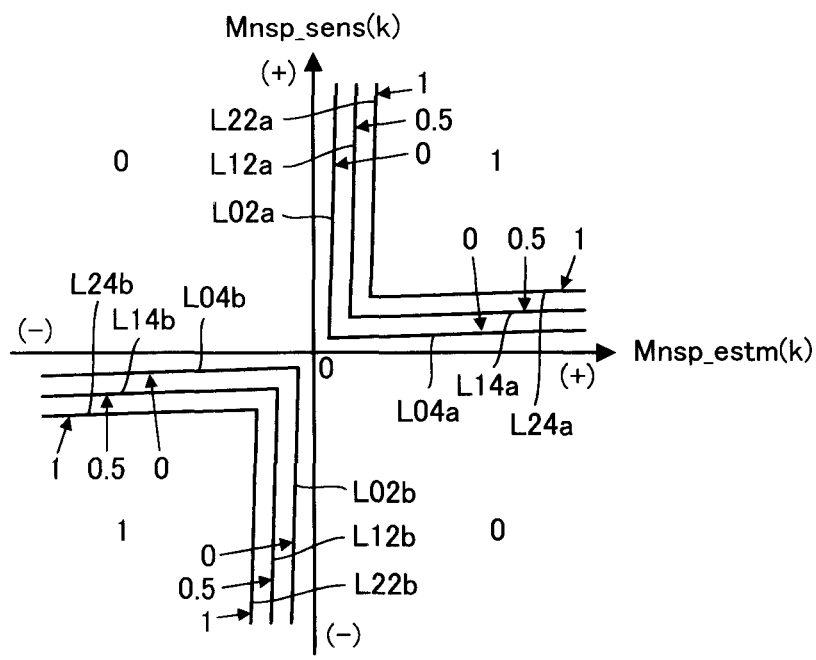
FIG. 19 is a diagram for describing the processing in which each friction coefficient increasing/decreasing manipulated variable determiner determines a friction coefficient increasing/decreasing manipulated variable in a sixth embodiment.

In contrast thereto, according to this embodiment, Kmu_att is set such that Kmu_att changes within a range of 0 to 1 according to Mnsp_estm(k) and Mnsp_sens(k) as illustrated in, for example, FIG. 19 in the case where the determination result in S118-4-1 is affirmative.

FIG. 19 visually illustrates the set values of Kmu_att corresponding to pairs of the values of Mnsp_estm(k) and the values of Mnsp_sens(k) on a coordinate plane, Mnsp_estm(k) being on the axis of abscissas and Mnsp_sens(k) being on the axis of ordinates. In the diagram, the numeral values 0 (excluding 0 at the intersection (the point of origin) of the axis of ordinates and the axis of abscissas), 0.5, and 1 indicate the representative examples of set values of Kmu_att.

In the example given in FIG. 19, Kmu_att is always set to zero in the case where the point of the pair of the value of Mnsp_estm(k) and the value of Mnsp_sens(k) (Mnsp_estm(k), Mnsp_sens(k)) lies in a second quadrant (the range where Mnsp_estm(k)<0 and Mnsp_sens(k)>0) or a fourth quadrant (Mnsp_estm(k)>0 and Mnsp_sens(k)<0), i.e., Mnsp_estm(k) and Mnsp_sens(k) have polarities different from each other.

Further, if a point (Mnsp_estm(k), Mnsp_sens(k)) falls in a first quadrant (the range where Mnsp_estm(k)>0 and Mnsp_sens(k)>0), Kmu_att is set to 0, 0.5, or 1 when the point (Mnsp_estm(k), Mnsp_sens(k)) lies on a half line L02 a or L04 a, a half line L12 a or L14 a, or a half line L22 a or L24 a, respectively.

Further, Kmu_att is always set to 0 in the range between the half lines L02 a, L04a and the axis of ordinates and the axis of abscissas in the first quadrant.

Further, Kmu_att is always set to 1 in the range above the half line L24a (the side in which Mnsp_sens(k) is larger) and on the right side of the half line L22a (the side in which Mnsp_estm(k) is larger) in the first quadrant.

Further, in the range between the half lines L02a and L22 a, if the value of Mnsp_sens(k) is fixed, then Kmu_att is set such that Kmu_att continuously changes between 0 and 1 according to Mnsp_estm(k). Similarly, in the range between the half lines L04a and L24a, if the value of Mnsp_estm(k) is fixed, then Kmu_att is set such that Kmu_att continuously changes between 0 and 1 according to Mnsp_sens(k).

Further, if a point (Mnsp_estm(k), Mnsp_sens(k)) falls in a third quadrant (a range where Mnsp_estm(k)<0 and Mnsp_sens(k)<0), then Kmu_att is set to be origin-symmetrical to Kmu_att set in the first quadrant.

More specifically, Kmu_att is set such that, if Kmu_att in the first quadrant is defined as a function of Mnsp_estm(k) and Mnsp_sens(k) and represented as Kmu_att=f_kmuatt(Mnsp_estm(k), Mnsp_sens(k)), then Kmu_att in the third quadrant is set so as to be Kmu_att=f_kmuatt(−Mnsp_estm(k), −Mnsp_sens(k)). In this case, the half lines L02b, L12b, L22b, L04b, L14b, and L24b in the third quadrant of FIG. 19 correspond to the half lines L02a, L12a, L22a, L04a, L14a, and L24a, respectively, in the first quadrant.

Figure 20:
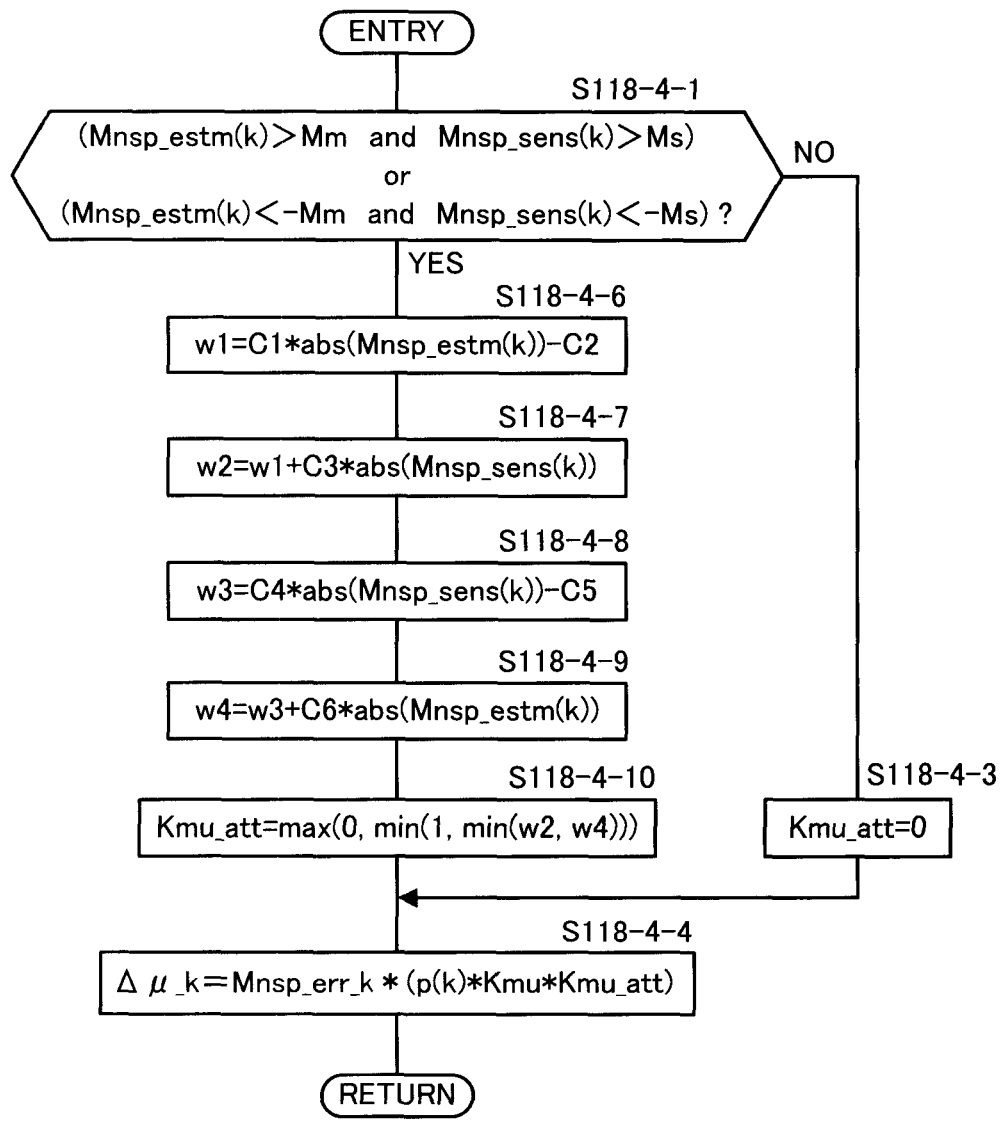
FIG. 20 is a flowchart illustrating the processing in which each friction coefficient increasing/decreasing manipulated variable determiner determines the friction coefficient increasing/decreasing manipulated variable in the sixth embodiment.

The Δμ calculator 42_k of each friction coefficient increasing/decreasing manipulated variable determiner 34_k in this embodiment performs the processing illustrated in, for example, the flowchart of FIG. 20 thereby to determine the friction coefficient increasing/decreasing manipulated variable Δμ_k while setting Kmu_att as described above.

In FIG. 20, for the same processing as the processing illustrated in the flowchart of FIG. 18 in the fifth embodiment, the same reference characters as those in FIG. 18 are used.

Describing the following, the Δμ calculator 42_k first performs the same determination processing in S118-4-1 as that of the fifth embodiment.

Then, if the determination result in S118-4-1 is affirmative (i.e., if the updating cancellation condition is not satisfied), then the Δμ calculator 42_k performs the processing of S118-4-6 to S118-4-10 so as to set the value of the gain adjustment parameter Kmu_att. If the determination result is negative (i.e., if the updating cancellation condition is satisfied), then the Δμ calculator 42_k sets the value of the gain adjustment parameter Kmu_att to 0 in S118-4-3.

In the aforesaid processing of S118-4-6 to S118-4-10, the Δμ calculator 42_k first determines in S118-4-6 the value of a parameter w1 by the expression shown in the flowchart on the basis of the absolute value of Mnsp_estm(k) (abs(Mnsp_estm(k))).

The parameter w1 defines the form of changes in Kmu_att based on the absolute value of Mnsp_estm(k) when the value of Mnsp_sens(k) is fixed. In this case, in the example of setting Kmu_att in this embodiment as illustrated in FIG. 19, C1 and C2 in the expression of S118-4-6 are set to predetermined positive values beforehand.

Subsequently, in S118-4-7, the Δμ calculator 42_k determines the value of a parameter w2 as a first candidate value of Kmu_att by the expression given in the flowchart on the basis of the value of w1 and the absolute value of Mnsp_sens(k) (abs(Mnsp_sens(k))).

In this case, in the example of setting Kmu_att in this embodiment as illustrated in FIG. 19, C3 in the expression of S118-4-7 is set to a predetermined negative value beforehand. The relationship between Mnsp_estm(k) and Mnsp_sens(k) when the value of w2 is set to 0, 0.5, or 1 in the expression of S118-4-7 will be the relationship between Mnsp_estm(k) and Mnsp_sens(k) on the half lines L02a, L02b or the half lines L12a, L12b, or the half lines L22a, L22b in FIG. 19.

Subsequently, the Δμ calculator 42_k determines in S118-4-8 the value of a parameter w3 by the expression illustrated in the flowchart on the basis of the absolute value of Mnsp_sens(k) (abs(Mnsp_sens(k))).

The parameter w3 defines the form of changes in Kmu_att based on the absolute value of Mnsp_sens(k) when the value of Mnsp_estm(k) is fixed. In this case, in the example of setting Kmu_att in this embodiment as illustrated in FIG. 19, C4 and C5 in the expression of S118-4-8 are set to predetermined positive values beforehand.

Subsequently, in S118-4-9, the Δμ calculator 42_k determines the value of a parameter w4 as a second candidate value of Kmu_att by the expression illustrated in the flowchart on the basis of the value of w3 and the absolute value of Mnsp_estm(k) (abs(Mnsp_estm(k))).

In this case, in the example of setting Kmu_att in this embodiment as illustrated in FIG. 19, C6 in the expression of S118-4-9 is set to a predetermined negative value beforehand. The relationship between Mnsp_estm(k) and Mnsp_sens(k) when the value of w4 is set to 0, 0.5, or 1 in the expression of S118-4-9 will be the relationship between Mnsp_estm(k) and Mnsp_sens(k) on the half lines L04a, L04b or the half lines L14a, L14b, or the half lines L24a, L24b.

Subsequently, the Δμ calculator 42_k determines Kmu_att in S118-4-10 by the expression in the flowchart.

The value of Kmu_att in the first quadrant and the third quadrant of the coordinate plane illustrated in FIG. 19 is set as illustrated in the diagram by performing the processing in S118-4-6 to S118-4-10 as described above.

This embodiment is the same as the fifth embodiment except for the aspects described above. According to this embodiment, as described above, in the case where Δμ_k is determined according to Mnsp_err(k) by setting the value of Kmu_att (i.e., in the case where the updating cancellation condition is not satisfied), if the Mnsp_sens(k) or Mnsp_estm (k) is relatively close to zero, then the magnitude of the friction coefficient operation gain Gmu decreases as the Mnsp_sens(k) or Mnsp_estm(k) is close to zero. As a result, the absolute value of the friction coefficient increasing/decreasing manipulated variable Δμ_k, is restrained to be small.

Therefore, it is possible to restrain improper updating of the road surface friction coefficient estimated value μ_estm as Mnsp_sens(k) or Mnsp_estm(k) is close to zero, which causes the error of Mnsp_sens(k) or Mnsp_estm(k) to be apt to be relatively large with respect to the magnitude of the actual NSP yaw moment Mnsp_act.

Seventh Embodiment

A seventh embodiment of the present invention will now be described with reference to FIG. 21. This embodiment differs from the aforesaid sixth embodiment only in the method of setting the gain adjustment parameter Kmu_att in the Δμ calculator 42_k of each friction coefficient increasing/decreasing manipulated variable determiner 34_k (k=1, ... , M).

More specifically, this embodiment considers not only the polarities of a k-th NSP yaw moment estimated value Mnsp_estm(k) and a k-th NSP yaw moment detected value Mnsp_sens(k) but also the polarity of a k-th μ sensitivity p(k). Further, if a predetermined updating cancellation condition including at least a condition related to these polarities, then updating of the road surface friction coefficient estimated value u estm according to a k-th yaw moment estimation error Mnsp_err_k is cancelled.

Here, as apparent from the aforesaid expression 4-13b, the μ sensitivity p indicative of the ratio of an incremental amount of an actual NSP yaw moment Mnsp_act in response to an incremental amount of an actual road surface friction coefficient μ_act should have the same polarity as that of the actual NSP yaw moment Mnsp_act.

Hence, in this embodiment, if the polarity of any one of Mnsp_estm(k), Mnsp_sens(k), and p(k) is different from those of the remaining two polarities, then the updating cancellation condition is considered to be satisfied, and the friction coefficient increasing/decreasing manipulated variable Δμ_k is set to zero as a non-negative predetermined value.

Figure 21:
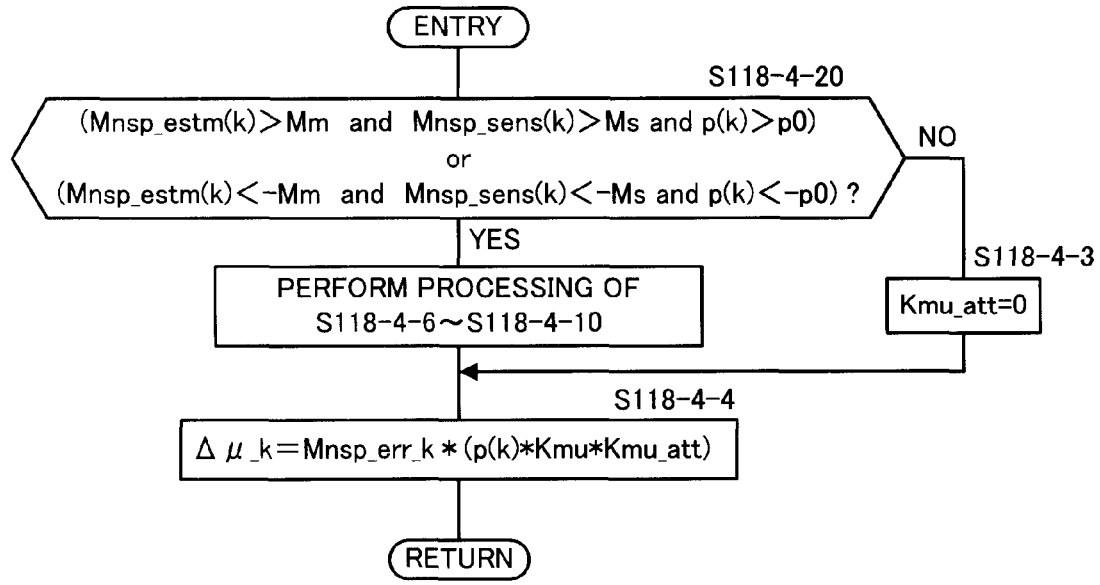
FIG. 21 is a flowchart illustrating the processing in which each friction coefficient increasing/decreasing manipulated variable determiner determines a friction coefficient increasing/decreasing manipulated variable in a seventh embodiment.

To be more specific, according to this embodiment, the Δμ calculator 42_k of each friction coefficient increasing/decreasing manipulated variable determiner 34_k performs the processing illustrated in the flowchart of FIG. 21 to determine a friction coefficient increasing/decreasing manipulated variable Δμ_k. In FIG. 21, the same reference characters as those in FIG. 20 are used for the same processing steps as those in the flowchart of FIG. 20 in the sixth embodiment.

In the processing illustrated in the flowchart of FIG. 21, the determination processing in S118-4-20 is performed in place of the determination processing in S118-4-1 of FIG. 20 in the sixth embodiment. The rest of the processing is the same as that of the sixth embodiment.

In this case, in the determination processing in S118-4-20, it is determined whether a condition that Mnsp_estm(k)>Mm and Mnsp_sens(k)>Ms and p(k)>p0 or a condition that Mnsp_estm(k)<−Mm and Mnsp_sens(k)<−Ms and p(k)<−p0 is satisfied. Here, Mm, Ms, and p0 denote non-negative predetermined values (zero or positive values close to zero) set beforehand.

In this embodiment, if the determination result in S118-4-20 is negative, then it means that the updating cancellation condition is satisfied.

In this case, if the predetermined values of Mm, Ms, and p0 have been set to zero, then a negative determination result in S118-4-20 (the updating cancellation condition is satisfied) is equivalent to the polarity of any one of Mnsp_estm(k), Mnsp_sens(k), and p(k) being different from the polarities of the remaining two.

Meanwhile, if the predetermined values Mm, Ms, and p0 have been set to positive values, then the determination result in S118-4-20 will be negative (the updating cancellation condition is satisfied) not only in the case where the polarity of any one of Mnsp_estm(k), Mnsp_sens(k), and p(k) is different from the polarities of the remaining two, but also in the case where −Mm≤Mnsp_estm(k)≤Mm or −Ms Mnsp_sens(k)≤Ms or −p0≤p(k)≤p0 holds (in other words, in the case where any one of Mnsp_estm(k), Mnsp_sens(k), and p(k) takes a value in a range close to zero).

This embodiment is the same as the sixth embodiment except for the aspects described above.

In this embodiment, updating μ_estm on the basis of Mnsp_err_k is cancelled in the case where the polarity of any one of Mnsp_estm(k), Mnsp_sens(k), and p(k) is different from the polarities of the remaining two. Therefore, it is possible to further reliably prevent μ_estm from diverging.

Eighth Embodiment

An eighth embodiment of the present invention will now be described with reference to FIG. 22. This embodiment differs from the seventh embodiment described above only in the method of setting the aforesaid gain adjustment parameter Kmu_att in the Δμ calculator 42_k of each friction coefficient increasing/decreasing manipulated variable determiner 34_k (k=1, ... , M).

In the aforesaid seventh embodiment, if the determination result in S118-4-20 is affirmative (if the updating cancellation condition is not satisfied), then the friction coefficient increasing/decreasing manipulated variable Δμ_k has always been determined according to the k-th NSP yaw moment deviation Mnsp_err_k.

In contrast thereto, according to this embodiment, if the determination result in S118-4-20 is negative (if the updating cancellation condition is satisfied), then thereafter, Δμ_k is determined according to Mnsp_err_k only if the determination result in S118-4-20 remains to be affirmative (the updating cancellation condition is not satisfied) continuously for a predetermined period of time or more.

In other words, according to this embodiment, once the updating cancellation condition has been satisfied, then a state where the updating cancellation condition is not satisfied is required to continue for the predetermined period of time or more so that the μ_estm is allowed to be updated on the basis of Mnsp_err_k.

Figure 22:
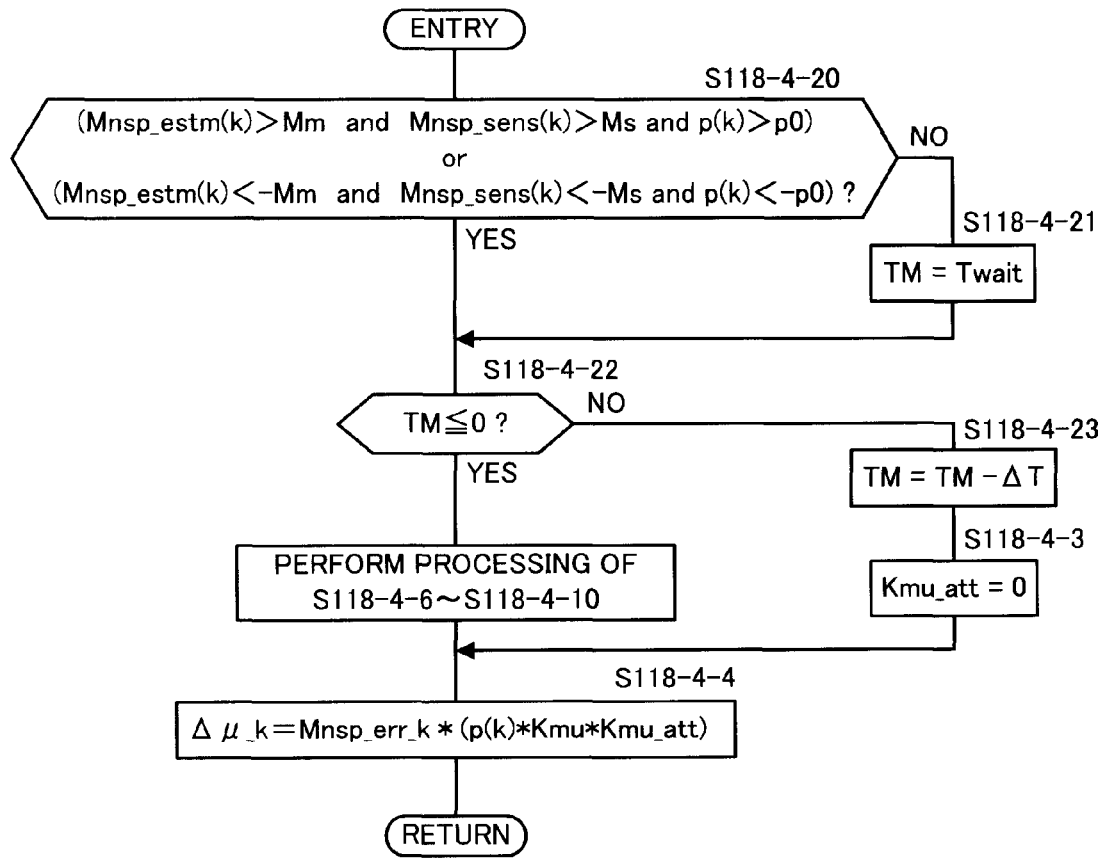
FIG. 22 is a flowchart illustrating the processing in which each friction coefficient increasing/decreasing manipulated variable determiner determines a friction coefficient increasing/decreasing manipulated variable in an eighth embodiment.

To be more specific, in this embodiment, the Δμ calculator 42__*k* of each friction coefficient increasing/decreasing manipulated variable determiner 34__*k* performs the processing illustrated in the flowchart of FIG. 22 to determine the friction coefficient increasing/decreasing manipulated variable Δμ_k. In FIG. 22, the same reference characters as those in FIG. 21 are used for the same processing steps as those illustrated in the flowchart of FIG. 21 in the seventh embodiment.

Describing the following, the Δμ calculator 42__*k* first performs, in S118-4-20, the same determination processing (processing of determining whether the updating cancellation condition is satisfied) as that in the seventh embodiment.

If the determination result in S118-4-20 is negative (if the updating cancellation condition is satisfied), then the Δμ calculator 42__*k* sets, in S118-4-21, the value on a countdown timer TM to an initial value Twait determined beforehand and then performs the determination processing in S118-4-22.

If the determination result in S118-4-20 is affirmative (if the updating cancellation condition is not satisfied), then the Δμ calculator 42__*k* directly performs the determination processing in S-118-4-22.

In the aforesaid determination processing in S118-4-22, the Δμ calculator 42__*k* determines whether the current value on the countdown timer TM is zero or less (whether the counting of time equivalent to the aforesaid initial value Twait has been completed).

If the determination result in S118-4-22 is affirmative, then the Δμ calculator 42__*k* performs the processing of S118-4-6 to S118-4-10 described in the sixth embodiment, thereby setting the value of a gain adjustment parameter Kmu_att.

Meanwhile, if the determination result in S118-4-22 is negative, then the Δμ calculator 42__*k* decrements in S118-4-23 the value on the countdown timer TM by the time equivalent to an arithmetic processing cycle ΔT. Further, the Δμ calculator 42__*k* sets the value of the gain adjustment parameter Kmu_att to zero in S118-4-24.

Subsequently, the Δμ calculator 42__*k* performs in S118-4-4 the same processing as that in the fifth embodiment so as to determine the friction coefficient increasing/decreasing manipulated variable Δμ_k.

According to the processing described above, once the determination result in S118-4-20 turns to be negative (once the updating cancellation condition is satisfied), then the value of the gain adjustment parameter Kmu_att is set to zero even if the determination result in S118-4-20 is affirmative until the state where the determination result in S118-4-20 is affirmative (the state where the updating cancellation condition is not satisfied) continues for not less than predetermined time specified by the initial value Twait on the countdown timer TM. Thus, the state where the determination of Δμ_k on the basis of Mnsp_err_k is cancelled is maintained.

Then, the determination of Δμ_k on the basis of Mnsp_err_k is resumed in the case where the state in which the determination result in S118-4-20 is affirmative (the state where the updating cancellation condition is not satisfied) continues for not less than the predetermined time specified by the initial value Twait on the countdown timer TM.

This embodiment is the same as the aforesaid seventh embodiment except for the aspects described above. According to this embodiment, if the state where the updating cancellation condition is satisfied shifts to the state where the updating cancellation condition is not satisfied, then updating μ_estm according to Mnsp_err_k is not performed during a period immediately after the shift (a period equivalent to the time of the initial value Twait).

This prevents the road surface friction coefficient estimated value μ_estm from being updated to an improper value in the case where the updating cancellation condition is not satisfied temporarily due to an influence of a disturbance or the like.

In the seventh embodiment and the eighth embodiment described above, in the case where the determination result in S118-4-20 is affirmative (in the case where the updating cancellation condition is not satisfied), the gain adjustment parameter Kmu_att has been determined by the processing in S118-4-6 to S118-4-14 in the sixth embodiment. Alternatively, however, the value of Kmu_att may be set to 1 as with the fifth embodiment in the case where the determination result in S118-4-20 is affirmative (in the case where the updating cancellation condition is not satisfied).

Further, the updating cancellation condition in the eighth embodiment is the same as that in the seventh embodiment. Alternatively, however, the eighth embodiment may use the same updating cancellation condition as that in the fifth embodiment and the sixth embodiment. In other words, in the eighth embodiment, the determination processing in S118-4-1 may be performed instead of the determination processing in S118-4-20.

In the fifth to eighth embodiments, in the case where the updating cancellation condition is satisfied (in the case where the determination result in S118-4-1 or S118-4-20 is negative), the friction coefficient increasing/decreasing manipulated variable Δμ_k may be set to zero without using the value of the gain adjustment parameter Kmu_att.

Alternatively, the value of Δμ_k may be set to, for example, a predetermined positive value, which has been decided beforehand, in place of setting the friction coefficient increasing/decreasing manipulated variable Δμ_k to zero, and the road surface friction coefficient estimated value μ_estm may be gradually increased in the state where the updating cancellation condition is satisfied.

Further, in the case where a saturation characteristic element 44 is provided in the seventh or eighth embodiment similarly to the third embodiment, the value of the μ sensitivity p may be used, in place of the μ sensitivity dependent value p_a_k, as p(M) related to the M-th friction coefficient increasing/decreasing manipulated variable determiner 34_M in the aforesaid determination processing in S118-4-20.

Further, as p(k) (k=1, . . . , M) related to the first to N-th friction coefficient increasing/decreasing manipulated variable determiners 34_1 to 34_N, μ sensitivity dependent value p_f_k, which is obtained by passing the μ sensitivity p through the filter 43c_k, may be used instead of the μ sensitivity dependent value p_a_k.

Supplementally, in the first to eighth embodiments described hereinabove, the road surface friction coefficient estimating device having the first to third friction coefficient increasing/decreasing manipulated variable determiners 34_1 to 34_3 has been described as examples. Alternatively, however, for example, the first friction coefficient increasing/decreasing manipulated variable determiner 34_1 may be omitted. If it is applied, the first aspect of the invention is configured.

In this case, the second friction coefficient increasing/decreasing manipulated variable determiner 34_2 and the third friction coefficient increasing/decreasing manipulated variable determiner 34_3 correspond to the first friction coefficient increasing/decreasing manipulated variable determining means and the second friction coefficient increasing/decreasing manipulated variable determining means in the first aspect of the invention.

Alternatively, the M-th friction coefficient increasing/decreasing manipulated variable determiner 34_M not having any filter may be omitted among the first to M-th friction coefficient increasing/decreasing manipulated variable determiners 34_1 to 34_M. If it is applied, the third aspect of the invention is configured.

Moreover, the number of first to N-th friction coefficient increasing/decreasing manipulated variable determiners 34_1 to 34_N having filters may be more than two.

Further, the respective filters of the first to N-th friction coefficient increasing/decreasing manipulated variable determiners 34_1 to 34_N may be band-pass filters having the low-cut characteristic and the high-cut characteristic. Alternatively, the frequency characteristics of the filters of some friction coefficient increasing/decreasing manipulated variable determiners of the first to N-th friction coefficient increasing/decreasing manipulated variable determiners 34_1 to 34_N may be set to, for example, the high-cut characteristic.

Moreover, in the first to eighth embodiments, all of the friction coefficient increasing/decreasing manipulated variable determiners 34_1 to 34_M are friction coefficient increasing/decreasing manipulated variable determining means in the μ sensitivity using system. Alternatively, however, only some of the friction coefficient increasing/decreasing manipulated variable determiners may be used as the friction coefficient increasing/decreasing manipulated variable determining means in the μ sensitivity using system. In this case, the remaining friction coefficient increasing/decreasing manipulated variable determiners perform the calculation processing of the friction coefficient increasing/decreasing manipulated variables on the assumption that the value of the μ sensitivity p is steadily a predetermined value.

In the first to eighth embodiments, the driving/braking force estimated value Fsubx_i_estm of each wheel 2-$i$ and the lateral force estimated value Fsuby_i_estm have been found and the value of Mnsp_estm has been calculated on the basis of the estimated values in order to find the NSP yaw moment estimated value Mnsp_estm. The actual NSP yaw moment Mnsp_act, however, generally exhibits high dependency upon the lateral force and low dependency upon the driving/braking force out of the lateral force and the driving/braking force of each wheel 2-$i$. Hence, the step of finding the driving/braking force estimated value Fsubx_i_estm of each wheel 2-$i$ may be omitted.

In this case, for example, the lateral translational force acting on the center-of-gravity point of the vehicle 1 due to the resultant force of the lateral force estimated values Fsuby_i_estm of the wheels 2-$i$ ($i$=1, 2, 3, 4) and the moment about a yaw axis acting on the center-of-gravity point of the vehicle 1 due to the resultant force of the lateral force estimated values Fsuby_i_estm may be found as the total road surface reaction force resultant lateral force estimated value Fgy_total_estm and the total road surface reaction force yaw moment Mgz_total_estm, respectively. Then, based on the found Fgy_total_estm and Mgz_total_estm, the NSP yaw moment estimated value Mnsp_estm may be found according to the aforesaid expression 7-1.

The skid motion of the vehicle 1 is also highly dependent upon the lateral force out of the lateral force and the driving/braking force of each wheel 2-$i$. Therefore, when estimating the state quantity of the skid motion of the vehicle 1 by the vehicle motion estimator 24d, only the lateral translational force acting on the center-of-gravity point of the vehicle 1 due to the resultant force of the lateral force estimated values Fsuby_i_estm of the wheels 2-$i$ ($i$=1, 2, 3, 4) may be regarded as the entire lateral external force (translational force) acting on the center-of-gravity point of the vehicle 1 to estimate the state quantity of the skid motion of the vehicle 1.

For example, the value of the lateral translational force acting on the center-of-gravity point of the vehicle 1 due to the resultant force of the lateral force estimated values Fsuby_i_estm of the wheels 2-$i$ ($i$=1, 2, 3, 4) is found as the total road surface reaction force resultant lateral force estimated values Fgy_total_estm. Then, the computation of the aforesaid expression 1-14a is performed by using the Fgy_total_estm to find a vehicle center-of-gravity skid speed change rate estimated value Vgdot_y_estm. Then, the found Vgdot_y_estm is integrated to find the vehicle center-of-gravity skid speed estimated value Vgy_estm.

In the first to eighth embodiments described above, the μ sensitivity p has been calculated according to the aforesaid expression 5-7. Alternatively, however, the μ sensitivity may be calculated by using the aforesaid friction characteristic model.

For example, the same processing as that in S110 and S112 of FIG. 4 is performed using the value of the road surface friction coefficient, which is obtained by changing μ_estm_p by a predetermined minute amount dμ set beforehand (=μ_estm_p+dμ), in place of a latest value (a previous value) of the road surface friction coefficient estimated value μ_estm_p, thereby calculating the total road surface reaction force resultant lateral forces Fgy_total_estm (the lateral component of the total road surface reaction force translational force vector estimated value ↑Fg_total_estm) and the total road surface reaction force yaw moment Mgz_total_estm in the case where it is assumed that the value of the road surface friction coefficient is μ_estm_p+dμ.

Then, the right side of the aforesaid expression 7-1 is computed using these values Fgy_total_estm and Mgz_total_estm thereby to calculate the NSP yaw moment estimated value (hereinafter referred to as Mnsp_estm2) obtained in the case where it is assumed that the value of the road surface friction coefficient is μ_estm_p+dμ.

Subsequently, the deviation between the calculated NSP yaw moment estimated value Mnsp_estm2 and the NSP yaw moment estimated value Mnsp_estm (the NSP yaw moment estimated value obtained in the case where it is assumed that the value of the road surface friction coefficient is μ_estm_p) calculated in the aforesaid S118-2 (=Mnsp_estm 2−Mnsp_estm) is divided by dμ to calculate the μ sensitivity p.

Further, in the first to eighth embodiments described above, the NSP yaw moment has been used as the to-be-compared external force in the present invention. The to-be-compared external force in the present invention, however, is not limited to the NSP yaw moment.

For example, the lateral component of the vehicle 1 (a component in the direction of the Y-axis of a vehicle body coordinate system) of the resultant force of the road surface reaction forces (more specifically, the driving/braking force and the lateral force) of the front wheels 2-1 and 2-2 may be used as the to-be-compared external force.

Further, in the first to eighth embodiments described above, the value of p calculated according to the aforesaid expression 5-7 has been used as the μ sensitivity. Alternatively, however, the value obtained by dividing the value of p by a latest value (a previous value) of the road surface friction coefficient estimated value μ_estm (the ratio of p relative to the latest value of μ_estm) may be defined as the μ sensitivity, and the defined μ sensitivity may be used in place of p.

Moreover, in the first to eighth embodiments described above, the road surface friction coefficient estimating device may further include a means which finds a friction coefficient increasing/decreasing manipulated variable by a known method or the like by using a to-be-compared external force (for example, a longitudinal translational force or the like out of the road surface reaction force resultant force acting on the wheel 2-$i$ ($i$=1, 2, 3, 4)) other than the NSP yaw moment, and the road surface friction coefficient estimated value μ_estm may be updated using an updating increasing/decreasing manipulated variable, which is obtained by further considering the friction coefficient increasing/decreasing manipulated variable.

In the processing of the vehicle model computing means 24, there has been used the vehicle motion model based on the assumption that a road surface is horizontal. Alternatively, however, a vehicle motion model, which has been formed taking the road surface bank angle θbank and the road surface slope angle θslope into account, may be used. For example, a vehicle motion model, in which the aforesaid expressions 1-13 and 1-14 are replaced, by the following expressions 1-13b and 1-14b, respectively, may be used.

$$Fgx\_total=m^*(Vgdot\_x-Vgy^*\gamma-g^*\sin(\theta slope)) \quad \text{Expression 1-13b}$$

$$Fgy\_total=m^*(Vgdot\_y+Vgx^*\gamma+g^*\sin(\theta bank)) \quad \text{Expression 1-14b}$$

In this case, for example, the vehicle model computing means 24 is able to estimate the road surface bank angle θbank and the road surface slope angle θslope while finding the vehicle center-of-gravity longitudinal velocity estimated value Vgx_estm and the vehicle center-of-gravity skid speed estimated value Vgy_estm as described below.

To be specific, in this case, the vehicle model computing means 24 calculates the vehicle center-of-gravity longitudinal velocity change rate estimated value Vgdot_x_estm and the vehicle center-of-gravity skid speed change rate estimated value Vgdot_y_estm according to the following expressions 1-13c and 1-14c in place of the aforesaid expressions 1-13a and 1-14a, respectively.

$$Vgdot\_x\_estm=Fgx\_total\_estm/m+Vgy\_estm\_p^*\gamma\_estm\_p+g^*\sin(\theta slope\_estm\_p) \quad \text{Expression 1-13c}$$

$$Vgdot\_y\_estm=Fgy\_total\_estm/m-Vgx\_estm\_p^*\gamma\_estm\_p-g^*\sin(\theta bank\_estm\_p) \quad \text{Expression 1-14c}$$

Then, the vehicle model computing means 24 uses these values Vgdot_x_estm and Vgdot_y_estm to find the vehicle center-of-gravity longitudinal velocity estimated value Vgx_estm and the vehicle center-of-gravity skid speed estimated value Vgy_estm, as with the first embodiment described above. The vehicle center-of-gravity longitudinal velocity estimated value Vgx_estm may be set to agree with the aforesaid selected wheel speed detected value Vw_i_sens_select.

Further, the vehicle model computing means 24 calculates the sensed-by-sensor longitudinal acceleration estimated value Accx_sensor_estm, which is an estimated value of acceleration sensed by the longitudinal acceleration sensor 14, and the sensed-by-sensor lateral acceleration estimated value Accy_sensor_estm, which is an estimated value of acceleration sensed by the lateral acceleration sensor 15, according to expressions 1-31 and 1-32 given below, respectively.

$$Accx\_sensor\_estm=Vgdot\_x\_estm-Vgy\_estm\_p^*\gamma\_estm\_p-g^*\sin(\theta slope\_estm\_p) \quad \text{Expression 1-31}$$

$$Accy\_sensor\_estm=Vgdot\_y\_estm+Vgx\_estm\_p^*\gamma\_estm\_p+g^*\sin(\theta bank\_estm\_p) \quad \text{Expression 1-32}$$

The values of Accx_sensor_estm and Accy_sensor_estm may be found by computing the first term of the right side of expression 1-13c and computing the first term of the right side of expression 1-14c, instead of using expressions 1-31 and 1-32, respectively.

Here, Accx_sensor_estm found as described above means a sensed-by-sensor longitudinal acceleration estimated value that is found on the assumption that a previous value (a latest value) θslope_estm_p of a road surface slope angle estimated value is accurate.

Similarly, Accy_sensor_estm found as described above means a sensed-by-sensor lateral acceleration estimated value that is found on the assumption that a previous value (a latest value) θbank_estm_p of a road surface bank angle estimated value is accurate.

Accordingly, the deviation between the vehicle center-of-gravity longitudinal acceleration detected value Accx_sens (=sensed-by-sensor longitudinal acceleration detected value) based on an output of the longitudinal acceleration sensor 14 and the sensed-by-sensor longitudinal acceleration estimated value Accx_sensor_estm is considered to be based on an error of θslope estm_p.

Similarly, the deviation between the vehicle center-of-gravity lateral acceleration detected value Accy_sens (=sensed-by-sensor lateral acceleration detected value) based on an output of the lateral acceleration sensor 15 and the sensed-by-sensor lateral acceleration estimated value Accy_sensor_estm is considered to be based on an error of θbank_estm_p.

Thus, the vehicle model computing means 24 finds a new road surface slope angle estimated value θslope_estm by updating the road surface slope angle estimated value θslope_estm according to a feedback control law on the basis of the deviation between the vehicle center-of-gravity longitudinal acceleration detected value Accx_sens and the sensed-by-sensor longitudinal acceleration estimated value Accx_sensor_estm such that the deviation is converged to zero.

Similarly, the vehicle model computing means 24 finds a new road surface bank angle estimated value θbank_estm by updating the value θbank_estm according to the feedback control law on the basis of the deviation between the vehicle center-of-gravity lateral acceleration detected value Accy_sens and the sensed-by-sensor lateral acceleration estimated value Accy_sensor_estm such that the deviation is converged to zero.

For example, the vehicle model computing means 24 finds the new road surface slope angle estimated value θslope_estm and the road surface bank angle estimated value θbank_estm according to expressions 1-33 and 1-34 given below, respectively.

$$\theta slope\_estm=\theta slope\_estm\_p+K slope^*(Accx\_sens-Accx\_sensor\_estm) \quad \text{Expression 1-33}$$

$$\theta bank\_estm=\theta bank\_estm\_p+K bank^*(Accy\_sens-Accy\_sensor\_estm) \quad \text{Expression 1-34}$$

Kslope in expression 1-33 and Kbank in expression 1-34 denote predetermined values (proportional gains) set beforehand. In this example, the integral computation of the deviation (Accx_sens−Accx_sensor_estm) and the deviation (Accy_sens−Accy_sensor_estm) is performed to calculate θslope_estm and θbank_estm.

Thus, the road surface bank angle θbank and the road surface slope angle θslope is able to be estimated while finding the vehicle center-of-gravity longitudinal velocity estimated value Vgx_estm and the vehicle center-of-gravity skid speed estimated value Vgy_estm.

The invention claimed is:

1. A road surface friction coefficient estimating device which estimates a friction coefficient of a road surface, on which a vehicle is traveling, while updating the friction coefficient, the device comprising:
a first estimating element of a to-be-compared external force which
defines, as the to-be-compared external force, a predetermined type of an external force component acting on the vehicle due to a resultant force of road surface reaction forces acting on each wheel of the vehicle from the road surface, and
finds a first estimated value of the to-be-compared external force by using a friction characteristic model representing a relationship between a slip between the wheel of the vehicle and the road surface and a road surface reaction force, an estimated value of the friction coefficient which has been already determined, and an observed value of a predetermined type of a quantity to be observed, which is related to a behavior of the vehicle;
a second estimating element of the to-be-compared external force which
finds a value of an external force component balancing out an inertial force on the basis of an observed value of a motion state quantity of the vehicle that defines the inertial force, which is a part of an inertial force generated by a motion of the vehicle and corresponds to the to-be-compared external force, and
obtains the found value of the external force component as a second estimated value of the to-be-compared external force;
a first friction coefficient increasing/decreasing manipulated variable determining element and a second friction coefficient increasing/decreasing manipulated variable determining element, each of which determines an increasing/decreasing manipulated variable of an estimated value of the friction coefficient of the road surface on the basis of at least the first estimated value and the second estimated value; and
a friction coefficient estimated value updating element which determines a new estimated value of the friction coefficient by updating the estimated value of the friction coefficient of the road surface on the basis of at least any one of the increasing/decreasing manipulated variables, which have been determined by the first friction coefficient increasing/decreasing manipulated variable determining element and the second friction coefficient increasing/decreasing manipulated variable determining element, respectively,
wherein:
the first friction coefficient increasing/decreasing manipulated variable determining element comprises a (1__1)th filter and the second friction coefficient increasing/decreasing manipulated variable determining element comprises a (2__1)th filter;
the second friction coefficient increasing/decreasing manipulated variable determining element determines the increasing/decreasing manipulated variable on the basis of at least a deviation between the first estimated value and the second estimated value such that the deviation therebetween is converged to zero; and
the first friction coefficient increasing/decreasing manipulated variable determining element determines the increasing/decreasing manipulated variable on the basis of at least a deviation between a (1__1)th estimated filtering value obtained by passing the first estimated value through the (1__1)th filter for frequency component adjustment and a (2__1)th estimated filtering value obtained by passing the second estimated value through the (2__1)th filter for frequency component adjustment having the same frequency characteristic as the (1__1)th filter, such that the deviation is converged to zero.

2. A road surface friction coefficient estimating device which estimates a friction coefficient of a road surface, on which a vehicle is traveling, while updating the friction coefficient, the device comprising:
a first estimating element of a to-be-compared external force which
defines, as the to-be-compared external force, a predetermined type of an external force component acting on the vehicle due to a resultant force of road surface reaction forces acting on each wheel of the vehicle from the road surface, and
finds a first estimated value of the to-be-compared external force by using a friction characteristic model representing a relationship between a slip between the wheel of the vehicle and the road surface and a road surface reaction force, an estimated value of the friction coefficient which has been already determined, and an observed value of a predetermined type of a quantity to be observed, which is related to a behavior of the vehicle;
a second estimating element of the to-be-compared external force which
finds a value of an external force component balancing out an inertial force on the basis of an observed value of a motion state quantity of the vehicle that defines the inertial force, which is a part of an inertial force generated by a motion of the vehicle and corresponds to the to-be-compared external force, and
obtains the found value of the external force component as a second estimated value of the to-be-compared external force;
first to (N+1)th friction coefficient increasing/decreasing manipulated variable determining elements, which are (N+1) (N: 2 or a greater integer) friction coefficient increasing/decreasing manipulated variable determining elements, each of which determines an increasing/decreasing manipulated variable of an estimated value of the friction coefficient of the road surface on the basis of at least the first estimated value and the second estimated value; and
a friction coefficient estimated value updating element which determines a new estimated value of the friction coefficient by updating the estimated value of the friction coefficient of the road surface on the basis of at least any one of the increasing/decreasing manipulated variables, which have been determined by the first to (N+1)th friction coefficient increasing/decreasing manipulated variable determining elements, respectively,
wherein:
each of the first to N-th friction coefficient increasing/decreasing manipulated variable determining elements comprises a (1_N)th filter and a (2_N) filter;
the (N+1)th friction coefficient increasing/decreasing manipulated variable determining element determines the increasing/decreasing manipulated variable on the basis of at least a deviation between the first estimated value and the second estimated value such that the deviation therebetween is converged to zero;
a k-th friction coefficient increasing/decreasing manipulated variable determining element (k: any one of integers 1 to N), which is one of the first to (N)th friction coefficient increasing/decreasing manipulated variable determining elements, determines the increasing/decreasing manipulated variable on the basis of at least a deviation between a (1_k)th estimated filtering value obtained by passing the first estimated value through a (1_k)th filter for frequency component adjustment and a (2_k)th estimated filtering value obtained by passing the second estimated value through a (2_k)th filter for frequency component adjustment having the same frequency characteristic as the (1_k)th filter, such that the deviation is converged to zero; and the respective frequency characteristics of the (1__1)th to (1_N)th filters are set to frequency characteristics different from one another.

3. A road surface friction coefficient estimating device which estimates a friction coefficient of a road surface, on which a vehicle is traveling, while updating the friction coefficient, the device comprising:

a first estimating element of a to-be-compared external force which
  defines, as the to-be-compared external force, a predetermined type of an external force component acting on the vehicle due to a resultant force of road surface reaction forces acting on each wheel of the vehicle from the road surface, and
  finds a first estimated value of the to-be-compared external force by using a friction characteristic model representing a relationship between a slip between the wheel of the vehicle and the road surface and a road surface reaction force, an estimated value of the friction coefficient which has been already determined, and an observed value of a predetermined type of a quantity to be observed related to a behavior of the vehicle;

a second estimating element of the to-be-compared external force which
  finds a value of an external force component balancing out an inertial force on the basis of an observed value of a motion state quantity of the vehicle that defines the inertial force, which is a part of an inertial force generated by a motion of the vehicle and corresponds to the to-be-compared external force, and
  obtains the found value of the external force component as a second estimated value of the to-be-compared external force;

first to N-th friction coefficient increasing/decreasing manipulated variable determining elements, which are N (N: 2 or a greater integer) friction coefficient increasing/decreasing manipulated variable determining elements, each of which determines an increasing/decreasing manipulated variable of an estimated value of the friction coefficient of the road surface on the basis of at least the first estimated value and the second estimated value; and a friction coefficient estimated value updating element which determines a new estimated value of the friction coefficient by updating the estimated value of the friction coefficient of the road surface on the basis of at least any one of the increasing/decreasing manipulated variables, which have been determined by the first to N-th friction coefficient increasing/decreasing manipulated variable determining elements, respectively, wherein:

each of the first to N-th friction coefficient increasing/decreasing manipulated variable determining elements comprises a (1_N)th filter and a (2_N) filter;

a k-th friction coefficient increasing/decreasing manipulated variable determining element (k: any one of integers 1 to N), which is one of the first to (N)th friction coefficient increasing/decreasing manipulated variable determining elements, determines the increasing/decreasing manipulated variable on the basis of at least a deviation between a (1_k)th estimated filtering value obtained by passing the first estimated value through a (1_k)th filter for frequency component adjustment and a (2_k)th estimated filtering value obtained by passing the second estimated value through a (2_k)th filter for frequency component adjustment having the same frequency characteristic as the (1_k)th filter, such that the deviation is converged to zero; and the respective frequency characteristics of the (1__1)th to (1_N)th filters are set to frequency characteristics different from one another.

4. The road surface friction coefficient estimating device according to claim 1, wherein the (1__1)th filter and the (2__1)th filter are filters having low-cut characteristics.

5. The road surface friction coefficient estimating device according to claim 2, wherein both of the (1_k)th filter and the (2_k)th filter have low-cut characteristics.

6. The road surface friction coefficient estimating device according to claim 3, both of the (1_k)th filter and the (2_k)th filter have low-cut characteristics.

7. The road surface friction coefficient estimating device according to claim 1, wherein the friction coefficient estimated value updating element updates the estimated value of the friction coefficient according to a manipulated variable obtained by adding up increasing/decreasing manipulated variables, which have been determined by all of the friction coefficient increasing/decreasing manipulated variable determining elements, respectively.

8. The road surface friction coefficient estimating device according to claim 2, wherein the friction coefficient estimated value updating element updates the estimated value of the friction coefficient according to a manipulated variable obtained by adding up increasing/decreasing manipulated variables, which have been determined by all of the friction coefficient increasing/decreasing manipulated variable determining elements, respectively.

9. The road surface friction coefficient estimating device according to claim 3, wherein the friction coefficient estimated value updating element updates the estimated value of the friction coefficient according to a manipulated variable obtained by adding up increasing/decreasing manipulated variables, which have been determined by all of the friction coefficient increasing/decreasing manipulated variable determining elements, respectively.

10. The road surface friction coefficient estimating device according to claim 1, wherein the friction coefficient estimated value updating element updates the estimated value of the friction coefficient according to an increasing/decreasing manipulated variable closest to zero among all of the increasing/decreasing manipulated variables when a condition that the increasing/decreasing manipulated variables determined by all of the friction coefficient increasing/decreasing manipulated variable determining elements, respectively, have a same polarity as one another is satisfied, and inhibits the updating of the estimated value of the friction coefficient according to all of the increasing/decreasing manipulated variables when the condition is not satisfied.

11. The road surface friction coefficient estimating device according to claim 2, wherein the friction coefficient estimated value updating element updates the estimated value of the friction coefficient according to an increasing/decreasing manipulated variable closest to zero among all of the increasing/decreasing manipulated variables when a condition that the increasing/decreasing manipulated variables determined by all of the friction coefficient increasing/decreasing manipulated variable determining elements, respectively, have a same polarity as one another is satisfied, and inhibits the updating of the estimated value of the friction coefficient according to all of the increasing/decreasing manipulated variables when the condition is not satisfied.

12. The road surface friction coefficient estimating device according to claim 3, wherein the friction coefficient estimated value updating element updates the estimated value of the friction coefficient according to an increasing/decreasing manipulated variable closest to zero among all of the increasing/decreasing manipulated variables when a condition that the increasing/decreasing manipulated variables determined by all of the friction coefficient increasing/decreasing manipulated variable determining elements, respectively, have a same polarity as one another is satisfied, and inhibits the updating of the estimated value of the friction coefficient according to all of the increasing/decreasing manipulated variables in when the condition is not satisfied.

13. The road surface friction coefficient estimating device according to claim 1, further comprising a μ sensitivity calculating element, which finds a ratio of an incremental amount of the to-be-compared external force relative to an incremental amount of the friction coefficient of the road surface or finds a value of μ sensitivity, which is a value obtained by dividing the ratio by a value of the friction coefficient of the road surface, wherein at least one of all of the friction coefficient increasing/decreasing manipulated variable determining elements is a friction coefficient increasing/decreasing manipulated variable determining element in a μ sensitivity using system, which determines the increasing/decreasing manipulated variable according to the deviation and the value of the μ sensitivity or a μ sensitivity dependent value, which is obtained by passing the value of the μ sensitivity through at least one or both of a filter for frequency component adjustment and a saturation characteristic element.

14. The road surface friction coefficient estimating device according to claim 2, further comprising a μ sensitivity calculating element, which finds a ratio of an incremental amount of the to-be-compared external force relative to an incremental amount of the friction coefficient of the road surface or finds a value of μ sensitivity, which is a value obtained by dividing the ratio by a value of the friction coefficient of the road surface, wherein at least one of all of the friction coefficient increasing/decreasing manipulated variable determining elements is a friction coefficient increasing/decreasing manipulated variable determining element in a μ sensitivity using system, which determines the increasing/decreasing manipulated variable according to the deviation and the value of the μ sensitivity or a μ sensitivity dependent value, which is obtained by passing the value of the μ sensitivity through at least one or both of a filter for frequency component adjustment and a saturation characteristic element.

15. The road surface friction coefficient estimating device according to claim 3, further comprising a μ sensitivity calculating element, which
finds a ratio of an incremental amount of the to-be-compared external force relative to an incremental amount of the friction coefficient of the road surface or finds a value of μ sensitivity, which is a value obtained by dividing the ratio by a value of the friction coefficient of the road surface,
wherein at least one of all of the friction coefficient increasing/decreasing manipulated variable determining elements is a friction coefficient increasing/decreasing manipulated variable determining element in a μ sensitivity using system, which determines the increasing/decreasing manipulated variable according to the deviation and the value of the μ sensitivity or a μ sensitivity dependent value, which is obtained by passing the value of the μ sensitivity through at least one or both of a filter for frequency component adjustment and a saturation characteristic element.

16. The road surface friction coefficient estimating device according to claim 13, wherein each of the friction coefficient increasing/decreasing manipulated variable determining elements in the μ sensitivity using system determines the increasing/decreasing manipulated variable according to a product of the deviation and the value of the μ sensitivity or the μ sensitivity dependent value.

17. The road surface friction coefficient estimating device according to claim 14, wherein each of the friction coefficient increasing/decreasing manipulated variable determining elements in the μ sensitivity using system determines the increasing/decreasing manipulated variable according to a product of the deviation and the value of the μ sensitivity or the μ sensitivity dependent value.

18. The road surface friction coefficient estimating device according to claim 15, wherein each of the friction coefficient increasing/decreasing manipulated variable determining elements in the μ sensitivity using system determines the increasing/decreasing manipulated variable according to a product of the deviation and the value of the μ sensitivity or the μ sensitivity dependent value.

19. The road surface friction coefficient estimating device according to claim 1, wherein the to-be-compared external force is a moment about a yaw axis at a neutral steer point of the vehicle.

20. The road surface friction coefficient estimating device according to claim 2, wherein the to-be-compared external force is a moment about a yaw axis at a neutral steer point of the vehicle.

21. The road surface friction coefficient estimating device according to claim 3, wherein the to-be-compared external force is a moment about a yaw axis at a neutral steer point of the vehicle.

22. The road surface friction coefficient estimating device according to claim 13, wherein:
the to-be-compared external force is a moment about a yaw axis at a neutral steer point of the vehicle; and
the μ sensitivity calculating element finds the value of the μ sensitivity by linearly combining an observed value of a steering angle of a steering wheel out of the wheels of the vehicle and an observed value of a yaw rate of the vehicle.

23. The road surface friction coefficient estimating device according to claim 14, wherein:
the to-be-compared external force is a moment about a yaw axis at a neutral steer point of the vehicle; and
the μ sensitivity calculating element finds the value of the μ sensitivity by linearly combining an observed value of a steering angle of a steering wheel out of the wheels of the vehicle and an observed value of a yaw rate of the vehicle.

24. The road surface friction coefficient estimating device according to claim 15, wherein:
the to-be-compared external force is a moment about a yaw axis at a neutral steer point of the vehicle; and the μ sensitivity calculating element finds the value of the μ sensitivity by linearly combining an observed value of a steering angle of a steering wheel out of the wheels of the vehicle and an observed value of a yaw rate of the vehicle.

25. The road surface friction coefficient estimating device according to claim 22, wherein the μ sensitivity calculating element sets at least one of a weighting factor applied to the observed value of the steering angle and a weighting factor applied to the observed value of the yaw rate in the linear combination on the basis of an observed value of a vehicle speed of the vehicle such that the mutual ratio of both weighting factors changes according to the vehicle speed, and uses the set weighting factor to compute the linear combination.

26. The road surface friction coefficient estimating device according to claim 23, wherein the μ sensitivity calculating element sets at least one of a weighting factor applied to the observed value of the steering angle and a weighting factor applied to the observed value of the yaw rate in the linear combination on the basis of an observed value of a vehicle speed of the vehicle such that the mutual ratio of both weighting factors changes according to the vehicle speed, and uses the set weighting factor to compute the linear combination.

27. The road surface friction coefficient estimating device according to claim 24, wherein the μ sensitivity calculating element sets at least one of a weighting factor applied to the observed value of the steering angle and a weighting factor applied to the observed value of the yaw rate in the linear combination on the basis of an observed value of a vehicle speed of the vehicle such that the mutual ratio of both weighting factors changes according to the vehicle speed, and uses the set weighting factor to compute the linear combination.

\* \* \* \* \*